(12) United States Patent
Bhansali et al.

(10) Patent No.: US 9,202,059 B2
(45) Date of Patent: Dec. 1, 2015

(54) METHODS, SYSTEMS, AND APPARATUSES FOR MANAGING A HARD DRIVE SECURITY SYSTEM

(76) Inventors: Apurva M. Bhansali, Austin, TX (US); Mehul R. Patel, Round Rock, TX (US); Kamal M. Dhanani, Round Rock, TX (US); Rajnish S. Chauhan, Austin, TX (US); David Cheung, Round Rock, TX (US)

( * ) Notice: Subject to any disclaimer, the term of this patent is extended or adjusted under 35 U.S.C. 154(b) by 122 days.

(21) Appl. No.: 13/410,282

(22) Filed: Mar. 1, 2012

(65) Prior Publication Data
US 2012/0254602 A1 Oct. 4, 2012

Related U.S. Application Data

(60) Provisional application No. 61/448,180, filed on Mar. 1, 2011.

(51) Int. Cl.
*G06F 21/00* (2013.01)
*G06F 21/57* (2013.01)

(52) U.S. Cl.
CPC .................................. *G06F 21/575* (2013.01)

(58) Field of Classification Search
CPC ......... G06F 21/31; G06F 21/62; G06F 21/78; G06F 12/14; G06F 21/57; G06F 21/70; H04L 9/32
See application file for complete search history.

(56) References Cited

U.S. PATENT DOCUMENTS

| | | | |
|---|---|---|---|
| 2004/0078680 A1* | 4/2004 | Hu et al. | 714/36 |
| 2009/0319806 A1* | 12/2009 | Smith et al. | 713/193 |
| 2011/0154065 A1* | 6/2011 | Rothman et al. | 713/300 |
| 2012/0159041 A1* | 6/2012 | Saxena et al. | 711/103 |

OTHER PUBLICATIONS

TCG Storage Architecture Core Specification, Specification Version 2.00 Final Revision 1.00, Apr. 20, 2009, 314 pages.
TCG Storage Security Subsystem Class: OPAL, Specification Version 1.00 Revision 3.00, Feb. 4, 2010, 83 pages.

* cited by examiner

*Primary Examiner* — Izunna Okeke
(74) *Attorney, Agent, or Firm* — Chowdhury Law Group, P.C.

(57) ABSTRACT

A system for use with a computer is provided, the computer including a self-encrypting drive (SED), the SED including a nominal space and a pre-boot region, wherein the nominal space can be locked to prevent access to the nominal space. The system includes SED management software configured to be loaded in the pre-boot region of the SED. The SED management software includes a pre-boot operating system (OS) and an unlocking program. The unlocking program is configured (a) to execute within the pre-boot OS, and (b) upon successful authentication of a user, to unlock the nominal space of the SED. Other embodiments are described and claimed.

162 Claims, 41 Drawing Sheets

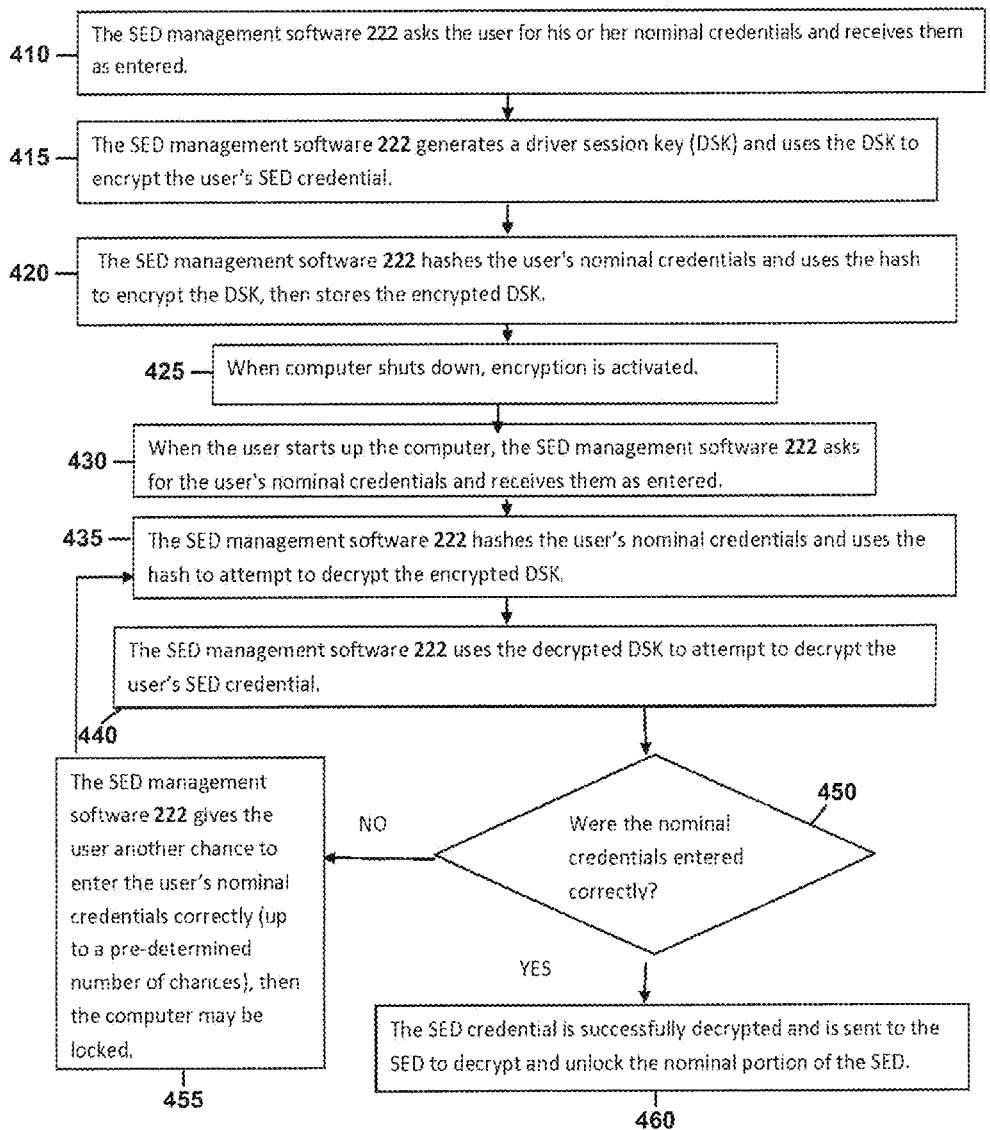

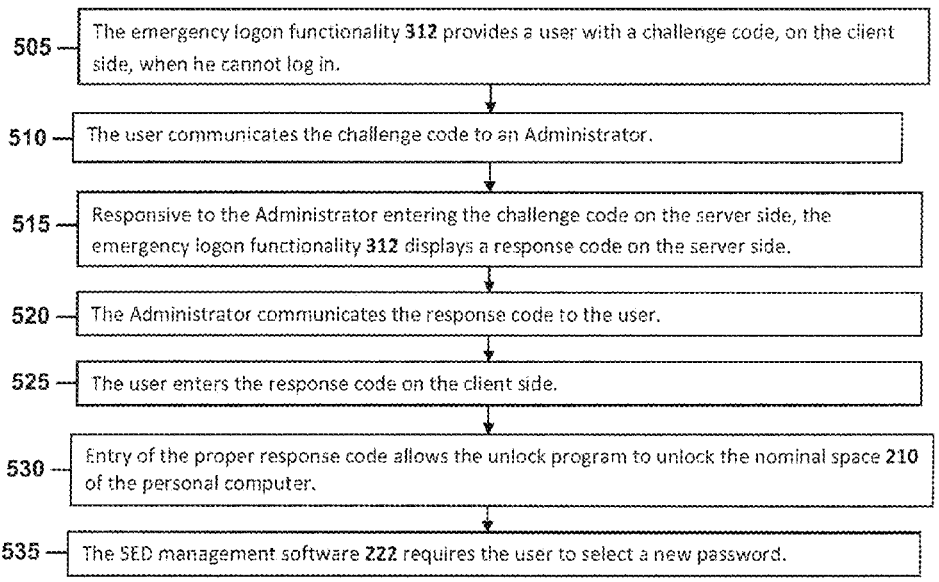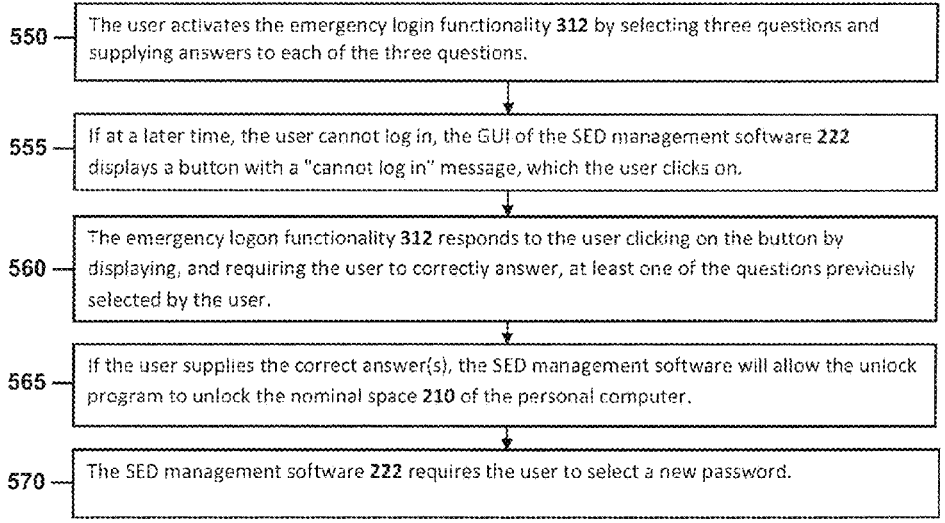

FIGURE 13

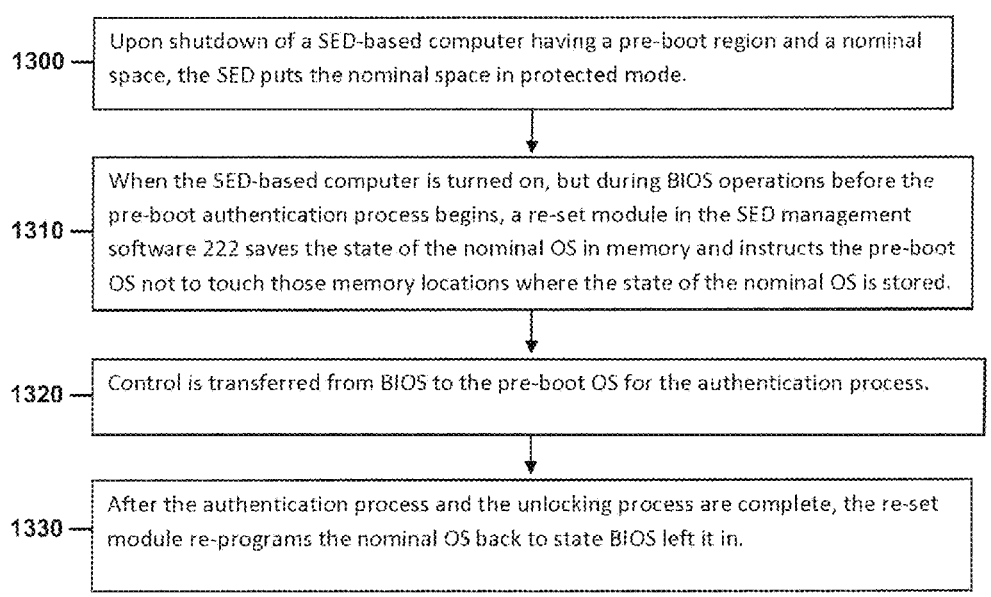

1300 — Upon shutdown of a SED-based computer having a pre-boot region and a nominal space, the SED puts the nominal space in protected mode.

1310 — When the SED-based computer is turned on, but during BIOS operations before the pre-boot authentication process begins, a re-set module in the SED management software 222 saves the state of the nominal OS in memory and instructs the pre-boot OS not to touch those memory locations where the state of the nominal OS is stored.

1320 — Control is transferred from BIOS to the pre-boot OS for the authentication process.

1330 — After the authentication process and the unlocking process are complete, the re-set module re-programs the nominal OS back to state BIOS left it in.

METHODS, SYSTEMS, AND APPARATUSES FOR MANAGING A HARD DRIVE SECURITY SYSTEM

CROSS-REFERENCE TO RELATED APPLICATION

This application claims priority under 35 USC §119(e)(1) of Provisional Application No. 61/448,180, filed Mar. 1, 2011, incorporated herein by reference.

FIELD OF THE DISCLOSURE

The present disclosure relates generally to systems, methods, and apparatuses for securing hard drives. More particularly, the disclosure relates to systems, methods and apparatuses for managing systems designed to secure a hard drive by encrypting and hiding a portion of the hard drive.

BACKGROUND OF THE DISCLOSURE

Disk security is an important concern for computer owners and users. Many current software packages for hard drive encryption on a personal computer with a normal hard drive (HD) require the user to install a software package. The software package works with the central processing unit ("CPU") of the personal computer to encrypt every byte on the hard disk drive, except for the very first sectors of the hard drive. When the user shuts down the personal computer and the user or another person boots up the personal computer at a later time, instead of immediately booting into the operating system (OS), such as the Windows® operating system by Microsoft®, the software prompts the user to type in a password. If the correct password is entered, the personal computer will successfully decrypt information on the HD and may place some of this information into memory. The OS will boot up, engage and read from the HD, decrypt and then use the data. For a Write operation to the HD, the OS encrypts data and then writes to the HD, adding a whole layer of software to encrypt/decrypt. Such software packages employ a software algorithm to accomplish these tasks. Unfortunately, the software can be hacked by skillful persons. The software algorithm also affects performance of the personal computer. As all the work is performed by the CPU of the personal computer in the background, performance of the personal computer is lowered.

SUMMARY

Improved systems, apparatuses and methods for securing hard drives are provided.

According to a first aspect of the invention, there is provided a system for use with a computer, the computer including a self-encrypting drive (SED), the SED including a nominal space and a pre-boot region, wherein the nominal space can be locked to prevent access to the nominal space. The system includes SED management software configured to be loaded in the pre-boot region of the SED. The SED management software includes a pre-boot operating system (OS) and an unlocking program. The unlocking program is configured (a) to execute within the pre-boot OS, and (b) upon successful authentication of a user, to unlock the nominal space of the SED.

According to a second aspect of the invention, there is provided a system for use with a computer, the computer including a self-encrypting drive (SED), the SED including a nominal space and a pre-boot region, wherein the nominal space can be locked to prevent access to the nominal space and wherein the nominal space contains a nominal OS. The system includes SED management software configured to be loaded in the pre-boot region of the SED. The SED management software includes a pre-boot OS and an unlocking program. The unlocking program is configured (a) to execute within the pre-boot OS, and (b) upon successful authentication of a user, to transfer control to the nominal OS.

According to a third aspect of the invention, there is provided a system for use with a computer, the computer including a self-encrypting drive (SED), the SED including a nominal space and a pre-boot region, wherein the nominal space can be locked to prevent access to the nominal space and wherein the nominal space contains a nominal OS. The system includes SED management software configured to be loaded in the pre-boot region of the SED. The SED management software includes a pre-boot OS and a secure recovery functionality. The secure recovery is operable to save a backup copy of the nominal OS and an image of the nominal space and to restore the nominal OS and the nominal space using the backup copy and the image.

According to a fourth aspect of the invention, there is provided a system for use with a computer, the computer including a self-encrypting drive (SED), the SED including a nominal space and a pre-boot region, wherein the nominal space can be locked to prevent access to the nominal space and wherein the nominal space contains a nominal OS. The system includes SED management software configured to be loaded in the pre-boot region of the SED. The SED management software includes a pre-boot OS and an instant transition state functionality. The instant transition state functionality is operable to save a state of the nominal OS before the pre-boot OS begins an authentication process to unlock the nominal space, to prevent the pre-boot OS from altering the saved state of the nominal OS, and to restore the nominal OS to the saved state after successful authentication of a user.

According to a fourth aspect of the invention, there is provided a system for use with a computer, the computer including a self-encrypting drive (SED), the SED including a nominal space and a pre-boot region, wherein the nominal space can be locked to prevent access to the nominal space and wherein the nominal space contains a nominal OS. The system includes SED management software configured to be loaded in the pre-boot region of the SED. The SED management software includes a pre-boot OS and a sleep mode control functionality. The sleep mode control functionality is operable to, prior to exiting sleep mode, send a credential to the pre-boot region to unlock the nominal space and transfer control to the nominal OS.

According to a fifth aspect of the invention, there is provided a method for use with a computer, the computer including a self-encrypting drive (SED), the SED including a nominal space and a pre-boot region, wherein the nominal space contains a nominal operating system (OS). The method includes creating a backup copy of the nominal OS and an image of the nominal space of the SED computer, and saving the backup copy of the nominal OS and the image of the nominal space to non-volatile storage.

According to a sixth aspect of the invention, there is provided a method for use with a computer, the computer including a self-encrypting drive (SED), the SED including a nominal space, a nominal OS, a pre-boot region, a pre-boot OS, and a basic input/output system (BIOS). The method includes: during a bootstrapping process, before control is transferred from the BIOS to the pre-boot OS, saving a state of the nominal OS; instructing the pre-boot OS not to access memory locations where the state of the nominal OS is saved;

and upon successful authentication of a user, restoring the nominal OS to the saved state.

According to a seventh aspect of the invention, there is provided a method for use with a computer, a method for use with a computer, the computer including a self-encrypting drive (SED), the SED including a nominal space, a nominal OS, a pre-boot region, and a pre-boot OS. The method includes: saving a credential for unlocking the nominal space; upon receipt of a signal indicating the computer is going to exit sleep mode, retrieving the saved credential; and sending the retrieved credential to the pre-boot region to unlock the nominal space.

According to an eighth aspect of the invention, there is provided a method for use with a server connected to a plurality of computers, each of the computers including a respective self-encrypting drive (SED), each of the SEDs including a nominal space and a pre-boot region. The method includes: detecting that one of the computers is in a hibernate mode; powering up the computer that is in the hibernate mode; sending a SED credential from the server to the powered-up computer to unlock the nominal space on the powered-up computer; backing up the nominal space of the powered-up computer; and returning the powered-up computer to the hibernate mode.

According to a ninth aspect of the invention, there is provided a method for use with a computer, the computer including a self-encrypting drive (SED), the SED including a nominal space and a pre-boot region, the pre-boot region containing a pre-boot operating system (OS) and an unlocking program, wherein the nominal space can be locked to prevent access to the nominal space. The method includes the following processes performed by the unlocking program executing within the pre-boot OS: accepting a credential for authentication; determining if the credential is valid; and, upon determination that the credential is valid, sending an SED credential to the SED to unlock the nominal space of the SED.

According to a tenth aspect of the invention, there is provided a method for use with a computer, the computer including a self-encrypting drive (SED), the SED including a nominal space and a pre-boot region, the nominal space containing a nominal operating system (OS), the pre-boot region containing a pre-boot operating system (OS) and an unlocking program, wherein the nominal space can be locked to prevent access to the nominal space. The method includes the following processes performed by the unlocking program executing within the pre-boot OS: accepting a credential for authentication; determining if the credential is valid; and, upon determination that the credential is valid, transferring control to the nominal OS.

Other aspects of the invention are also provided.

BRIEF DESCRIPTION OF THE DRAWINGS

Features and advantages of the present invention will become apparent from the appended claims, the following detailed description of one or more example embodiments, and the corresponding figures.

FIG. 4 is a flowchart of a password mapping process, in accordance with one or more embodiments.

FIGS. 5a and 5b are respective flowcharts for emergency logon processes, in accordance with one or more embodiments.

FIG. 13 is a flowchart for an instant transition process, in accordance with one or more embodiments.

FIG. 27e depicts a screenshot from a pre-boot GUI of a screen used to set authentication rules, in accordance with one or more embodiments.

Figure 1A:
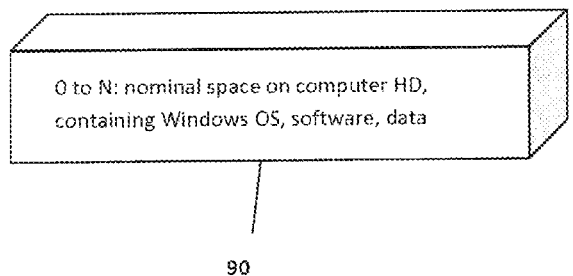
FIG. 1a depicts memory in a non-SED based personal computer.

While the disclosure is subject to various modifications and alternative forms, specific embodiments thereof are shown by way of example in the drawings and the accompanying detailed description. It should be understood, however, that the drawings and detailed description are not intended to limit the disclosure to the particular embodiments. This disclosure is instead intended to cover all modifications, equivalents, and alternatives falling within the scope of the present disclosure as defined by the appended claims.

DETAILED DESCRIPTION

The figures are not necessarily drawn to scale and certain features may be shown exaggerated in scale or in somewhat generalized or schematic form in the interest of clarity and conciseness. In the description which follows, like parts may be marked throughout the specification and drawing with like reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present disclosure provides many inventive concepts that may be embodied in a wide variety of contexts. The specific aspects and embodiments discussed herein are merely illustrative, and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

A summary of certain embodiments is now provided.

Embodiments of the invention described herein include a system for use with a computer, the computer including a self-encrypting drive (SED), the SED including a nominal space and a pre-boot region, wherein the nominal space can be locked to prevent access to the nominal space. The system includes SED management software configured to be loaded in the pre-boot region of the SED. The SED management software may include a pre-boot operating system (OS), an unlocking program configured to work with the pre-boot OS, and an access management functionality, wherein the access management functionality is configured to provide access to the nominal space to at least one user and an Administrator.

Embodiments of the invention described herein include a system for use with a computer, the computer including a self-encrypting drive (SED), the SED including a nominal space and a pre-boot region, wherein the nominal space can be locked to prevent access to the nominal space. The system includes SED management software configured to be loaded in the pre-boot region of the SED. The SED management software may include a pre-boot OS, an unlocking program configured to work with the pre-boot OS, and an access management functionality, wherein the access management functionality is configured to activate encryption for the SED-based computer.

Embodiments of the invention described herein include a system for use with a computer, the computer including a self-encrypting drive (SED), the SED including a nominal space and a pre-boot region, wherein the nominal space can be locked to prevent access to the nominal space. The system includes SED management software configured to be loaded in the pre-boot region of the SED. The SED management software may include a pre-boot OS and a pre-boot functionality capable of operating when the nominal space is locked.

According to embodiments of the invention described herein, the SED management software may also include a pre-boot graphical user interface configured to interact with a user during a pre-boot authentication process.

Embodiments of the invention described herein include a method including the steps of responding to the entry of a user's nominal credentials for an SED-based machine (the SED-based machine having a nominal space and a pre-boot region) by hashing nominal credentials of the user to create a first hash, generating a driver session key, using the driver session key to encrypt an SED credential, using the first hash to encrypt the driver session key, and requesting, when the SED based machine having its nominal space encrypted is started up, the users' nominal credentials, hashing the user's nominal credentials as entered to create a second hash, and using the second hash to attempt to decrypt encrypted driver session key.

Embodiments of the invention described herein include a method including the steps of providing a user of an SED-based machine (the SED-based machine having a nominal space and a pre-boot region) with a challenge code as a response to a lockout of the user as a result of a failure of the user to correctly enter the user's nominal credentials, responding to the entry of the challenge code by an administrator for the SED-based machine by providing the administrator with a response code, responding to the user entering the response code by unlocking the SED, and requiring the user to select a new password.

Embodiments of the invention described herein include a method including the steps of activating an emergency login functionality for a user of an SED-based machine (the SED-based machine having a nominal space and a pre-boot region) when the user selects at least one challenge question and provides an answer for each selected challenge question, and responding to a subsequent lockout of the user as a result of a failure of the user to correctly enter the user's nominal credentials by posing the at least one challenge question to the user.

Embodiments of the invention described herein include a method including the steps of setting up a profile for at least one non-administrative user of a SED-based machine (the SED-based machine having a nominal space and a pre-boot region) responsive to input from an administrator for the SED-based machine, dividing the nominal space of the SED-based machine into at least two partitions, responsive to input from the Administrator, and assigning, responsive to input from the Administrator, to each partition whether the non-administrative user has access to the partition and for each partition to which the user has access, whether the user's access is read only or read/write.

Embodiments of the invention described herein include a method including the steps of obtaining a notification from a credential provider via a hook in an SED-based machine (the SED-based machine having a nominal space with a nominal operating system (OS) and a pre-boot region with a pre-boot operating system) that a nominal old password of a user of the SED-based machine is being changed, the user also having a nominal username and an SED password, hashing the user's nominal username and the user's old password to create a first hash, using the first hash to decrypt the SED password of the user, hashing the user's nominal username and a new nominal password the user has selected to encrypt the SED password of the user, requesting, when the SED based machine having its nominal space encrypted is started up, the users' nominal username and new nominal password, hashing the user's nominal username and the user's new nominal password as entered to create a second hash, and using the second hash to attempt to decrypt the SED password of the user.

Embodiments of the invention described herein include a method including the steps of making a backup copy of a nominal operating system and an image of a nominal space of an SED-based machine (the SED-based machine having a nominal space with a nominal operating system and a pre-boot region with a pre-boot operating system) responsive to input from an administrator for the SED-based machine through an SED management console, creating a partition of a hard drive, and placing the backup copy on the partition.

Embodiments of the invention described herein include a method including the steps of saving the state of a nominal operating system of a SED-based machine (having a nominal space and a pre-boot region) during a bootstrapping process before control is transferred from a basic input/output system (BIOS) to a pre-boot operating system for an authentication process, instructing the pre-boot operating system not to access memory locations where the state of the nominal operating system is stored, transferring control from the BIOS to the pre-boot operating system for the authentication process, conducting the authentication process, retrieving the state of the nominal operating system from memory, and re-programming the nominal operating system to the saved state.

Embodiments of the invention described herein include a method including the steps of saving an administrator SED credential into memory by a sleep alert device driver upon being prompted by a signal from a central processing unit (CPU) of an SED-based computer (having a nominal space with a nominal operating system (OS) and a pre-boot region with a pre-boot OS) that the computer is going into a Sleep mode state S3, retrieving the SED credential from memory by the sleep alert device driver when prompted by a second signal from the CPU that the computer is coming out of the Sleep mode state S3, sending the SED credential to the SED to unlock the nominal space, and transferring control from the pre-boot OS to the nominal OS.

Embodiments of the invention described herein include a method including the steps of connecting a server to a plurality of SED-based machines, detecting by the server of when one of the SED-based machines has entered a Hibernate mode state S4, powering up the hibernating SED-based machine by the server, sending a SED password for the powered up SED-based machine from the server to an unlocking program on the powered up SED-based machine to unlock the nominal space on the powered up SED-based machine, backing-up of the nominal space on the powered up SED-based machine by the server, and returning the powered up SED-based machine to the Hibernate mode state S4 by the server.

Embodiments of the invention described herein include a non-transitory machine-readable medium that provides instructions that, when executed by a machine, cause the machine to perform operations of unlocking an encrypted nominal space on a computer, comprising providing on the computer a pre-boot region having an operating system, providing an unlocking program stored in the pre-boot region, configured to execute and take control of the computer when a BIOS for the computer attempts to read a sector as part of a boot-strapping process, and wherein during the execution of the unlocking software, entry of a user's credentials for an operating system of the nominal space suffices to retrieve a password to unlock the encrypted nominal space.

Embodiments of the invention described herein include a computer system comprising an electronic device operable to support an operating system (OS) environment and operable to communicate with a server system, the electronic device comprising a central processing unit; a memory array coupled to the central processing unit; an expansion bus coupled to the central processing unit and the memory array, the expansion bus capable of interfacing peripheral devices; a basic input/output system (BIOS) memory coupled to the expansion bus, comprising a BIOS security component; and an SED-based hard disk drive coupled to the expansion bus, the SED-based hard disk drive comprising a nominal operating system, a nominal space that may be encrypted and may be decrypted after a user authentication process, and a pre-boot region with a pre-boot operating system and a pre-boot library configured to support the pre-boot OS; and an unlocking software program configured to work with the pre-boot OS, and configured to transfer control directly to the nominal operating system upon a successful user authentication process.

It is noted that the expressions "nominal operating system (OS)" and "operating system of the nominal space" are used interchangeably in this disclosure.

A more detailed description of certain embodiments is now provided.

In contrast to prior art, a self-encrypting hard drive ("SED") such as Seagate DriveTrust™, for example, will encrypt and decrypt the hard drive of a personal computer using a processor or microcontroller on the SED ("SED processor" or "SED microcontroller"), instead of using the CPU of the personal computer. At least one password key for encryption/decryption is kept in the SED. This makes an SED-based system more secure than a software-based encryption system, such as those of the prior art described above. The SED-based system is also harder to hack or infect with a virus. (Although for convenience reference is frequently made herein to a personal computer, the instant disclosure is not limited to personal computers.)

The SED may use the same or similar software algorithm as the software package would use, but the method of operation is different. When a user first encounters a SED, it appears to be just like a conventional hard drive and the encryption function is turned off. If the user boots the SED with encryption on, the user will only be able to access a finite block of data. The minimum size of the finite block is usually around 128 MB. The SED will only show the user a "shadow" Master Boot Record (MBR) on the finite block (which is also called the "MBR shadow block" herein). The shadow MBR on the finite block is separate from the sectors at beginning of a nominal portion of the SED, where the nominal operating system (OS), such as Windows®, is stored and operates. (Windows® OS is used herein as an example of an OS for the nominal portion of an SED in discussions of various embodiments of the present disclosure, but other operating systems for the nominal portion of an SED could also be used.) The shadow MBR on the finite block is a special area of the hard drive and is typically a read-only section by default. With an SED, the Windows® (or other nominal) OS does not know whether the data is encrypted: all data is moved into and out of the SED as normal, unencrypted data.

To activate encryption on the SED, an SED-related management and configuration software running in the Windows® (or other nominal) OS will send special commands to take ownership of the administrative access to the drive. After this, only the SED-related management and configuration software will be able to lock and unlock the encryption on the SED drive. To complete the activation process, the SED-related management and configuration software will temporarily grant write access to the MBR shadow block and place an unlocking software program in the MBR shadow block and then revert the MBR shadow block to read-only. When a user turns on the PC, the unlocking software program executes and prompts the user for authentication. If the user authentication is successful, then the unlocking software in the MBR shadow block will unlock the nominal portion of the SED. This exposes the read/writeable nominal portion of the SED, which stores the Windows® (or other nominal) OS, software applications, files and data.

SED-based systems are more secure than software-based encryption systems. In a non-SED HD with a software-based encryption, the unlocking software is stored in the sectors of nominal HD space, not in an MBR shadow block. In addition, in a software-based encryption system, the sectors of the nominal HD space containing the unlocking software is typically read/write space, which is less secure than read only.

Figure 1B:
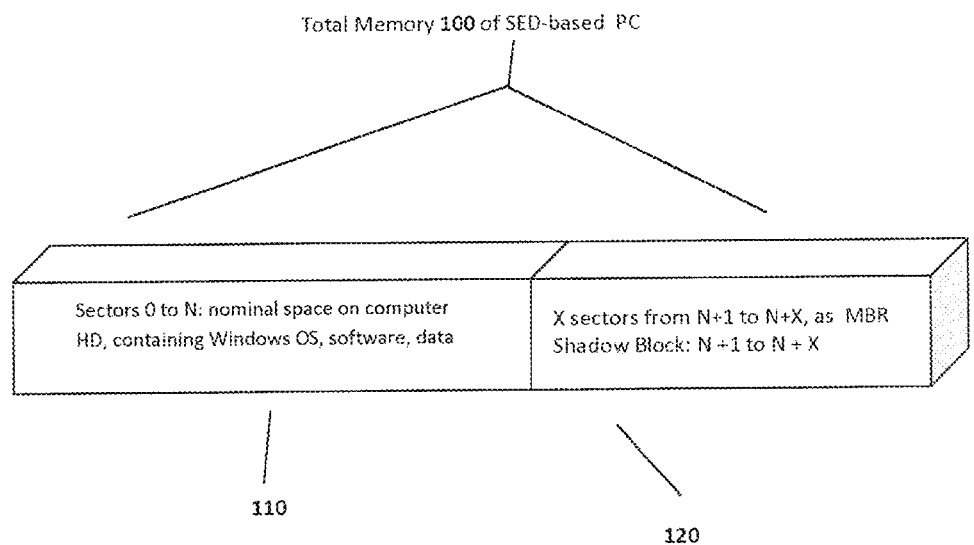
FIG. 1b depicts memory in an SED based personal computer, in accordance with one or more embodiments.

FIG. 1a depicts memory in a non-SED based personal computer; FIG. 1b depicts memory in an SED-based personal computer. Referring to FIG. 1a, the nominal memory space 90 on the non-SED based personal computer is also the total memory of the personal computer. If the non-SED based personal computer is advertised as having 100 GB, the total memory space 90 is 100 GB.

Referring to FIG. 1b, the nominal space 110 on the SED personal computer may be represented as sectors 0 to N. Unlike non-SED based personal computers, the SED-based personal computers have X additional sectors 120 of memory in the SED which comprise the finite block and which are used as (and may also be called) the MBR shadow block 120. The MBR shadow block 120 of X sectors may be represented as a region of sectors N+1 to N+X. This N+1 to N+X sector region 120 is normally hidden and is not part of nominal space 110. If an SED-based system is sold by a manufacturer having a nominal space 110 of 100 GB, for example, the actual physical storage space 100 may be 110 GB, with the MBR shadow block 120 of X sectors (from N+1 to N+X) providing the extra 10 GB. If one were to start the PC with encryption on, the nominal space 110 of 100 GB would be encrypted and locked and would not be accessible to the user.

In computers, software stored on the motherboard called a Basic Input/Output system ("BIOS") working with a microcontroller, controls the keyboard and the booting process, and identifies and configures hardware for the personal computer. (As BIOS controls the booting process, etc., it may also be referred to herein as "initialization code.") If the user starting the SED-based personal computer with encryption on went into the BIOS to determine the size of the SED memory, the BIOS would only show the unlocked MBR shadow block 120 of 10 GB as the apparent size, because the nominal space 110 is invisible to the user and to BIOS until the proper password is entered and accepted.

When encryption is on, the nominal space 110 of sectors 0 to N on the SED-based personal computer is encrypted. In the example above, this would be the 100 GB space on the SED which contains the OS such as Windows®, software programs and data. As mentioned above, the SED-based personal computer nominally having N sectors will also include the additional region of sectors N+1 to N+X, used as the MBR shadow block 120, which is often located either at the beginning or at the end of the nominal space 110 on the SED.

The SED-based system does not expose the unlocked MBR shadow block 120 (sectors N+1 to N+X) until encryption is activated and the nominal encrypted area is locked. But with encryption on, when the personal computer is powered up, because the nominal space 110 of 0 to N is encrypted, hidden, inaccessible and locked, the sector beginning at N+1 is the first sector that can be accessed. When encryption is activated and user seeks a byte at address 0, the user will not obtain the actual address 0, which is protected and not accessible; the SED instead returns N+1, the first sector of the MBR shadow block 120, which contains an unlocking software program. Because the MBR shadow block 120 is read-only and protected, the MBR shadow block 120 cannot be erased or overwritten by a hacker. And while encryption is activated, the 0 to N sector 110 in the body of the SED cannot be accessed or copied.

In a computer which is not protected by an SED-based system, a hacker may be able to hack into data on the computer using brute force decryption techniques. But in SED-based systems, the hacker cannot read or access the data on nominal space 110 of the HD, because it is encrypted, hidden and locked, and the hacker cannot write to the MBR shadow block 120, which is read-only.

In an SED-based system, a small unlocking software program is stored in the MBR shadow block 120; that is, some-where in the space of sectors N+1 to N+X, which is usually at least 128 MB and is 10 GB in the example described above. The unlocking software program is executed and asks for password and/or requests some other form of authentication (e.g. fingerprint, smart card, etc.). When the user responds by entering a password and/or supplying another form of authentication, the credential to unlock the SED is sent by the unlocking software program to the SED. If the credential is correct, the MBR shadow block 120 becomes hidden while the 0 to N sectors 110 containing the Windows® (or other nominal) OS, software applications and data become unlocked and visible. If the user accesses BIOS at this time, the total size of the SED will appear to be 0 to N sector region 110 or the nominal SED size of 100 GB in the example described above. At this point, the MBR shadow block 120 will be hidden from BIOS and the user. The Windows® OS (or whatever OS is used for the conventional operations for the computer) will begin to boot up the computer.

SED-based systems are very secure systems. Even if someone steals the SED-based computer, removes the SED, and places the SED into another PC, all the unauthorized user can see is the 10 GB of unlocking area in the SED and because that 10 GB area is read-only, the unauthorized user cannot write to it or infect it with a virus. The unauthorized user cannot access the remaining 100 GB nominal portion of the SED containing the Windows® OS, the software applications and the data.

Considering the start up process in more detail, in a non-SED based system, the BIOS process of starting up the personal computer begins with a Perform Power-On-Self-Test (POST); followed by a memory test; a check for devices present, reading Sector 0; putting Sector 0 into memory; transferring control to Sector 0 (generally to 512 bytes of that sector) and beginning execution of the OS. This is called a bootstrapping process.

The bootstrapping process is different for an SED-based system. When the SED-based personal computer is powered on in a locked/encrypted mode, the BIOS system attempts to read sector 0 of the SED. But the BIOS system cannot do so because the 0 to N sectors 110 are encrypted, hidden, and locked. The microcontroller instead selects the first readable sector, which is the first sector of the MBR shadow block 120, where the unlocking software program is located. The BIOS accesses the first sector of the MBR shadow block 120, which puts the unlocking software program, instead of the OS for the nominal portion of the SED, such as Windows®, into memory. Then BIOS transfers control to the unlocking software program. The unlocking software program may ask for more sectors, but SED will only provide access to additional sectors of the MBR shadow block 120. When the unlocking software program is in memory and running, the unlocking software program asks the user for a password (and/or other form of authentication); and when the user enters the password (and/or provides the authentication) the unlocking software program sends an SED unlock credential to the SED microcontroller. Typically the SED unlock credential is protected by the user authentication and the SED unlock credential is not accessible unless the user successfully authenticates. If the SED unlock credential is correct, the SED moves into an unlocked mode and sectors 0 to N become accessible. The unlocking software program then reads sector 0 containing actual SED data and puts sector 0 containing the Windows® (or other) OS into memory. The unlocking software program transfers control to sector 0 and the CPU of the personal computer begins execution of the OS. Thus the unlocking software program performs the last steps usually performed by the BIOS in non-SED based systems.

"The Trusted Computing Group (TCG) is an international industry standards group. The TCG develops specifications amongst its members. Upon completion, the TCG publishes the specifications for use and implementation by the industry." See: http://www.trustedcomputinggroup.org/about_tcg An organization within the TCG, the Storage Work Group (SWG), focuses on Specifications for secure methodologies for computing storage and has set up several Security subsystem Classes (SSCs), which comprise different classes of Core Specification compliance, to address different needs of users. Specifically, the Opal SSC addresses "fixed media storage devices on consumer and enterprise storage systems, such as notebooks and desktops." See: http://www.trustedcomputinggroup.org/resources/storage_work_group storage_security_subsystem_class_opal_summary/

Incorporated herein by reference in its entirety, the "TCG Storage Architecture Core Specification, Specification Version 2.00 Final Revision 1.0, Apr. 20, 2009" may be found at http://www.trustedcomputinggroup.org/files/static_page_files/B6811067-1D09-3519-ADDAFC18E3A87CB2/Storage_Architecture_Core_Spec_v2_r1-Final.pdf.

Incorporated herein by reference in its entirety, the "TCG Storage Security Subsystem Class: OPAL Specification Version 1.00 Revision 3.00, Feb. 4, 2010" may be found at http://www.trustedcomputinggroup.org/files/static_page_files/9FE14508-1D09-3519-AD7D21A695E9B8EE/Opal_SSC_1.00_rev3.00-Final.pdf.

The OPAL hard drive standard includes commands used to activate the encryption on an SED-based system and to lock and unlock the encrypted SED. But the actual implementation of activating the encryption, locking and unlocking the SED is provided by independent software vendors (ISVs).

The OPAL HD standard currently allows up to four users and one Administrative user to unlock the hard drive of a single personal computer. Of course, the number of permitted users may change in the OPAL or other standards from time to time. This requires up to five authentication tokens, pins or passwords (one for each of the four users and one for the Administrator user) to unlock the hard drive under the OPAL HD standard. But this may not be enough. When the SED is turned off and goes into locked mode, a user will need to enter his or her Windows® (or other nominal) OS password in order to boot up and obtain access to the nominal hard drive space. The usernames and passwords used to unlock the SED are not used for the Windows® OS. A particular user named John Doe might be recognized by the Windows® OS as "JohnDoe," having Windows® password "sftx123." But the SED unlock credential is just a PIN or password and would be different from the Windows® password. So a maximum of only five users (under current OPAL standards) can unlock the SED without having to resort to sharing the unlock password/PIN of the SED among multiple users. However, it is inadvisable to permit such sharing, as it is a security risk for users to share passwords. An enterprise such as a business or governmental entity may have more than one level of security. For example, some information in the enterprise's computer system may be available to the public or to everyone in the firm with no authentication required. This may include a business's public website. But other material within the enterprise's computer system may be available only to those who log in with a particular type of security, such as a password. A third level of material may be highly confidential; access to the third level material may require special authorization or supplemental authentication. In addition, some enterprises may provide a certain level of access to its customers and/or suppliers, based on one or more levels of authentication. Single Sign On (SSO), also known as "Reduced Sign On"

(RSO) allows a user to sign on once and enjoy the full extent of the user's proper level of access to an enterprise computer system, without having to re-enter his username or password when going from one level of access to another. There may also be links on the enterprise firm's website, for example, to suppliers who provide employee benefits. Under SSO/RSO, an employee who has been authenticated may click on such a link and be taken to the supplier's website to access the employee's benefit information, without having to provide additional authentication.

Figure 2:
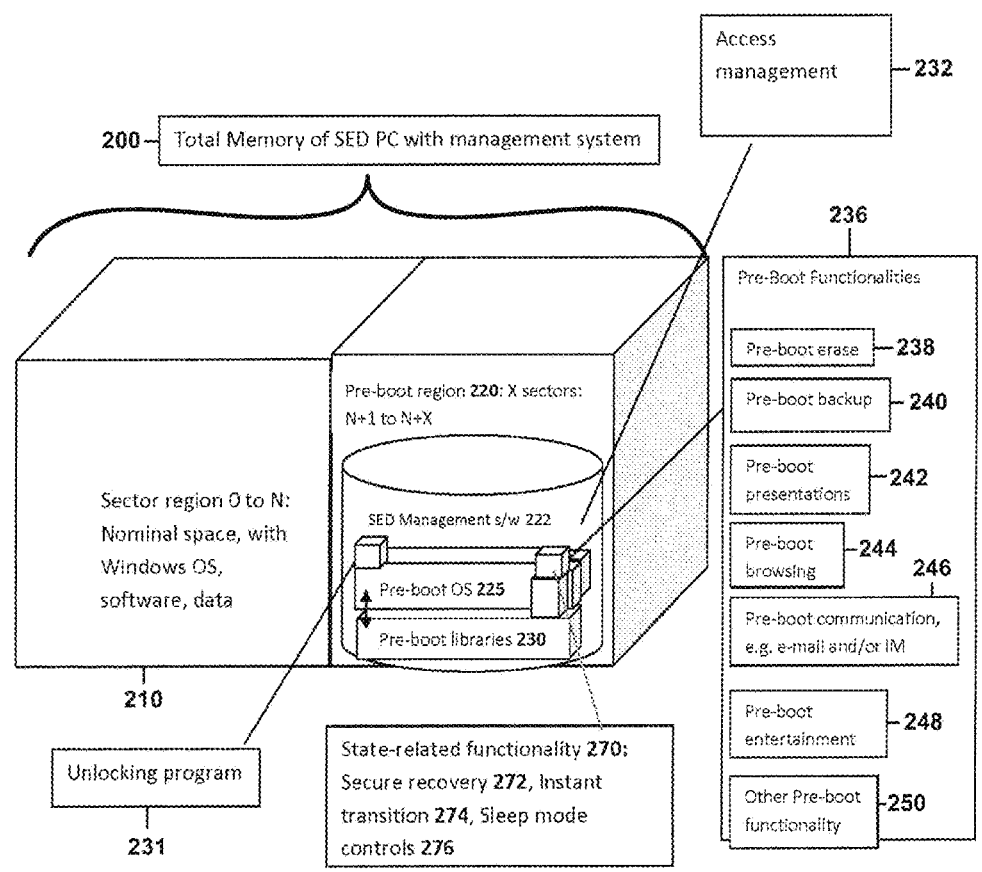
FIG. 2 depicts memory, including SED management software, in an SED based personal computer, in accordance with one or more embodiments.

Embodiments of the present invention provide management of SED-based security and additional functionality to improve and enhance user experience of SED technology. FIG. 2 depicts memory, including SED management software, in an SED-based personal computer, in accordance with one or more embodiments. As shown, the total memory space 200 in an SED-based system includes sectors 0 to N as a nominal space 210 and X additional sectors (sector region 220 including sectors N+1 to N+X) as the MBR shadow block 220 or the "pre-boot region" 220. The pre-boot region 220 may vary in size, and may be as small as 128 bytes but 10 GB is sufficiently large to include SED management software 222 with a pre-boot operating system 225 ("pre-boot OS") and one or more pre-boot libraries 230, an unlocking program 231 and additional useful functionality. The inclusion of the pre-boot OS 225 and the pre-boot libraries 230 in the SED management software 222 allows for additional functionality such as access management 232 (which may include password facilitation and mapping) and pre-boot functionalities 236, such as pre-boot erase 238, pre-boot backup 240, pre-boot presentation 242 of presentations created in programs such as PowerPoint® (or pre-boot work utility for other work product), pre-boot browsing 244, pre-boot communication 246 including without limitation e-mailing and/or instant messaging ("IM"), pre-boot entertainment 248 and other secure pre-boot functionality 250. Some of the additional functionality listed is discussed in greater detail below.

The pre-boot OS 225 mentioned above is preferably a selectively chosen subset or "kernel" of an existing operating system program, such as Linux®. Ordinary operating systems like Linux® or Windows® are large, with the Linux® OS currently on the order of 100 MB in size. Linux® has a configuration mechanism called a Linux® config file, which may be used to create the kernel of Linux® comprising the pre-boot OS 225 by selecting the Linux® components needed for the pre-boot OS 225. Using Linux® as a starting point, the pre-boot OS 225 may be configured to take up about 15 MB of space and may start up in about five seconds. The pre-boot OS 225 preferably has graphics and other capabilities. For example, an unlocking software program 231 typically requires supporting libraries and code for key entry, drawing, and graphics, which are present in Linux®. Linux® also has drivers for biometric devices (such as fingerprint authentication devices) and smart cards, which are useful for security applications. An unlocking software program 231 is preferably part of the SED management software 222, is stored in the pre-boot region 220, and is written with the pre-boot OS 225, such as the Linux® kernel OS. As an alternative to creating the pre-boot OS 225 from Linux®, the pre-boot OS 225 may be created (if permitted) as a subset of some other operating system such as DOS, OS2, Free BSD and/or Android or may be an original creation. The Linux® kernel comprising the pre-boot OS 225 may be used to support the Pre-Boot Authentication (PBA) process, which is the process of using authentication to unlock and decrypt the nominal portion of the SED.

As depicted in FIG. 2, in accordance with one or more embodiments, the SED management software 222 may include one or more state-related functionality 270, such as secure recovery 272, instant transition functionality 274, and sleep mode controls 276. The state-related functionalities 270 are discussed in greater detail in the following paragraphs.

Figure 12:
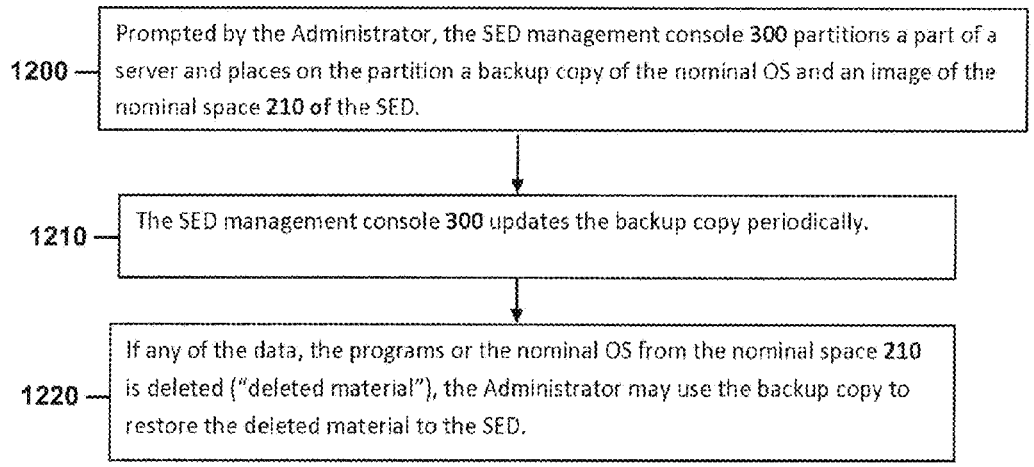
FIG. 12 is a flowchart for a secure recovery process, in accordance with one or more embodiments.

FIG. 12 is a flowchart for a secure recovery 272 process, in accordance with one or more embodiments. In one or more embodiments, the secure recovery functionality 272 provides for disaster recovery. Many events, such as a virus, willful physical destruction, a storm-related damage or an earthquake, to name a few, can cause memory loss in computers. Referring to FIG. 12, at step 1200, through the SED management console 300, the Administrator may create a separate partition of the server and place on the partition a backup copy of the nominal OS and a ghost image of the nominal space 210, which may include all the data and programs on the nominal space 210. Alternatively, the back-up copy may be stored on a secondary hard drive, USB drive or any convenient location. At step 1210, the back-up copy may be updated on a periodic basis. At step 1220, if one or more of the data, the programs or the nominal OS from the nominal space 210 is deleted ("deleted material"), the Administrator may use the backup copy to restore the deleted material to the SED.

As depicted in FIG. 2, in accordance with one or more embodiments, the transition from the pre-boot process to the nominal OS may be performed as an instant transition using instant transition functionality 274. FIG. 13 is a flowchart for such an instant transition process, in accordance with one or more embodiments. When the SED-based computer is powered on, the pre-boot OS 225 (such as the Linux® kernel OS) loads and begins running Once the unlocking program 231 completes authentication, as described above, the unlocking program 231 performs the last few steps that BIOS performs for non-SED-based systems in order to transfer control to the nominal OS. The SED management software 222, as part of the instant transition functionality 274, includes a re-set module that runs the BIOS. If the unlocking software program 231 transferred control to the Windows® OS, the Windows® OS would behave as if the control was transferred from BIOS and as if the programming and state of the nominal space 210 were as BIOS left it. But, in at least one embodiment, upon the previous shutdown, the SED put the nominal space 210 of the PC in a protected mode, as depicted in step 1300 of FIG. 13. If the unlocking program 231 transferred control directly to the Windows® OS, the Windows® OS would not react properly. Instead, as depicted in step 1310, after the SED-based computer is powered on and during BIOS operations before the pre-boot authentication process begins, the re-set module saves the state of the nominal OS in memory before the pre-boot OS begins, and instructs the pre-boot OS not to access those memory locations where the state of the nominal OS is stored, thereby preventing the pre-boot OS from altering the saved state of the nominal OS. As depicted in step 1320, control is transferred from BIOS to the pre-boot OS for the authentication process. After successful authentication and after the unlocking process is complete, as depicted in step 1330, the re-set module re-programs the system back to the state that BIOS left it in. This allows for a smooth transfer from one OS to another.

As depicted in FIG. 2, in accordance with one or more embodiments, the sleep mode controls 276 involve states that a computer can be put into. A user enrolls the first time the SED management software 222 is used, and the user uses the SED management software 222 to unlock the nominal space 210 on the SED every time the user boots up. One of the states of a computer is state S0, in which all computer functionality is on. In state S1, the CPU is idle, but everything else on the computer is powered and running. In state S2, the CPU is idle, and some of the other devices, such as USB ports, may have been powered down.

When the user is finished using the PC, the user may turn off the computer, putting the computer in state S5, in which all the devices on the computer are turned off. When the user powers the computer on from state S5, the computer boots, all applications are re-started, and all devices are initialized. As alternatives to turning the computer off, the user may put the computer into a Sleep mode, state S3, or a Hibernate mode, state S4. Returning the computer to an active state such as S0, S1 or S2 may be accomplished more quickly from state S3 or S4 than from state S5.

In Sleep mode, state S3, the computer memory is on. In state S3 the CPU is also on, but in a "Halt state," using minimal power. Because of the minimal power usage, the computer may stay in Sleep mode, state S3, for a long time before the computer's battery is depleted.

In Hibernate mode, state S4, the computer memory and the CPU are both off, so waking the computer up from this state is similar to starting a computer that has been turned off. In entering the Hibernate mode, state S4, the entire memory is copied to a file in the SED, then the computer is turned off. Accordingly, due to this copying of the entire memory, both entering and exiting the Hibernate mode, state S4, require a long time. It also takes a long time to restore the RAM memory, which may be accomplished by placing the saved data back into the RAM memory when the computer is powered on. The computer can stay in the Hibernate mode, state S4, indefinitely because no power is consumed.

A normal way of starting an SED-based computer is to transition the SED-based computer from an S5 state to an S0 state. To do this, the boot process proceeds as previously described herein, with the BIOS transferring control to the pre-boot OS for authentication and unlocking, and the SED management software 222 transferring control back to the Windows® (or other nominal) OS thereafter. To start a computer from the Hibernate mode, state S4, the state of machine saved on the SED is restored. When computer comes out of the Hibernate mode, the BIOS restarts POST and, at the end of POST, transfers control to the pre-boot OS, which performs authentication and an unlocking process. The re-set module then passes control to the Windows® (or other nominal) OS. The Windows® OS recognizes that the Windows® OS is resuming from the Hibernate mode and retrieves the state of the machine that was saved on the SED.

When the CPU is running a code sequence and the user puts the computer into Sleep mode, state S3, the CPU turns off power to the SED, but does not power off other devices, the memory (such as the RAM memory) or the CPU itself. The CPU halts on one instruction in the sequence of code it was running, placing the computer into Sleep mode, state S3. When the user powers up the computer from Sleep mode, state S3, this forces an interruption on the CPU. In a non-SED-based computer, when the CPU receives the interruption and powers up devices, the CPU then returns to the instruction at which it halted previously (to enter the sleep mode) and starts executing again.

But this may create a problem in an SED-based computer because when the SED-based computer is powered on, the SED goes back to starting from the pre-boot area, preparatory to starting the authentication process. The nominal space is not visible. The CPU is expecting to return to the instruction it was executing, but the sequence of code containing that instruction is in the locked nominal space. So in attempting to return to the instruction at which it halted the CPU receives data it will interpret as garbage input or an error, and this will likely cause the computer to crash.

To prevent this situation, the nominal space would have to be unlocked to allow the CPU to read from the nominal space and return to the instruction in the code sequence it was executing before entering the Sleep mode, state S3. The CPU cannot ask the user for the SED username or password needed to unlock the SED. The pre-boot OS cannot ask the user for the username and the password from the Sleep mode, state S3, because the first read operation that the CPU will attempt from the SED will crash the system, as the only thing visible in the SED is the unlock area and the SED is locked.

Figure 14:
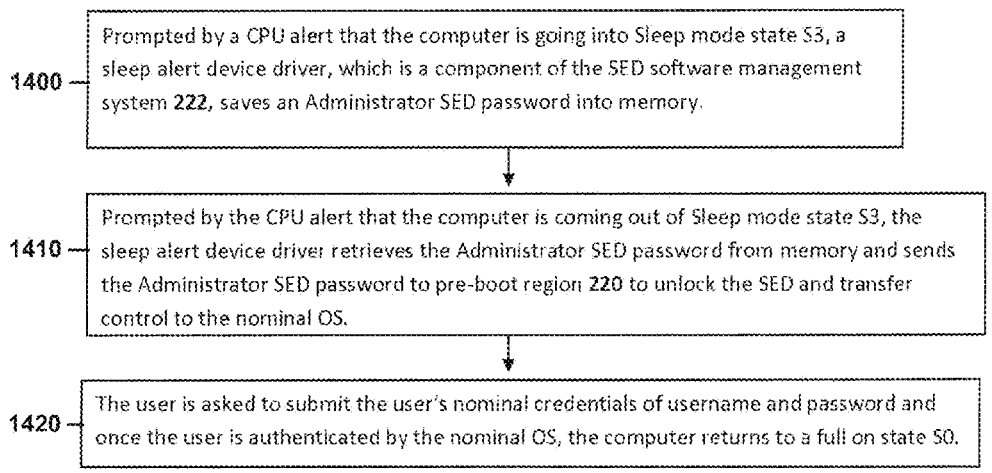
FIG. 14 depicts a flowchart for a sleep mode control, in accordance with one or more embodiments.

To address this problem created by using the Sleep mode, state S3, with an SED-based computer, in one or more embodiments, the SED software management system 222 may include one or more of the sleep mode controls 276. In one or more embodiments, the SED software management system 222 includes a low level sleep alert device driver. FIG. 14 is a flowchart for a process of sleep mode control in accordance with one or more embodiments. When going into Sleep mode, state S3, the CPU tells all devices that the computer is going into Sleep mode, state S3. When the CPU comes out of Sleep mode, state S3, the CPU tells all devices that the computer is coming out of Sleep mode, state S3. Referring to FIG. 14, in step 1400, when the sleep alert device driver receives the signal from the CPU that the computer is going into Sleep mode, state S3, the sleep alert device driver saves an Administrator SED password into memory. In step 1410, prompted by the CPU alert that the computer is coming out of Sleep mode, state S3, the sleep alert device driver retrieves the Administrator SED password from memory and sends the Administrator SED password to the pre-boot region to unlock the nominal space and transfer control to the nominal OS, such as Windows® OS. In step 1420, the user is asked to submit the user's nominal credentials of username and password, and once the user is authenticated by the nominal OS, the computer returns to a full on state S0.

Alternatively, if the operation of saving the unlock Administrator password into memory is considered a security risk, sleep mode controls 276 may include disabling the Sleep mode, state S3, using the SED Management console 300, which is discussed in more detail below. In another embodiment, the Sleep mode, state S3, may be disabled, but if the user selects the Sleep mode, state S3, the computer instead goes into the Hibernate mode, state S4.

Referring again to FIG. 2, the presence of the pre-boot OS 225 and the pre-boot libraries 230 in the pre-boot region 220 allows for one or more additional pre-boot functionalities 236 which may be used by a user while the nominal space 210 is in the locked condition. The pre-boot functionalities 236 may include a pre-boot erase functionality 238, a pre-boot back-up functionality 240, a pre-boot presentation functionality (or work utility) 242, a pre-boot browsing functionality 244, a pre-boot communications functionality 246, a pre-boot entertainment functionality 248 and other pre-boot functionality (ies) 250. In accordance with one or more embodiments, while in the Windows® environment, the user may press a button on the keyboard and the computer will be switched into the pre-boot region 220 of the SED, with the pre-boot OS 225 running to access pre-boot functionalities 236. This approach may expose a hole in that a hacker may be able to access the unlock portion of the HD. In alternative approaches, the user shuts down the computer or enters the Hibernate mode, state S4, and boots into the pre-boot OS 225 to use the pre-boot functionalities 236. The pre-boot OS 225 may be programmed to turn on hardware only as needed, which may make the pre-boot functionalities 236 powerefficient. If the computer has been turned off, the user just has to e.g., open the laptop and turn on the computer. The user does not have to boot up the OS for the nominal space 210, such as Windows® OS.

As depicted in FIG. 2, in accordance with one or more embodiments, the pre-boot erase functionality 238 implements the SED management software 222 cryptographic erase in the pre-boot region 220. Using the SED management console 300, the Administrator may send an erase command to the pre-boot region 220 of the SED. The erase command wipes out the encryption keys/passwords from the pre-boot region 220 of the SED. Without the passwords, the nominal space 210 of the SED cannot be decrypted. This feature may also be disabled by the Administrator for all client personal computers.

Figure 15:
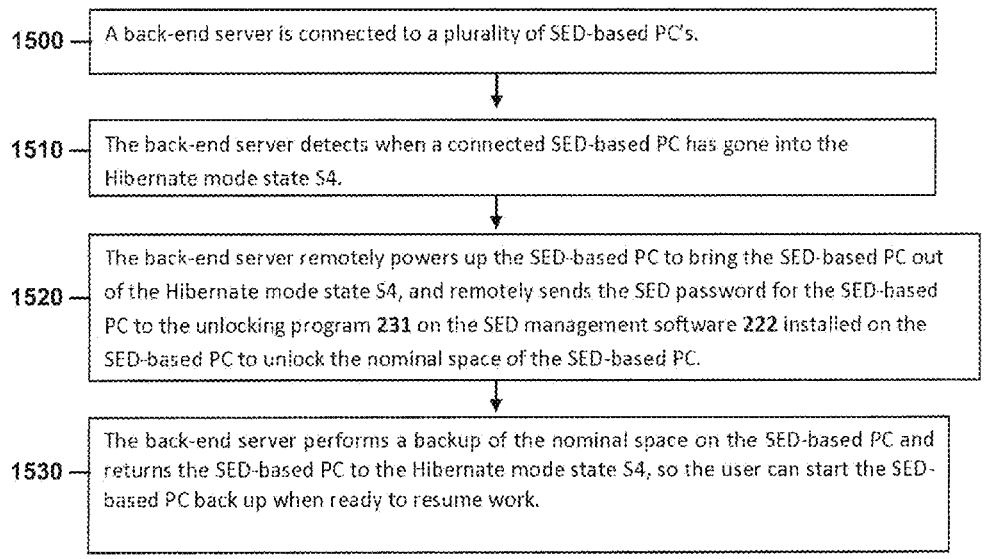
FIG. 15 depicts a flowchart for a back-up process suitable for use in an enterprise setting, in accordance with one or more embodiments.

As depicted in FIG. 2, in accordance with one or more embodiments, the pre-boot back-up functionality 240 may backup the nominal space 210 onto a USB HD drive. FIG. 15 depicts a flowchart for a back-up process for use in an enterprise setting, in accordance with one or more embodiments. Referring to step 1500 in FIG. 15, in some embodiments suitable for enterprise applications, a server, such as a back-end server is connected to a plurality of SED-based PC's. The number of SED-based PC's connected to the back-end server may be a thousand or more. In step 1510, the back-end server detects when a connected SED-based PC has entered the Hibernate mode, state S4. In step 1520, the back-end server powers up the hibernating SED-based PC to bring the SED-based PC out of the Hibernate mode, state S4, and sends the SED password to the SED-based PC, to be used by the unlocking program 231 of the SED management software 222 installed on the SED-based PC, in order to unlock the nominal space of the SED-based PC. Powering up the PC and sending the SED password to the unlocking program 231 may be performed remotely by the back-end server. In step 1530, the back-end server performs a backup of the nominal space 210 on the SED-based PC and returns the SED-based PC to the Hibernate mode, state S4, so the user can start the SED-based PC back up when the user is ready to resume work.

In accordance with one or more embodiments of the present disclosure, a pre-boot browsing functionality 244 permits accessing the Internet and browsing when the nominal space 210 of the computer is locked. To accomplish the pre-browsing functionality 244, a browser operable with the pre-boot OS 225 is included in and is accessible from the pre-boot region 220. Because the user is browsing with the nominal space 210 (where actual programs and data are located) locked, malware and viruses which may be present on websites cannot infect actual data. The pre-boot region 220 is read only, so it too cannot be damaged. If one has a laptop in the car, the user may be able to use GPS on an SED-based laptop computer, using the pre-boot OS 225.

The use of the SED management software 222 with the pre-boot OS 225 and pre-boot functionalities 236 is not limited to PCs. One could load SED management software 222 with the pre-boot OS 225 and pre-boot functionalities 236 onto drives of other devices such as Netbooks, e-books, mobile telephones, notebooks or other portable devices. In one or more embodiments, the drive onto which the SED management software 222 is loaded may be made read-only or may be partitioned to include sectors outside of the pre-boot region for read/write space.

As depicted in FIG. 2, in accordance with one or more embodiments, with regard to the pre-boot presentation functionality 242, a user may complete a presentation in the Windows® environment, for example in Windows® Power-Point®, on the nominal space 210 in the SED, and then the user may right-click on the presentation document to display an option to send the document to the pre-boot region 220. Then, for example, the computer may be put into a Hibernate mode, state S4. When the user arrives at a meeting, user can boot up the computer from the Hibernate mode. The BIOS will then bring up the pre-boot OS 225 and unlocking program 231. The presentation document will also appear on the screen and the user may begin the presentation using the pre-boot OS 225, without unlocking the nominal drive or exposing the Windows® environment. When the user boots into Windows® OS of the nominal space, the user has the ability to communicate and move data from Windows® OS/the nominal space into pre-boot region 220 and the reverse. The documents which can be so moved are not limited to presentations. Other files and data, such as documents written in word processing programs or spreadsheets or other useful documentation and data could also be moved and used in the pre-boot region 220 with the pre-boot OS 225.

As depicted in FIG. 2, in accordance with one or more embodiments, the pre-boot communications functionality 246 may include communications such as e-mail, instant messaging and texting available via the pre-boot region 220. The appropriate programming, which can work with the pre-boot OS 225, is loaded in the pre-boot region 220. As with the pre-boot browsing functionality 244, to access the pre-boot communications functionality 246, the user merely opens the lid of the laptop PC. Without unlocking the nominal space 210 or booting up the Windows® OS, the user can access an e-mail client or other communications program. In order to maintain access to e-mails that the user has access to in the Windows® OS archival files, the PST file in Outlook® may be copied into the pre-boot OS 225, so the user is opening the same PST file both in the pre-boot region 220 and in the Windows® OS.

If a user is using e-mail in the Windows® OS and receives an e-mail with a questionable attachment, the user could put the computer in Hibernate mode, state S4, turn the computer back on, boot into the pre-boot region 220 and open the e-mail. The user may safely open the e-mail because the nominal space 210 of the SED is locked and the pre-boot region 220 is read only. The pre-boot communications functionality 246 also has low power requirements and so may promote a longer battery life because only the required devices need be powered up. If one is checking e-mail, one does not require a CD-ROM player to be powered up along with a webcam or many other devices.

As depicted in FIG. 2, in accordance with one or more embodiments, the pre-boot entertainment functionality 248 may include the use of an appropriate set of pre-boot libraries 230. Entertainment such as movies, games and music may be accessed on the pre-boot region 220 of the SED. A parent on an airplane may allow a child to use a PC to watch a movie with confidence using the pre-boot entertainment functionality 248 because the nominal space 210 is locked and the child cannot accidently delete important data.

Figure 3:
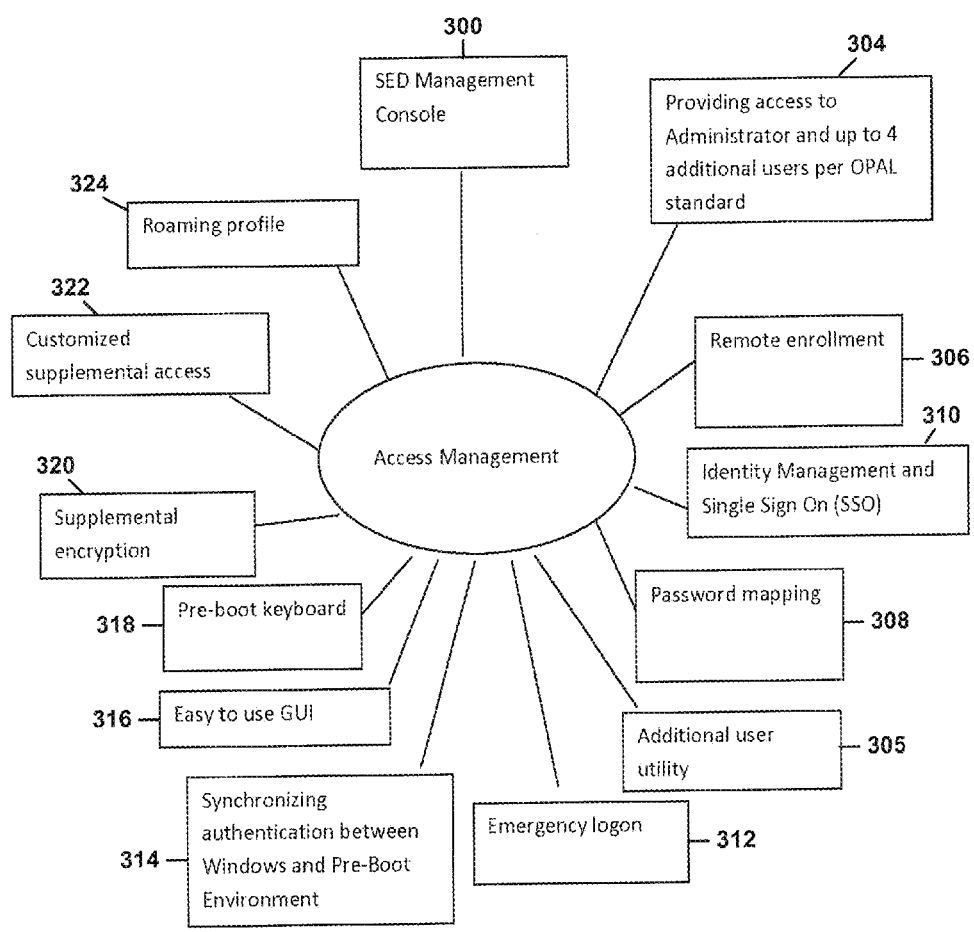
FIG. 3 depicts an access management functionality, which may be included in SED management software, in accordance with one or more embodiments.

In accordance with one or more embodiments, the access management functionality 232 may include several features such as depicted in FIG. 3. Such features include an SED management console 300, a utility for providing access 304 for up to four users plus an Administrator in compliance with the OPAL standard, an additional user utility 305, a remote enrollment utility 306, a password mapping utility 308, an identity management and single sign on ("SSO") utility 310, an emergency logon utility 312, an authentication synchronizing utility 314 for synchronizing pre-boot authentication with authentication for the nominal OS such as Windows®, an easy-to-use pre-boot GUI 316, one or more pre-boot keyboard functions 318, a supplemental encryption utility 320, a customized supplemental access utility 322, and a roaming profile utility 324. Some of these features ("enterprise features") are designed for enterprise operations, such as businesses, governmental entities, non-profit organizations, or any context in which more than one user may require routine access to the same personal computer. Thus, enterprise features may also be useful, for example, in schools or university settings, and in family contexts where computers are shared. The SED management software 222 includes functionality for activating an SED encryption feature and interacting with a user through a pre-boot GUI 316, described in more detail below and which facilitates a process of the user inputting information regarding domains, usernames, passwords and/or authentication, such as fingerprint data, into pre-boot region 220.

Depicted in FIG. 3, the SED management console 300 is an enterprise feature which may be included in the access management functionality 232 in accordance with one or more embodiments. The SED management console 300 may be used to activate encryption for a SED-based computer and can facilitate managing multiple users of an SED-based personal computer in various ways. The encryption activation process may include downloading the SED management software 222, the pre-boot OS 225 and an unlocking program 231 into the pre-boot region 220. Although the pre-boot region 220 is read only, the download may be accomplished by inclusion, in the SED management software 222, of an administrative pin, which unlocks the pre-boot region 220 to allow the download. Alternatively, the SED management software 222, the pre-boot OS 225 and the unlocking program 231 may be pre-installed on the pre-boot region 220, for example, before the SED(-based computer) is sold to a customer. In accordance with some other embodiments, hardware implementations of the software and systems described for real time functions are described. Real time implementations of the SED software and system embodiments of the present disclosure may be used to secure a Smart Phone, navigation device, or any other real time system in which a hard disc drive or solid state drive is present.

Non SED-based management consoles do not enroll users for SED-based encryption and do not activate encryption. The SED-based management console 300, in accordance with one or more embodiments, enrolls users for SED-based encryption and activates encryption. This functionality may be useful for enterprise applications, such as for use by businesses and governmental entities. With the SED management console 300, the first user enrolled is designated an Administrator. In enterprise functions having a server, the SED management console 300 is on the server side, so that the Administrator, who may be, for example, an IT manager, can see and use the SED management console 300.

In one or more embodiments, the operation of the SED management console 300 complies with the OPAL standard. The SED management console 300 may be configured to comply with other or future standards. The OPAL standard allows for up to four users, in addition to the Administrator. The Usernames and passwords of the four additional users may be represented as U1P1 to U4P4, where "U1" stands for the first additional user's username (which may also include the first additional user's domain, such as in the format "domain/username) and "P1" stands for the password of the first additional user. The Administrator can designate other users as administrators or as non-administrative users. Referring to FIG. 3, using the SED management console 300, the Administrator may provide access 304 to the Administrator and Y additional users, where Y is a whole number between one and four, each with an individual username. This is discussed in greater detail below.

Figure 8:
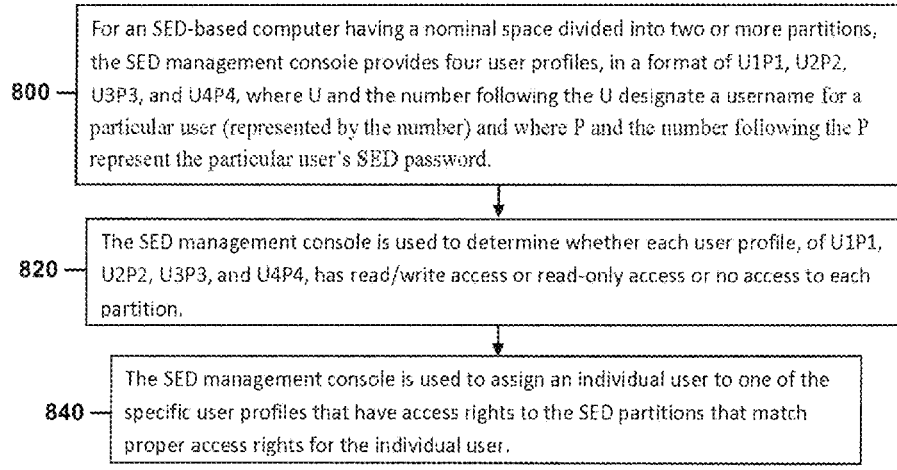
FIG. 8 is a flowchart for a process to use an SED management console to customize user access, in accordance with one or more embodiments.

Using the SED management console 300, the Administrator can partition the nominal space 210 on the SED to customize access. FIG. 8 is a flowchart for a process to use the SED management console 300 to customize user access, in accordance with one or more embodiments. Referring to FIG. 8, the SED management software 222 includes a methodology providing, in step 800, for four OPAL non-Administrator users, each being assigned to one of the profile "buckets" U1P1, U2P2, U3P3, or U4P4. In this regard, using the SED management console 300, the Administrator may divide the personal computer's nominal space 210 into two or more partitions. Using the SED management console 300, the Administrator can create a profile for each bucket representing a user and, in step 820, stipulate for each profile whether that profile has read/write, read-only or no access, to each partition. For example, the Administrator may divide the computer's nominal space 210 into four partitions, one for each user, with one or more partitions containing read-only data and one or more other partitions containing read-write space. In that case, the Administrator may have access to all four partitions, while the other users each have access to a single partition of the SED. Or, for example, the computer could be set up so that the password of the Administrator may allow read/write access across the entire SED, while the non-administrator users only have read access. These examples are meant to be illustrative, not limiting. In step 840, the Administrator using the SED management console 300 may customize each user's access, i.e., may assign to each user a profile that has specific access rights to the various partitions, such that the profile's access rights conform to the proper access rights the user is supposed to have.

Compliance with security policies is important for operations of an enterprise, such as a business or governmental entity. For example, a user of a SED-based personal computer, who is an employee of a business, may fail to comply with a security policy of the business if he does not enroll into the SED management software 222 system. In such a case, the Administrator may enroll the user, remotely if necessary. In a remote enrollment process 306, in accordance with one or more embodiments, the Administrator may enroll the user using the SED management console 300. When the user next turns on the personal computer, the SED management software 222 system will require the user to enter a username and password or other authentication.

As another example of how the Administrator may use the SED management console 300 to control and enforce policy, the SED management console 300 may be used to require that users are able to log on with just a password, or with just a fingerprint, or only with both a correct password and fingerprint, or other authentication. The Administrator may specify different policies for each client machine.

The Administrator may also configure the SED management console 300 so that another user cannot make changes to the control panel, because the SED management console 300 plugs into an active directory of the personal computer. The SED management console 300 can be run by domain administrators who can modify all the settings for the users and machines, while regular domain users may not be granted permission to modify the settings. The regular domain users may not be able to see the users and machines objects in the console unless the domain admin or SED super user (one who installed the SED database during installation) gives exclusive permission to the regular domain user to manage other users.

The Administrator may pre-set all values on the SED management console 300. The Administrator may also use the SED management console 300 to revoke a user's credentials so the user will no longer be able to log onto and will not be able to use the personal computer. The Administrator can also erase a user's drive using the SED management console 300. In addition, the Administrator also has the ability to add other functionality into the pre-boot region 220.

As mentioned above, a problem that may occur with SED-based personal computers is that each user may have two sets of usernames and passwords to remember for each computer, with one set of username and password being used for the Windows® (or other) OS used in the nominal space 210 and a second set of username and password being used for the SED encryption. Thus, where the Administrator has set up additional users, the computer may be used by five users having a total of ten usernames and ten passwords. But the access management functionality 232 of the SED management software 222 may include a password mapping functionality 308 to address this problem.

As depicted in FIG. 3, in accordance with one or more embodiments, the access management functionality 232 may include a password mapping functionality 308. As mentioned above, a problem that may occur with SED-based personal computers is that each user has to remember his username and password for the Windows® (or other) OS used in the nominal space 210 and also a PIN number or password to unlock the SED drive. Also, since the SED drive only allows for four users and one administrator, the number of users that may unlock an SED drive is normally limited to five people. However, it may be desired to configure more users to have the ability to unlock a particular SED drive in a computer. Accordingly, as depicted in FIG. 3, in accordance with one or more embodiments, the access management functionality 232 of the SED management software 222 may include a password mapping functionality 308 which will permit allowing an unlimited number of users to unlock the SED drive. These users can use their username and password for their Windows® (or other) OS to unlock the drive, thus removing the need to remember an additional password or PIN number to unlock the SED drive.

FIG. 4 is a flowchart for a password mapping process 400 to achieve, in accordance with one or more embodiments, the password mapping functionality 308, for the administrator and a pre-set number of users of an SED-based computer. Currently, standards such as the OPAL standard set the number of SED credentials which are available. In step 410, the SED management software 222 asks the user for his or her nominal credentials. If the nominal OS is Windows®, this would be the user's Windows® username and password. (The username may include the user's domain. In one or more embodiments of the present disclosure, the user may be asked for and need to separately enter the domain name, as well as his username and password.) Step 410 may be performed when registering the user or at a later time. The user supplies the nominal credentials, which are received by the SED management software 222. In step 415, the SED management software 222 generates a driver session key (DSK) and uses the DSK to encrypt the SED credential of the user. (The SED credential encrypted might be the SED credential of that user or any SED credential for the SED-based computer). In step 420, the SED management software 222 makes a hash of the user's nominal credentials and uses the hash to encrypt the DSK, and then stores the encrypted DSK. In step 425, the computer is shut down and encryption is activated. When the user starts up the computer, the SED management software 222 asks for the user's nominal credentials in step 430. The user enters her nominal credentials, which are received by the SED management software 222 as entered. In step 435, the SED management software 222 hashes the user's nominal credentials and uses the hashed nominal credentials to attempt to decrypt the user's version of the encrypted DSK. In step 440, the SED management software 222 uses the decrypted DSK to decrypt the SED credential. What happens next is determined 450 by whether the nominal credentials were entered correctly. The SED management software 222 cannot find the encrypted DSK if the nominal username was not entered correctly and cannot decrypt the encrypted DSK if the user's nominal credentials were not entered correctly A wrongly decrypted DSK would not decrypt the encrypted SED credential. If the log in is not successful, in step 455, the SED management software 222 gives the user another chance to enter the nominal credentials correctly. The SED management software 222 may give the user a predetermined number of chances to enter the nominal credentials correctly, but after a predetermined number of failures, the computer may be locked. If the nominal credentials were entered correctly, the SED management software 222 succeeds in using the hashed nominal credentials to decrypt the user's SED password. The decrypted SED password is sent to the SED to decrypt and unlock the nominal portion of the SED. Each user only has to remember one password, the Windows® password, not two.

The password mapping functionality 308 of the present disclosure is not limited to passwords. Other means of user authentication used with the Windows® OS such as fingerprints, other biometrics or smart cards can be mapped to the SED password. For example, the SED management software 222 can use the user's Windows® fingerprint to seal the SED password and to release the SED password when the appropriate finger having the correct fingerprint is swiped across a reader. The user who already had a fingerprint for the Windows® OS on file would not have to enroll a fingerprint in order to use a fingerprint as authentication for the SED. Accordingly, the password mapping functionality may be referred to more generally as an authentication mapping functionality. In addition, the mapping may be accomplished in a number of ways, in various embodiments, both with and without the use of driver session keys.

Figure 9:
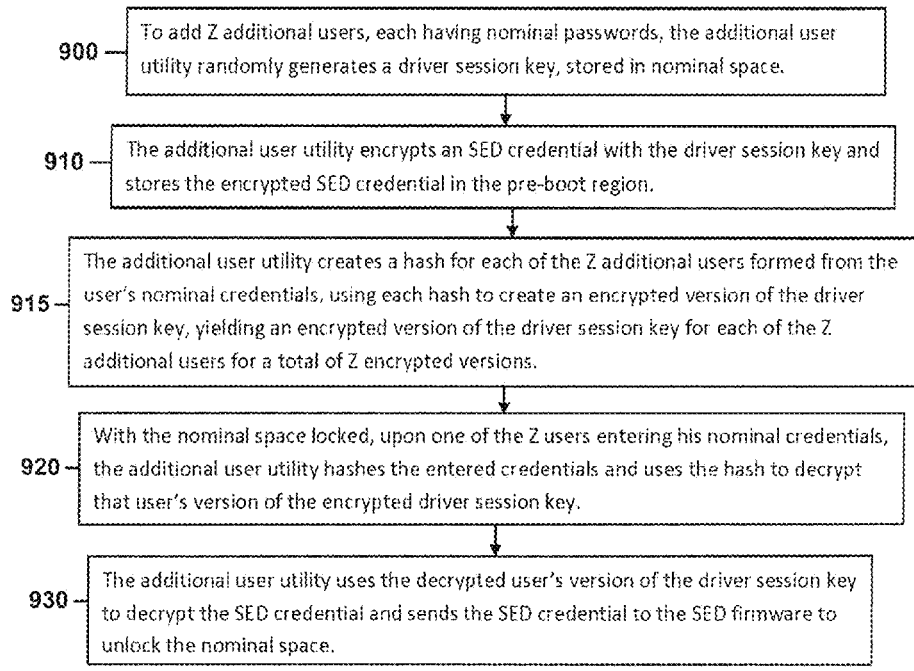
FIG. 9 is a flowchart for a process of adding additional users, in accordance with one or more embodiments.

As depicted in FIG. 3, in accordance with one or more embodiments, the access management functionality 232 may include the additional user utility 305. If the number of users requiring access to a single SED-based personal computer exceeds the number of users (plus an Administrator) allowed by a standard, such as the OPAL standard, additional users can be granted access using the additional user utility 305 of the SED management software 222, which utility can add additional users, in accordance with one or more embodiments. FIG. 9 is a flowchart for a process of adding additional users, in accordance with one or more embodiments. The additional user utility 305 allows the addition of Z of additional users each having a username and a password (or other forms of authentication) and if appropriate, a domain, which may be included as part of the username. Z is a whole number. The session key may be encrypted with passwords and usernames (which may include the user's domain) of Z additional users, as further described in the next paragraph.

For example, referring to FIG. 9, in one or more embodiments, in step 900, the additional user utility 305 retrieves the SED credential (generally a pin or password) of an authorized user, such as the administrator, and randomly generates a driver session key. In step 910, the additional user utility encrypts the SED credential with the driver session key and stores the encrypted SED credential in the pre-boot region 220. In step 915, the additional user utility creates a hash for each of the Z additional users formed from the respective user's nominal credentials and uses each hash to create an encrypted version of the driver session key, yielding an encrypted version of the driver session key for each of the Z additional users, for a total of Z encrypted versions of the driver session key. The Z encrypted versions of the driver session key are stored in the pre-boot region 220. (Then, the additional users enter their Windows® usernames and password (and/or provide other authentication).) As depicted in step 920, the additional user utility 305 may hash the user's nominal credentials as entered and use the hash to attempt to decrypt the driver session key (DSK). If the DSK is successfully decrypted, then in step 930 the additional user utility 305 uses the decrypted DSK to decrypt the encrypted SED credential in the pre-boot region 220, and, once decrypted, sends the SED credential to the SED, which decrypts and unlocks the nominal space. In this process, after a pre-determined number of failures to enter the user's nominal credentials, the user may be locked out.

The Administrator may unlock the SED by entering her Windows® username and password. If a second user is supposed to use the same SED, the additional user utility 305 encrypts the generated SED password number, a number like "75982" for example, with a hash of the additional user's Windows® password username and domain name. When either the Administrator or the new user logs on with their Windows® credentials, the SED management software 222 determines the user, and hashes the entered credentials to use them to decrypt SED password number 75982. Once decrypted, the SED password number is used by the unlocking system to unlock the nominal space 210 of the SED.

As an example of a process for the additional user utility 305 in accordance with one or more embodiments, during activation, the Administrator may use her username to generate a random Administrator password number such as "75982," which can be used with the Administrator's SED username to unlock the SED. The generated SED password number 75982 is not stored anywhere as is. Instead, it is encrypted with a hash of the Administrator's Windows® password (or other form of authentication). Once encrypted, the generated SED password is stored in the OS (such as Windows® OS) of the nominal space 210 of the SED. An authorized user, such as the Administrator, must use his credentials to unlock the SED, boot to the nominal OS (such as Windows® OS), know where the encrypted generated SED password is stored, and hash the additional user's username, password and domain to encrypt the generated SED password. Then when the additional user logs in with her Windows®' credentials, the SED management software 222 determines the user, and hashes the entered credentials to use them to decrypt SED password number 75982. Once decrypted, the SED password number is used by the unlocking system to unlock the nominal space 210 of the SED.

As depicted in FIG. 3, in accordance with one or more embodiments, the access management functionality 232 may include the emergency logon functionality 312. FIGS. 5a and 5b are flowcharts for the emergency logon functionality 312, in accordance with one or more embodiments. A flowchart for an Administrator-assisted emergency logon process is depicted in FIG. 5a. A flowchart for an emergency logon process without Administrator assistance is depicted in FIG. 5b. Referring to FIG. 5a, if a user cannot get access to the personal computer because he has forgotten his username or password, or if his fingerprint is not working, the Administrator may re-set the username and password using the emergency logon functionality 312, which may be implemented, for example, in the pre-boot region 220 using the pre-boot OS 225 and as part of the Pre-Boot Authorization (PBA) process and the SED management software 222. In step 505, the emergency logon functionality 312 provides the user with a challenge code at the client side when he cannot log in. In step 510, the user communicates the challenge code to the Administrator, who enters the challenge code, on the server side, in the SED Management console 300. The emergency logon functionality 312, which may comprise a utility on the SED management software 222, responds in step 515, with a response code, on the server side, which the Administrator communicates to the user in step 520. The user enters the response code on the client side in step 525 and the response code allows the unlocking program 231 to unlock the nominal space 210 of the personal computer in step 530. The user will be required to select a new password in step 535.

Referring to FIG. 5b, the user may be able to use an emergency logon functionality 312 to obtain access without an Administrator. This is particularly useful if the computer is used at home and is not associated with a corporate Administrator. When the user enrolls in the SED management software 222 (or at a later time but before the user gets locked out of the personal computer), in step 550, the user may activate the emergency login functionality 312 by selecting three questions and supplying answers to each of the three questions. If at a later time, the user cannot log in, in step 555, the log in failure will prompt the computer to display a button with a "cannot log in" message or a message to like effect. If the user clicks on the button, in step 560, the emergency logon functionality 312 will be prompted to display, and require the user to correctly answer, at least one of the questions previously selected by the user. If the user supplies the correct answer(s), in step 565, the SED management software 222 will allow the unlocking program 231 to unlock the nominal space 210 of the personal computer. In step 570, the SED management software 222 requires that the user select a new password.

As depicted in FIG. 3, in accordance with one or more embodiments, the access management functionality 232 may include the identity management and Single Sign On (SSO) functionality 310, which has particular application in enterprise applications. The Administrator may use her password to unlock an SED and make the Shadow MBR in the pre-boot authentication environment in the pre-boot sector a read/write area. When a user of SED-based computer turns the computer on and provides authentication, the unlocking program 231 decrypts the nominal space 210. Normally, the operating system for the nominal space 210, such as Windows®, will require the user to enter his Windows® username, domain and password. The SED management software 222 uses a communication protocol with core components of the Windows® operating system to verify the level of authentication used by the user at the Pre-Boot Authentication (PBA) and if the level of authentication meets policy requirements, allows the user access through the Windows® OS to all information on the nominal space 210 on the personal computer (or the partitions of the nominal space that the specific user is allowed to see), as well as full access to the enterprise security levels appropriate for that user.

Figure 6:
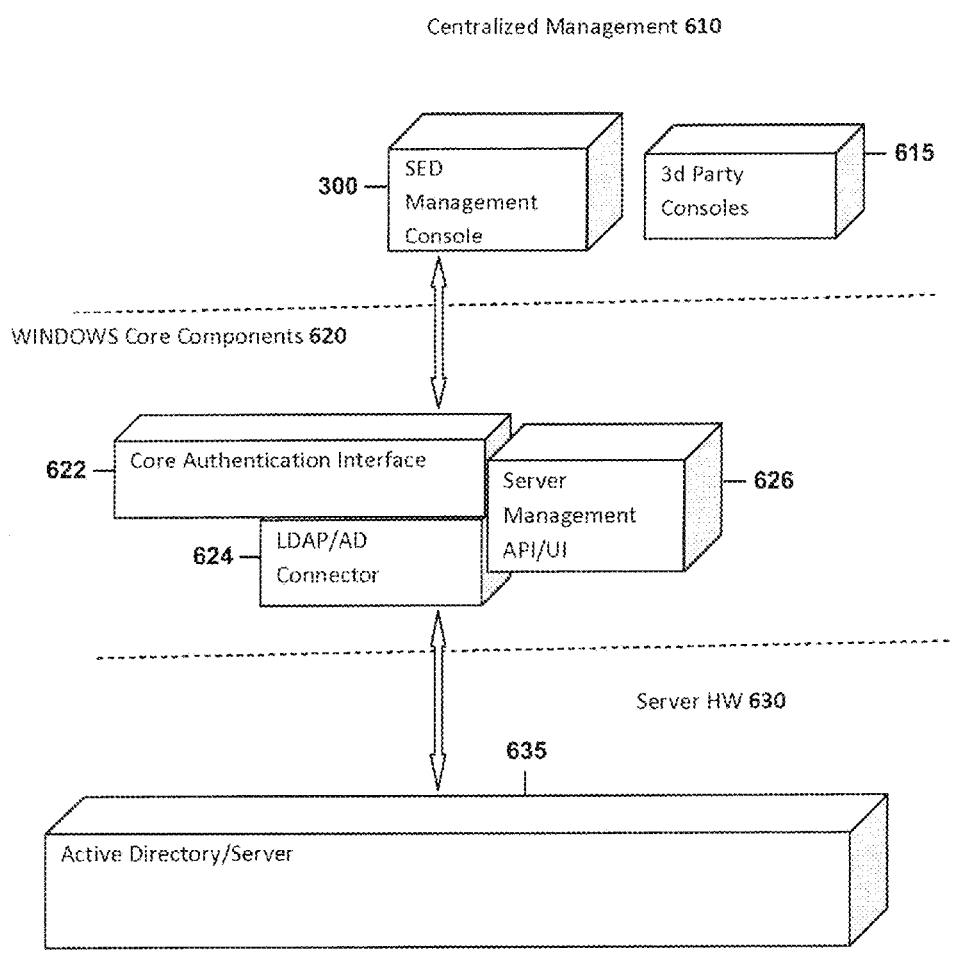
FIG. 6 is a block diagram representing an architecture on the server side, in accordance with one or more embodiments.

A block diagram representing an architecture on the server side in accordance with one or more embodiments is depicted in FIG. 6. A centralized management 610 includes the SED management console 300 and may include other, third party consoles 615. If Windows® is the nominal OS, the Windows® core components 620 may comprise a core authentication interface 622, a connector 624, such as a Lightweight Directory Access Protocol ("LDAP") Active Directory ("AD"), and server management Application Program Interface/User Interface ("API/UI") 626. APIs allow software programs to interact with an operating system; user interfaces allow users to interact with a computer. The server hardware 630 may include an Active Directory server 635, such as an LDAP active directory server. The LDAP/AD connector 624 allows the Windows® core components 620 to access the Active Directory server 635. The SED management console 300 manages the SED client (not depicted in FIG. 6). The SED management console 300 and third party consoles 615 communicate with the server management API/UI 626.

Figure 7:
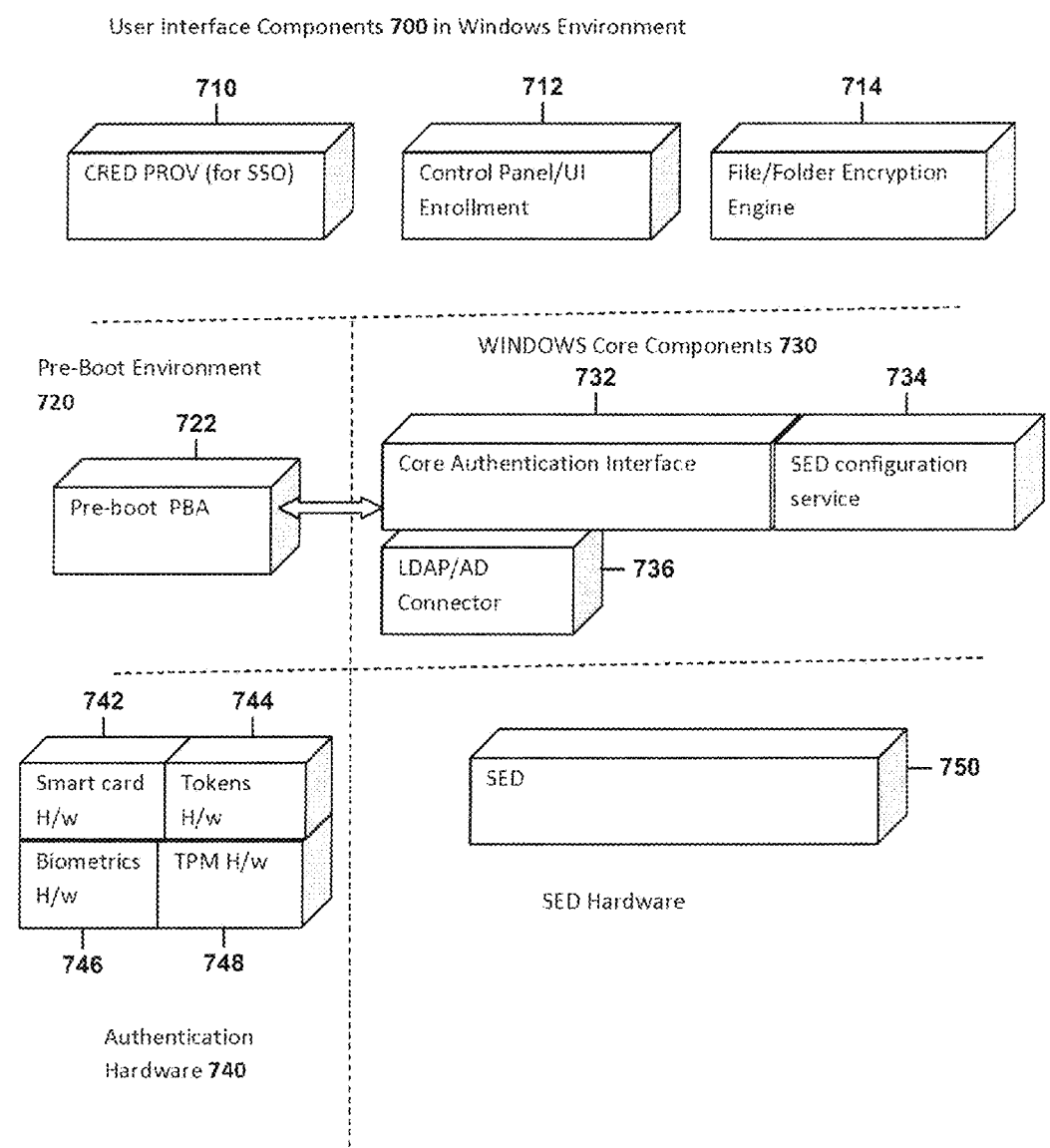
FIG. 7 is a block diagram representing an architecture on the client side, in accordance with one or more embodiments.

A block diagram representing an architecture on the client side in accordance with one or more embodiments is depicted in FIG. 7. User interface components in the Windows® environment on the client side may include a credentials provider 710, a control panel user interface enrollment 712, and a file folder encryption engine 714. The credential provider 710, which may be, for example, a Graphical Identification and Authentication (GINA) credential provider, allows for single sign on into a desktop and synchronization of the user's Windows® credentials with a Linux®-based pre-boot authentication 722 in the pre-boot environment 720. The control panel user interface enrollment 712 provides a user interface for enabling the SED, enrolling users and managing policies and settings. The file/folder encryption engine 714 is an Explorer based extension that provides file and folder encryption. The Window core components 730 include a core authentication interface 732, an SED configuration service 734, and an LDAP/AD connector 736. The authentication hardware 740 may include elements such as smart card hardware 742, tokens hardware 744, biometrics hardware 746 (such as but not limited to a fingerprint reader) and trusted platform module ("TPM") hardware 748. The Window core components 730 provide an interface between the user level components 700, the SED 750, the authentication hardware 740, the pre-boot environment 720 and the LDAP active directory server 635 (FIG. 6). The core authentication interface 732 provides policy management support and an interface to authentication hardware 740. The core authentication interface 732 also provides communication between the pre-boot environment 720 and the Windows® environment on the nominal space 210. The SED configuration service 734 provides an interface to different SED technologies such as, but not limited to, those in accordance with OPAL. The LDAP/AD connector 736 provides infrastructure to communicate with the LDAP-based server 635 for user information and policy storage, but the LDAP/AD connector 736 could be customized and replaced to support non-LDAP databases and servers.

Figure 10:
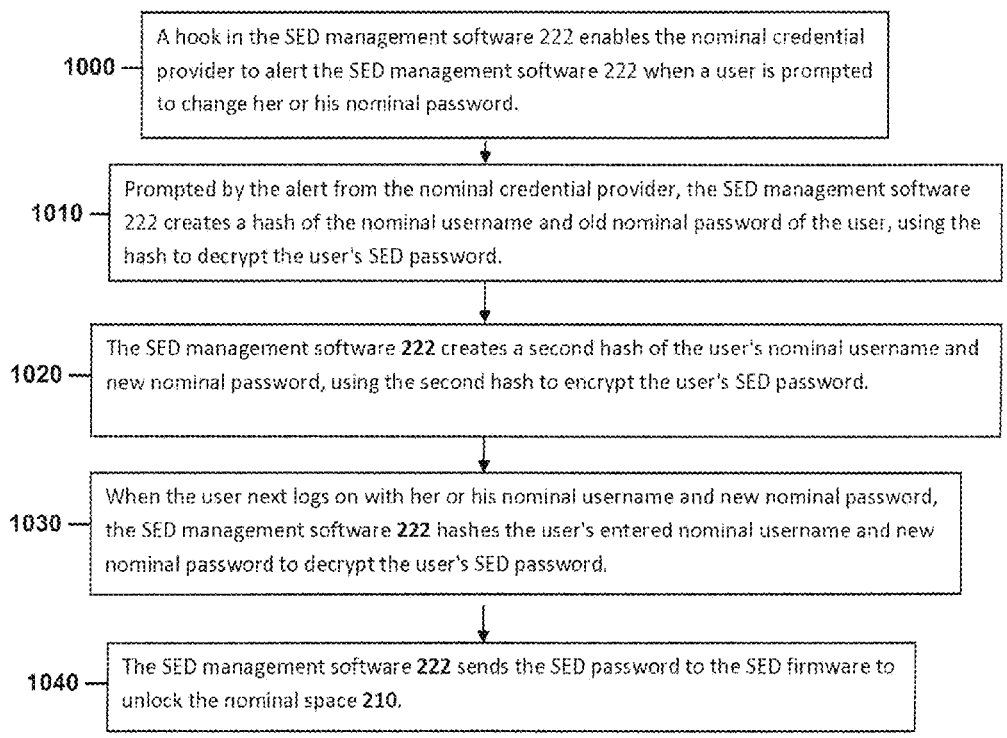
FIG. 10 is a flowchart of a process for synchronizing nominal and pre-boot authentication, in accordance with one or more embodiments.

As depicted in FIG. 3, in accordance with one or more embodiments, the access management functionality 232 may include the synchronizing authentication functionality 314, which synchronizes authentication of the users' nominal (such as Windows®) OS credentials with credentials for the pre-boot environment used to decrypt the SED. FIG. 10 is a flowchart of a process for synchronizing nominal and pre-boot authentication, in accordance with one or more embodiments. For security purposes, the users may be required to change their Windows® OS passwords on a periodic basis. This is a common requirement in enterprise applications. The GINA credential provider 710 (FIG. 7, described above) is currently used as the login component of Windows®. Thus, while the GINA credential provider 710 is included in the discussion below as an example of a credential provider for a nominal OS, any credential provider suitable for use with a nominal operating system may be used. Referring to step 1000 of FIG. 10, the SED management software 222 includes a hook for a credential provider, such as a GINA hook, which allows GINA credential provider 710 to alert the SED management software when a user's nominal password is being changed. In step 1010, prompted by such alert, the SED management software 222 takes the user's nominal username (which may include the user's domain if appropriate) and the user's old nominal password and creates a hash, using the hash to decrypt the user's SED password (such as an OPAL password). In step 1020, the SED management software 222 then creates a second hash of the user's nominal username and new nominal password and uses the second hash to encrypt the SED password. The next time the user logs on and enters his nominal username and the new nominal password, in step 1030, the nominal username and new nominal password as entered are hashed and are used to decrypt the user's SED password. If the decryption is successful, in step 1040, the SED password is sent to SED firmware so the SED (nominal space 210) can be unlocked.

As depicted in FIG. 3, in accordance with one or more embodiments, the access management functionality 232 may include the pre-boot graphical user interface ("GUI") 316 for authentication use, stored in the pre-boot region 220. For example, if policy or a particular user requires a fingerprint (or other) authentication, in addition to the user's username (which may include the user's domain) and password, the SED management software 222 would request the username, password and fingerprint (or other authentication) of the user upon login through a display on the pre-boot GUI 316. With the fingerprint reader plugged in, upon a successful reading of the user's fingerprint, the pre-boot GUI 316 will display a fingerprint on the screen of the computer screen. The pre-boot GUI 316 may similarly accommodate use of other authentication systems, such as but not limited to smart cards, that may be used with various embodiments. In accordance with some embodiments, the pre-boot GUI 316 may work with many different forms of authentication hardware 740 (FIG. 7), such as but not limited to fingerprint readers, other biometric readers, tokens, TPM, or smart cards, which may be combined with each other or with passwords for a variety of multifactor authentication protocols.

Screenshots from a pre-boot GUI 316 in accordance with one or more embodiments are presented in FIGS. 16-31*b*.

Figure 16:
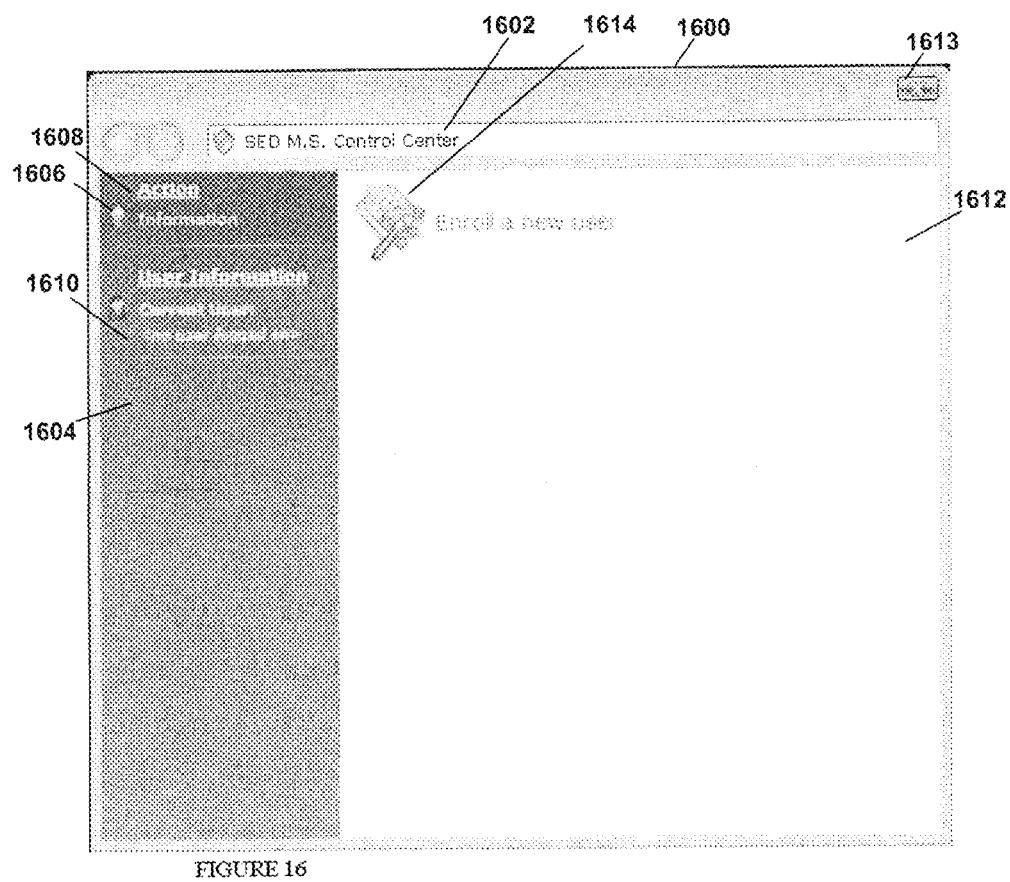
FIG. 16 depicts a screenshot from a pre-boot GUI for enrolling a new user, in accordance with one or more embodiments.

FIG. 16 depicts a screenshot 1600 from a pre-boot GUI for enrolling a new user, in accordance with one or more embodiments. A title 1602 at the top of the screenshot 1600 of FIG. 16 says "SED M.S. Control Center." In a window 1604 on a viewer's left side, a user could click on an "Information" button 1606 in an "Action" section 1608 to obtain information. Below the "Action" section 1608, a "User Information" section 1610 indicates that "no user [is currently] logged on." In a second window 1612 on the (viewer's) right side of the screenshot 1600, a user could click on "Enroll a new user" button 1614 to begin the process of enrolling a new user. A close-screen button 1613 is at the upper right of the screenshot 1600.

Figure 17A:
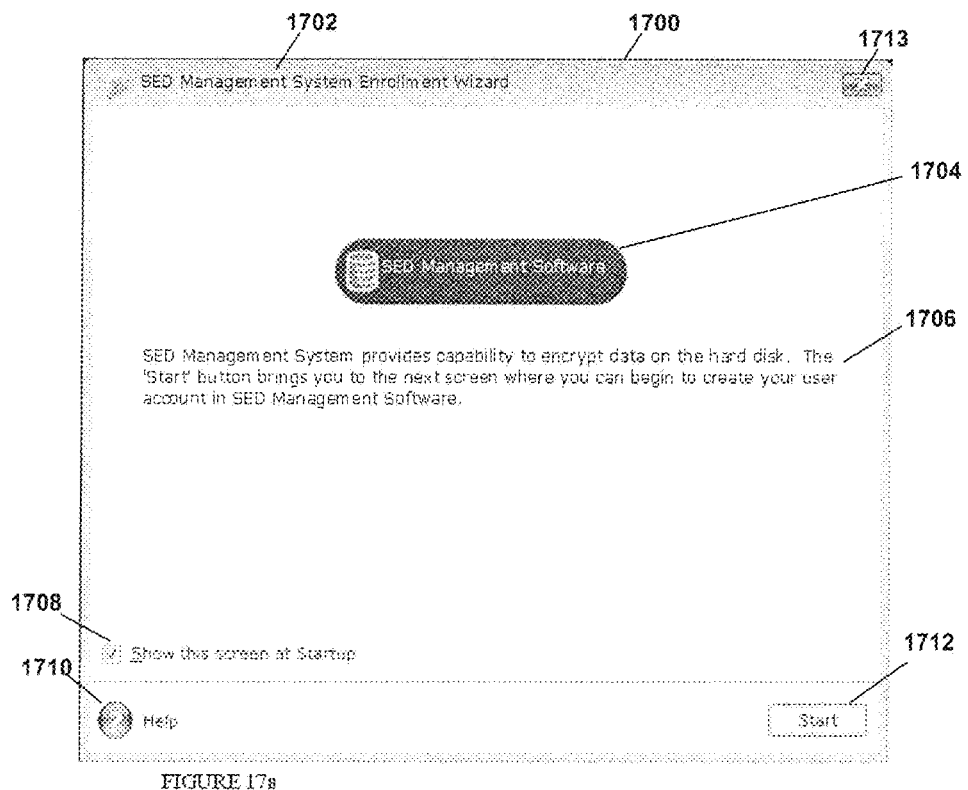
FIG. 17a depicts a screenshot from a pre-boot GUI of a welcome page for enrolling a new user, in accordance with one or more embodiments.

FIG. 17*a* depicts a screenshot 1700 from a pre-boot GUI of a welcome page for enrolling a new user, in accordance with one or more embodiments. A title 1702 at the top of the screenshot 1700 reads "SED Management System Enrollment Wizard." Below the title is an icon 1704 labeled "SED Management Software." An information box 1706 below the icon 1704 states, "SED Management system provides capability to encrypt data on the hard disk. The 'Start" button brings you to the next screen where you can begin to create your user account in SED Management Software." Below the information box 1706 is a checked box 1708, which says, "Show this screen at Startup." (The box can be unchecked by a user by clicking on the box 1708.) At the bottom of the screenshot 1700, on the left, is a "Help" icon 1710 in the form of a question mark in a circle, with "Help" written beside it. Clicking on the "Help" icon 1710 would bring up additional information. On the bottom right of the screenshot 1700 is a "Start" button 1712, which the user could click to continue the enrollment process. A close-screen button 1713 is at the upper right of the screenshot 1700.

Figure 17B:
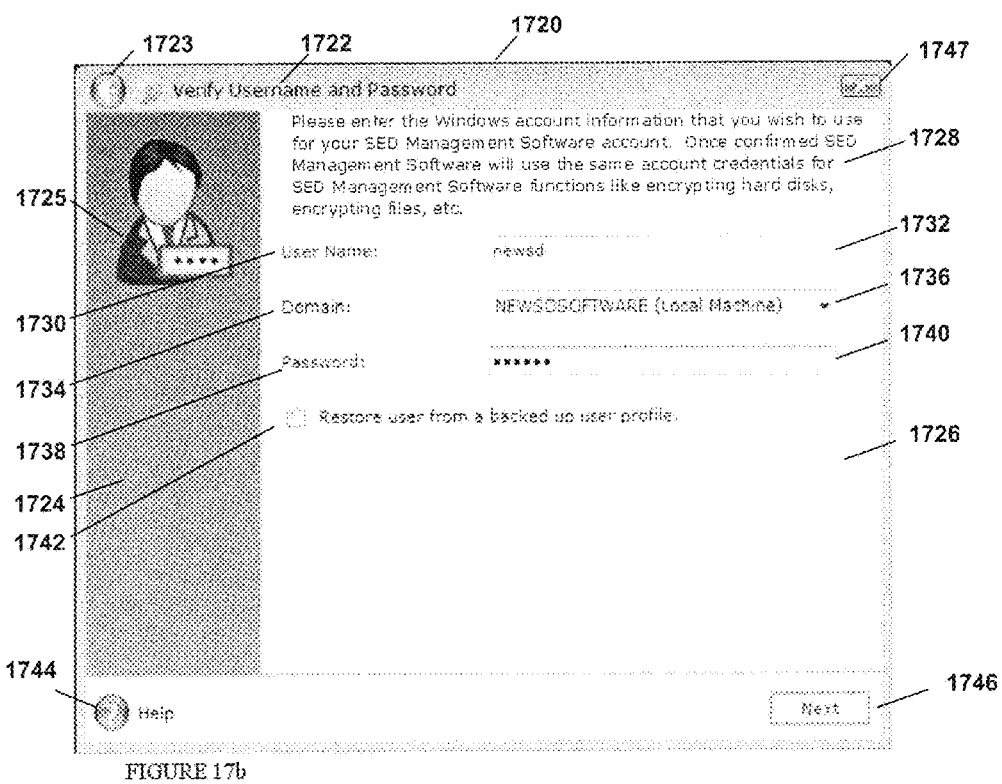
FIG. 17b depicts a screenshot from a pre-boot GUI for verifying authentication of a user, in accordance with one or more embodiments.

FIG. 17*b* depicts a screenshot 1720 from a pre-boot GUI for verifying authentication of a user, in accordance with one or more embodiments. A title 1722 at the top of the screenshot of FIG. 17*b* reads "Verify Username and Password." A back button 1723 to allow the user to go back to a previous page is to the left of the title 1722. On the left hand side of the screenshot 1720, a window 1724 includes a user icon 1725. Under the title 1722, in a window 1726 on the (viewer's) right hand side of the screenshot 1720, an instruction box 1728 provides instructions to a user, which read, "Please enter the WINDOWS account information that you wish to use for your SED Management Software Account. Once confirmed SED Management Software will use the same account credentials for SED Management Software functions like encrypting hard disks, encrypting files, etc." A list of three items underneath the instruction box 1728 includes: (1) "Username:" 1730 with a data entry box 1732 to its right for the user to type in his or her user name ("newsd" is typed in); (2) "Domain:" 1734 with a pull-down menu 1736 to its right with "NEWSDSOFTWARE (Local Machine)" selected; and (3) "Password:" 1738 with a password data entry box 1740 to its right for the user to type in his or her password. A six-character password has been typed in, but it is depicted as six dots for security reasons. Below the list is a box 1742 which can be checked if the user wants to "Restore user from a backed up user profile." At the bottom of the screenshot 1720, on the left, is a "Help" icon 1744 in the form of a question mark in a circle, with "Help" written beside it. Clicking on the Help icon 1744 would bring up additional information. On the bottom right of the screenshot 1720 is a "Next" button 1746, which the user may click to continue the enrollment process (or the restore back-up process, if the previously mentioned box 1742 was clicked). A close-screen button 1747 is at the upper right of the screenshot 1720.

Figure 17C:
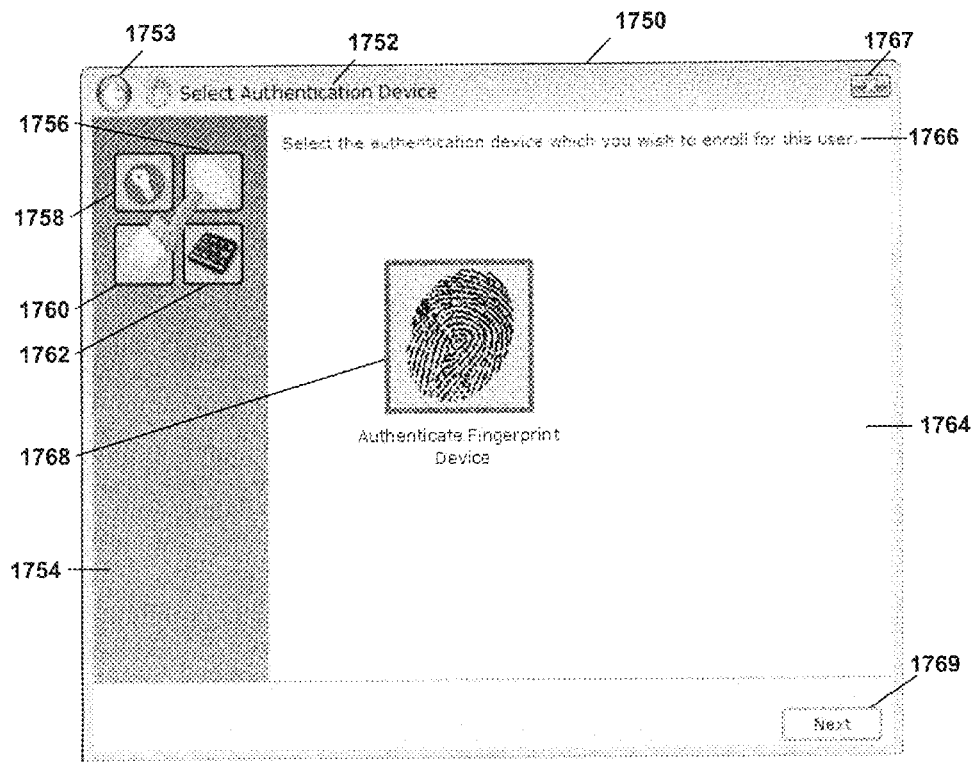
FIG. 17c depicts a screenshot from a pre-boot GUI for selecting a form of authentication for enrolling a new user, in accordance with one or more embodiments.

FIG. 17*c* depicts a screenshot 1750 from a pre-boot GUI for selecting a form of authentication for enrolling a new user, in accordance with one or more embodiments. A title 1752 at the top of the screenshot 1750 reads "Select Authentication Device." A back button 1753 to allow the user to go back to a previous page is to the left of the title 1752. Four icons with a check mark in a window 1754 on the viewer's left side of the screenshot 1750 depict four different types of authentication devices: a fingerprint icon 1756 for a fingerprint device; a key icon 1758 for a token device; a smart card icon 1760 for a smart card device; and a radio frequency identification ("RFID") icon 1762 for an RFID security device. In a window 1764 on the viewer's right, an instruction 1766 reads "Select the authentication device which you wish to enroll for this user." A fingerprint icon 1768 below the instruction 1766 indicates that the user has chosen to enroll a fingerprint authentication device and the user's fingerprint. A close-screen button 1767 is at the upper right of the screenshot 1750. On the bottom right of the screenshot 1750 is a "Next" button 1769, which the user may click to continue the enrollment process.

Figure 17D:
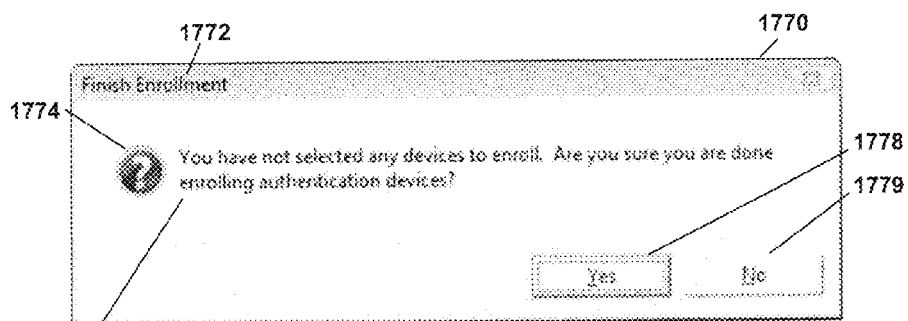
FIG. 17d depicts a screenshot from a pre-boot GUI for finishing user enrollment, in accordance with one or more embodiments.

FIG. 17*d* depicts a cropped screenshot 1770 from a pre-boot GUI for finishing user enrollment, in accordance with one or more embodiments. A title 1772 at the top of the screenshot 1770 reads "Finish Enrollment." A question mark icon 1774 has an information box 1776 beside it, which poses a question if the user has not selected any devices to enroll, namely: "You have not selected any devices to enroll. Are you sure you are done enrolling authentication devices?" The user may select a "Yes" box 1778 or a "No" box 1779.

Figure 17E:
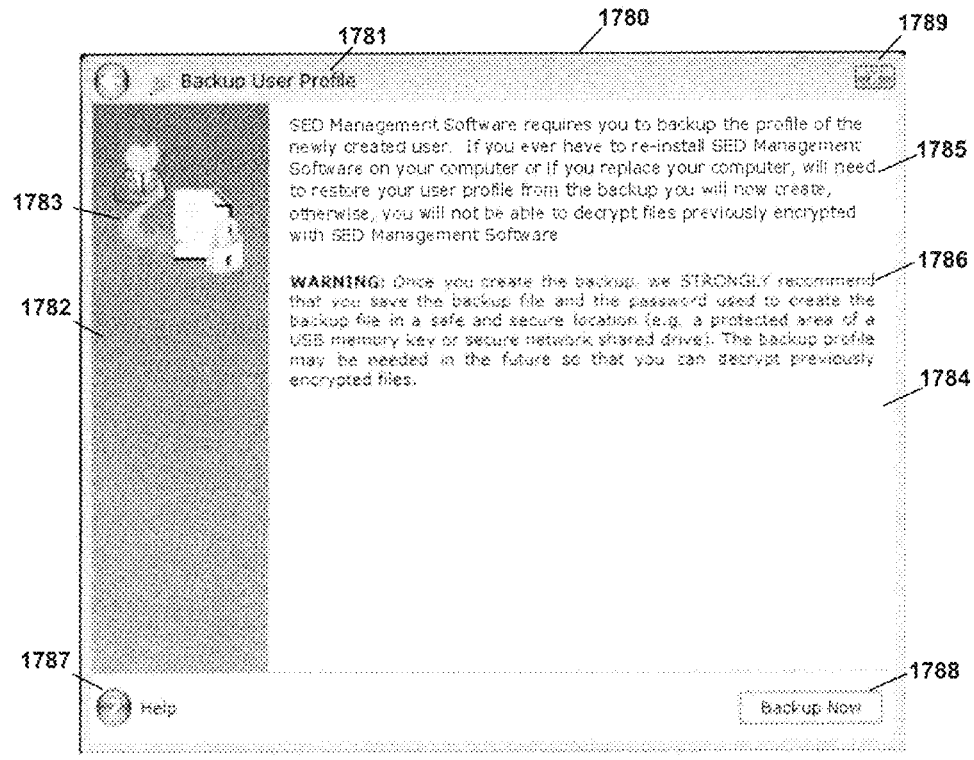
FIGS. 17e and 17f depict screenshots from a pre-boot GUI for backing up a user profile, in accordance with one or more embodiments.

FIG. 17*e* depicts a screenshot 1780 from a pre-boot GUI for backing up a user profile, in accordance with one or more embodiments. A title 1781 at the top of the screenshot 1780 reads "Backup User Profile." A security icon 1783 is depicted within a window 1782 on the (viewer's) left side of the screenshot 1780. A window 1784 on the (viewer's) right side of the screenshot 1780 contains an information box 1785 and a warning box 1786. The information box 1785 reads: "SED Management Software requires you to back up the profile of the newly created user. If you ever have to re-install SED Management Software on your computer or if you replace your computer, [you] will need to restore your user profile from the backup you will now create, otherwise, you will not be able to decrypt files previously encrypted with SED Management Software." The warning box 1786 reads: "WARNING: Once you create the backup, we STRONGLY recommend that you save the backup file and the password used to create the backup file in a safe and secure location (e.g. a protected area of a USB memory key or secure network share drive). The backup profile may be needed in the future so that you can decrypt previously encrypted files." At the bottom of the screenshot 1780, on the left, is a "Help" icon 1787 in the form of a question mark in a circle with "Help" written beside it. Clicking on the "Help" icon 1787 would bring up additional information. On the bottom right of the screenshot 1780 is a "Backup Now" button 1788, which the user could click to back up the user's profile. A close-screen button 1789 is at the upper right of the screenshot 1780.

Figure 17F:
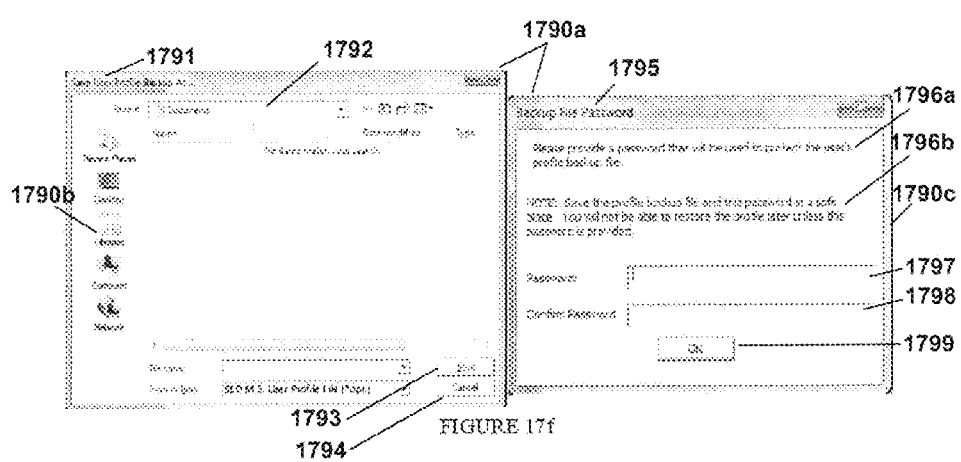

FIG. 17*f* depicts a dual screenshot 1790*a* from a pre-boot GUI for saving and protecting a back-up of a user profile, in accordance with one or more embodiments. On the (viewer's) left, at the top of a left screenshot 1790*b*, a title 1791 reads "Save User Profile Backup As . . . " On the left side of the left screenshot 1790*b*, Window icons with titles for "Recent Places," "Desktop," "Libraries," "Computer," and "Network" appear in a column. A location box 1792 indicates that a backup user profile is about to be saved in a "Documents" folder. Other WINDOWS icons are to the right of the location box 1792, while WINDOWS file identification columns for the file "Name," "Date Modified" and "Type" (of file) appear below the location box 1792. A WINDOWS "File name" box at the bottom of left screenshot 1790*b*, with a "Save as type" box indicates that the backup user profile is about to be saved as an "SED M.S. User Profile File (*opi.)." A clickable "Save" button 1793 to save the backup user profile and a clickable "Cancel" button 1794 to cancel the saving process are to the (viewer's) right of the "File name" box and the "Save as type" box. On the (viewer's) right, at the top of a right screenshot 1790*c*, a title 1795 reads "Backup File Password." Below the title 1795 of the right screenshot 1790*c* are two information boxes 1796*a* and 1796*b*. Information box 1796*a* reads "Please provide a password that will be used to protect the user's profile backup file." Information box 1796*b* reads "NOTE: Save the profile backup file and this password in a safe place. You will not be able to restore the profile later unless this password is provided." Below the two information boxes 1796*a* and 1796*b* are an upper data entry box 1797 and a lower data entry box 1798. The upper data entry box 1797 is for a password (with the word "Password" shown at its left) and the lower data entry box 1798 is to re-enter the password that would be typed in the upper entry box 1797 to confirm the password (the lower data entry box 1798 having the words "Confirm Password" shown at its left). Below the lower data entry box 1798 is a clickable "OK" button 1799.

Figure 18A:
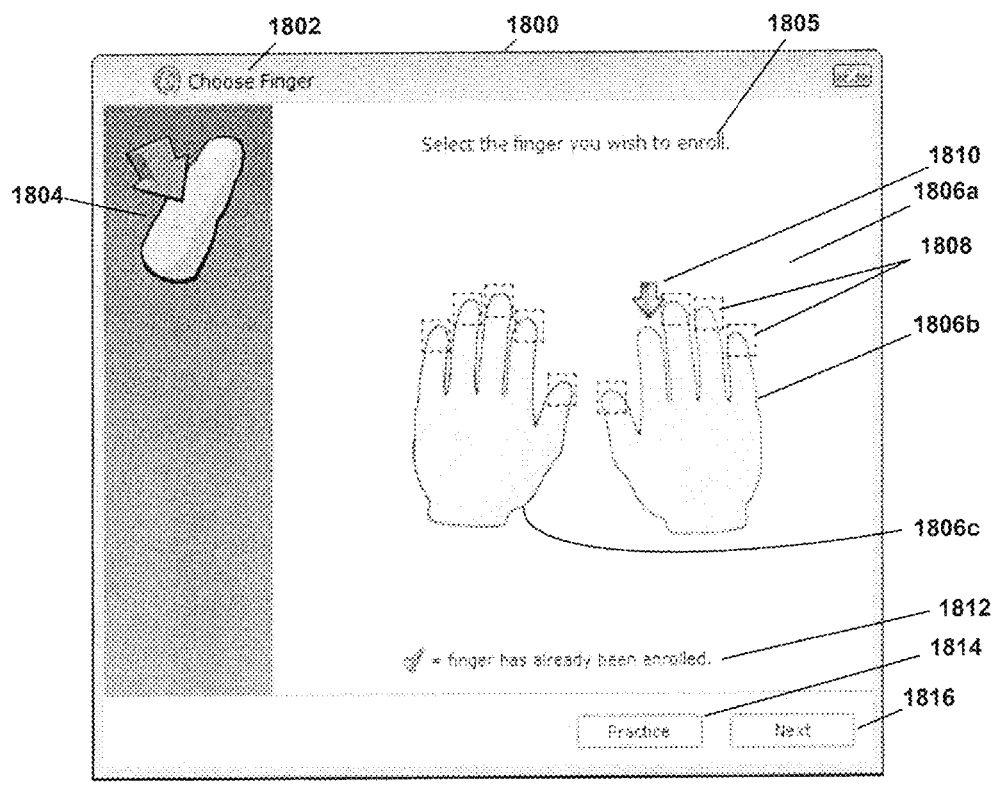
FIG. 18a depicts a screenshot from a pre-boot GUI for selecting a finger from which to enroll a fingerprint, in accordance with one or more embodiments.

FIG. 18*a* depicts a screenshot 1800 from a pre-boot GUI for selecting a finger from which to enroll a fingerprint, in accordance with one or more embodiments. A title 1802 at the top of the screenshot 1800 reads "Choose Finger." An icon 1804 depicting a finger with an arrow pointing to it is beneath the title 1802 and on the (viewer's) left side of the screenshot 1800. Beneath the title 1802 and on the (viewer's) right side of the screenshot 1800 is an instruction 1805 that reads "Select the finger you wish to enroll." Below the instruction 1805 is a depiction 1806*a* of a right hand 1806*b* and a left hand 1806*c*, with boxes 1808 around the tips of the fingers and thumbs of the right hand 1806*b* and the left hand 1806*c*. An arrow 1810 points to a selected finger (forefinger of the right hand), indicating a pending current selection. Below the depiction 1806*a*, is a notation 1812 of a checkmark (placed in proximity to a fingertip of a finger) indicating that the "finger has already been enrolled." Below the notation 1812 is a clickable "Practice" button 1814, to allow the user to practice in having the fingerprint authentication device read the user's fingerprint, and a clickable "Next" button 1816.

Figure 18B:
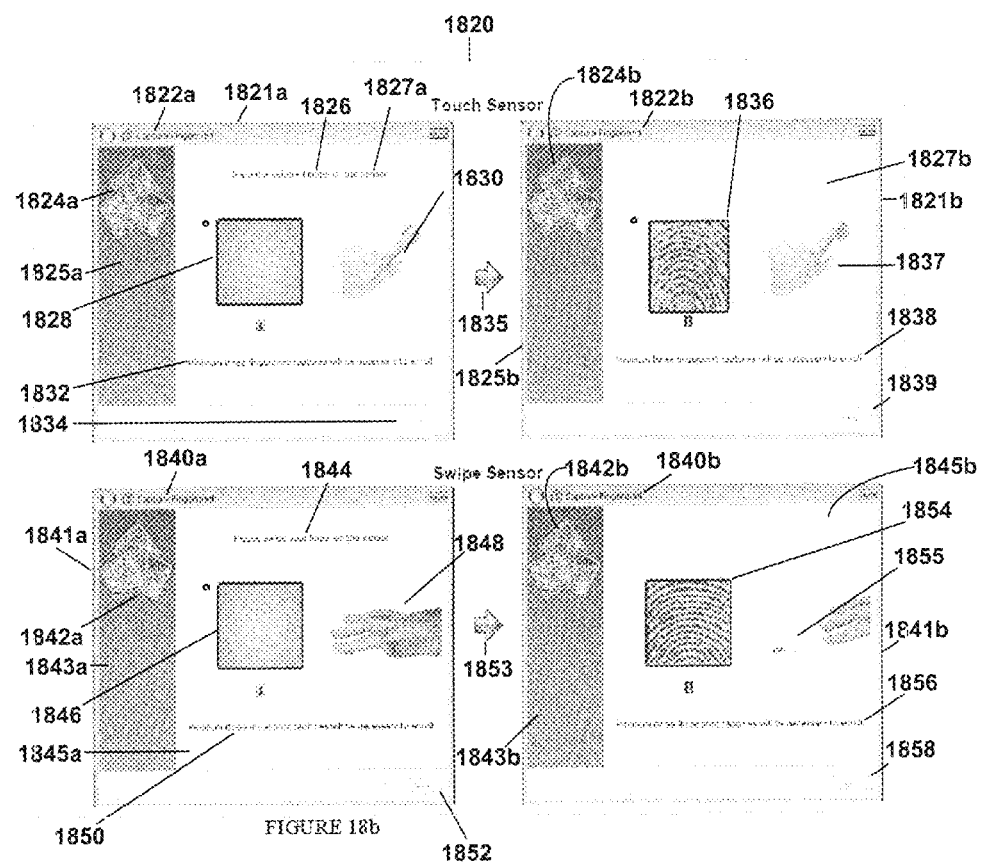
FIG. 18b depicts a montage of screenshots from a pre-boot GUI illustrating different fingerprint sensors, in accordance with one or more embodiments.
Figure 18E:
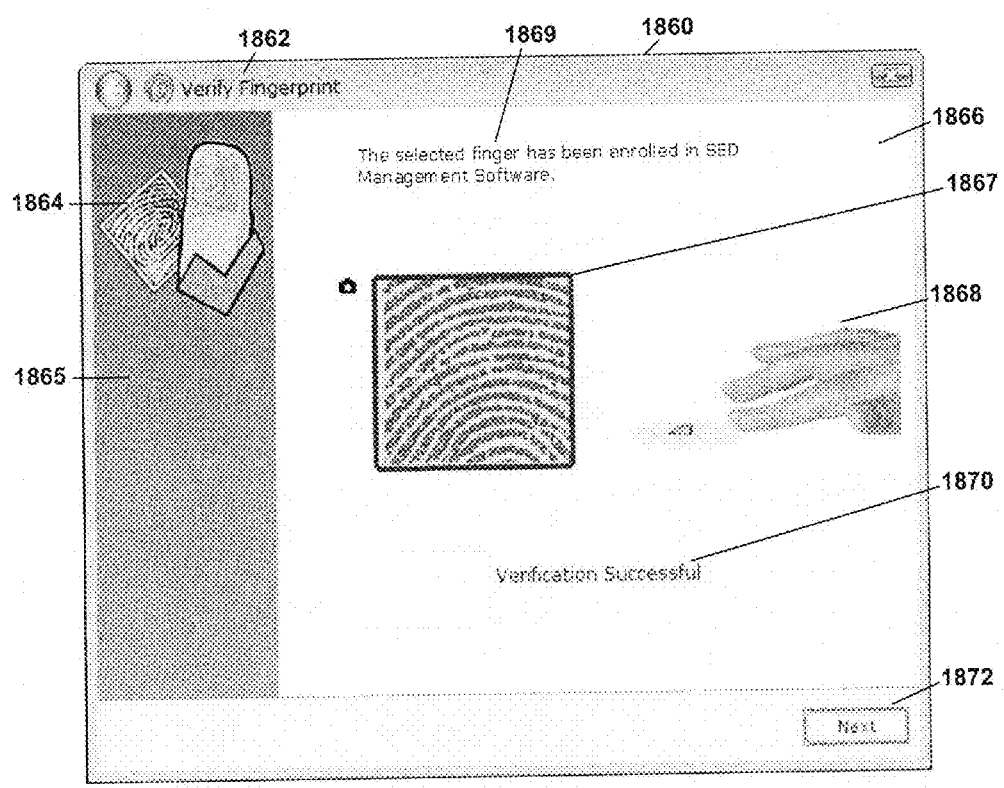
FIG. 18c depicts a screenshot from a pre-boot GUI for acknowledging successful fingerprint enrollment, in accordance with one or more embodiments.
FIG. 18d depicts a screenshot from a pre-boot GUI for acknowledging successful device enrollment, in accordance with one or more embodiments.

FIG. 18*b* depicts a montage 1820 of screenshots from a pre-boot GUI illustrating different fingerprint sensors, in accordance with one or more embodiments. Left and right touch sensor screenshots 1821*a*, 1821*b* are screenshots for a user utilizing a touch sensor type of fingerprint authentication device. A title 1822*a* at the top of the left touch sensor screenshot 1821*a* reads "Capture Fingerprint." A fingerprint icon 1824*a* is below the title 1822*a* in a left window 1825*a* on the (viewer's) left side of the left touch sensor screenshot 1821*a*. An instruction 1826 below the title 1822*a* in a right window 1827*a* on the right side of the left touch sensor screenshot 1821*a* reads "Place the selected finger on the sensor." Below the instruction 1826 are a fingerprint touch sensor depiction 1828 and a depiction 1830 of a finger touching a fingerprint touch sensor. The fingerprint touch sensor depiction 1828 does not include a fingerprint depiction, indicating that none has been captured. The number "1" at the bottom of the fingerprint touch sensor depiction 1828 is not highlighted, indicating that a first fingerprint scan has not been successfully accomplished. Below the fingerprint touch sensor depiction 1828 and the depiction 1830 of a finger touching a fingerprint touch sensor is an information statement 1832 that reads "Minimum three fingerprint captures will be necessary to enroll," indicating that three successful readings of a particular fingerprint will be necessary to successfully enroll the finger having that fingerprint. A clickable "Next" button 1834 is at the bottom right of the left touch sensor screenshot 1821*a*.

Continuing to refer to FIG. 18*b*, an arrow 1835 indicates that the user would proceed from the left touch sensor screenshot 1821*a* to the right touch sensor screenshot 1821*b*. A title 1822*b* at the top of the right touch sensor screenshot 1821*b* reads "Capture Fingerprint." A fingerprint icon 1824*b* is below the title 1822*b* in a left window 1825*b* on the left side of the right touch sensor screenshot 1821*b*. Below the title 1822*b* in a right window 1827*b* on the (viewer's) right side of the right touch sensor screenshot 1821*b* is a fingerprint touch sensor depiction 1836, depicted as having a fingerprint, and a depiction 1837 of a finger touching a fingerprint touch sensor. The fact that the fingerprint touch sensor depiction 1836 is depicted as having a fingerprint indicates that a fingerprint has successfully been captured. This is confirmed with the highlighting of the number "1" at the bottom of the fingerprint touch sensor depiction 1836, meaning that it is the first capture (of a minimum of three captures) of the fingerprint for the selected finger. Below the fingerprint touch sensor depiction 1836 and the depiction 1837 of a finger touching a fingerprint touch sensor is an information statement 1838 that reads "Minimum three fingerprint captures will be necessary to enroll." A clickable "Next" button 1839 is at the bottom right of the right touch sensor screenshot 1821*b*.

Continuing to refer to FIG. 18*b*, left and right swipe sensor screenshots 1841*a*, 1841*b* are screenshots for a user utilizing a swipe sensor type of fingerprint authentication device. A title 1840*a* at the top of the left swipe sensor screenshot 1841*a* reads "Capture Fingerprint." A fingerprint icon 1842*a* is below the title 1840*a* in a left window 1843*a* on the (viewer's) left side of the left swipe sensor screenshot 1841*a*. An instruction 1844 below the title 1840*a* in a right window 1845*a* on the right side of the left swipe sensor screenshot 1841*a* reads "Please swipe your finger on the sensor." Below the instruction 1844 are a fingerprint swipe sensor depiction 1846 and a depiction 1848 of a finger swiping across a fingerprint swipe sensor. The fingerprint swipe sensor depiction 1846 does not include a fingerprint depiction, indicating that none has been captured. The number "1" at the bottom of the fingerprint swipe sensor depiction 1846 is not highlighted, indicating that a first fingerprint scan has not been successfully accomplished. Below the fingerprint swipe sensor depiction 1846 and the depiction 1848 of a finger swiping across a fingerprint swipe sensor is an information statement 1850 that reads "Minimum three fingerprint captures will be necessary to enroll," indicating that three successful readings of a particular fingerprint would be necessary to successfully enroll the finger having that fingerprint. A clickable "Next" button 1852 is at the bottom right of the left swipe sensor screenshot 1841*a*.

Referring still to FIG. 18*b*, an arrow 1853 indicates that the user would proceed from the left swipe sensor screenshot 1841*a* to the right swipe sensor screenshot 1841*b*. A title 1840*b* at the top of the right swipe sensor screenshot 1841*b* reads "Capture Fingerprint." A fingerprint icon 1842*b* is below the title 1840*b* in a left window 1843*b* on the (viewer's) left side of the right swipe sensor screenshot 1841*b*. Below the title 1840*b* in a right window 1845*b* on the (viewer's) right side of the right swipe sensor screenshot 1841*b* is a fingerprint swipe sensor depiction 1854, depicted as having a fingerprint, and a depiction 1855 of a finger not touching a fingerprint swipe sensor. The fact that the fingerprint swipe sensor depiction 1854 is depicted as having a fingerprint indicates that a fingerprint has successfully been captured. This is confirmed with the highlighting of the number "1" at the bottom of the fingerprint swipe sensor depiction 1854, meaning that it is the first capture (of a minimum of three captures) of the fingerprint for the selected finger. Below the fingerprint swipe sensor depiction 1854 and the depiction 1855 of a finger not touching a fingerprint swipe sensor is an information statement 1856 that reads "Minimum three fingerprint captures will be necessary to enroll." A clickable "Next" button 1858 is at the bottom right of the right swipe sensor screenshot 1841*b*.

FIG. 18*c* depicts a screenshot 1860 from a pre-boot GUI for acknowledging successful fingerprint enrollment, in accordance with one or more embodiments. A title 1862 at the top of the screenshot 1860 reads "Verify Fingerprint." A fingerprint-finger-checkmark icon 1864 is below the title 1862 in a left window 1865 on the (viewer's) left side of the screenshot 1860. Below the title 1862 in a right window 1866 on the (viewer's) right side of the screenshot 1860 is a fingerprint sensor depiction 1867 depicted as having a fingerprint and a depiction 1868 of a finger not touching a fingerprint sensor. The fact that the fingerprint sensor depiction 1867 is depicted as having a fingerprint indicates that a fingerprint has successfully been captured. In contrast to the fingerprint swipe sensor depiction 1854 of FIG. 18*b*, there is no number below the fingerprint sensor depiction 1867 in FIG. 18*c*. This implies that all of the required three fingerprint captures of the finger in question have been successfully accomplished. This is confirmed by a first information box 1869 at the top of the right window 1866 that reads "The selected finger has been enrolled in SED Management Software" and by a second information statement 1870 that reads "Verification Successful," located below the fingerprint sensor depiction 1867 and the depiction 1868 of a finger not touching a fingerprint sensor. A clickable "Next" button 1872 is at the bottom right of the screenshot 1860.

Figure 18D:
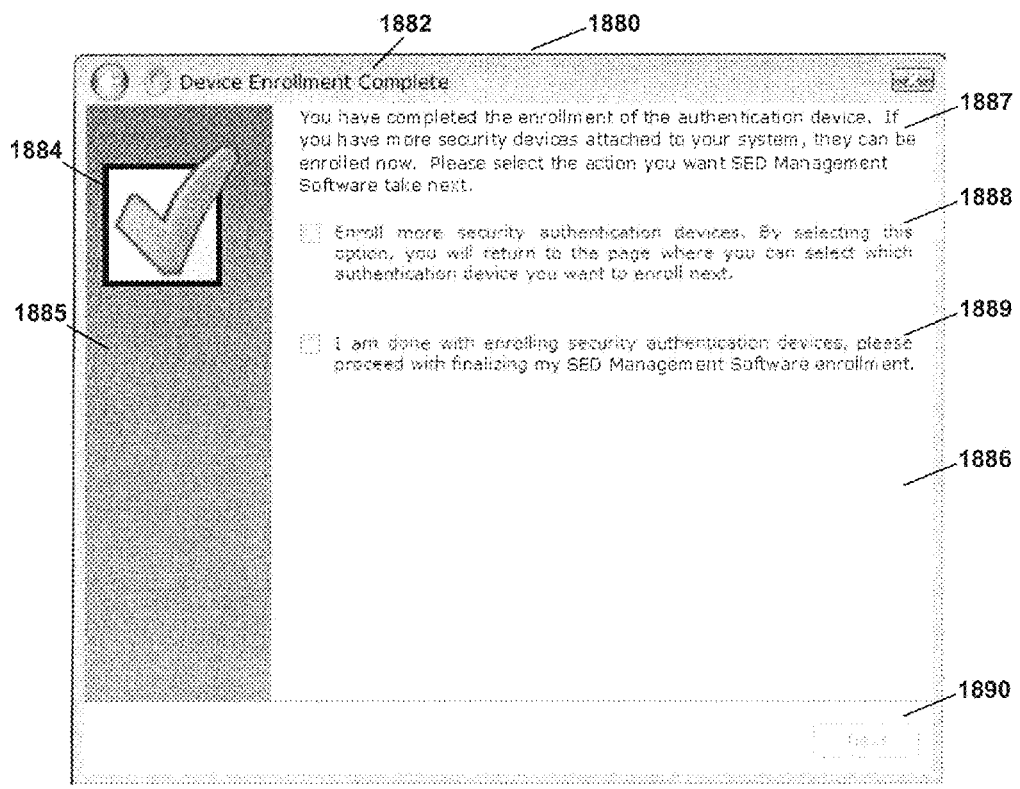

FIG. 18*d* depicts a screenshot 1880 from a pre-boot GUI for acknowledging successful device enrollment, in accordance with one or more embodiments. A title 1882 at the top of the screenshot 1880 reads "Device Enrollment Complete." A checkmark icon 1884 is below the title 1882 in a left window 1885 on the (viewer's) left side of the screenshot 1880. In a right window 1886 on the (viewer's) right side of the screenshot 1880 is an instruction statement 1887 and two (top and bottom) option statements 1888, 1889, each having clickable boxes (a top option box and a bottom option box, respectively). The instruction statement 1887 reads: "You have completed the enrollment of the authentication device. If you have more security devices attached to your system, they can be enrolled now. Please select the action you want SED Management Software [to] take next." The top option statement 1888 reads: "Enroll more security authentication devices. By selecting this option, you will return to the page where you can select which authentication device you want to enroll next." The bottom option statement 1889 reads: "I am done with enrolling security authentication devices, please proceed with finalizing my SED Management Software enrollment." A user would click the box beside the top option or the bottom option to select one of the two options 1888, 1889. A clickable "Next" button 1890 is at the bottom right of the screenshot 1860. If the top option box of the top option statement 1888 is clicked and the user clicks the clickable "Next" button 1890, the user will be taken to a screen such as the screenshot 1750 of FIG. 17*c*, to allow the user to select another authentication device to enroll. If the bottom option box of the bottom option statement 1889 is clicked and the user clicks the clickable "Next" button 1890, the user will be taken to a "Backup User Profile" screen, such as screenshot 1780 of FIG. 17*e*.

Figure 19A:
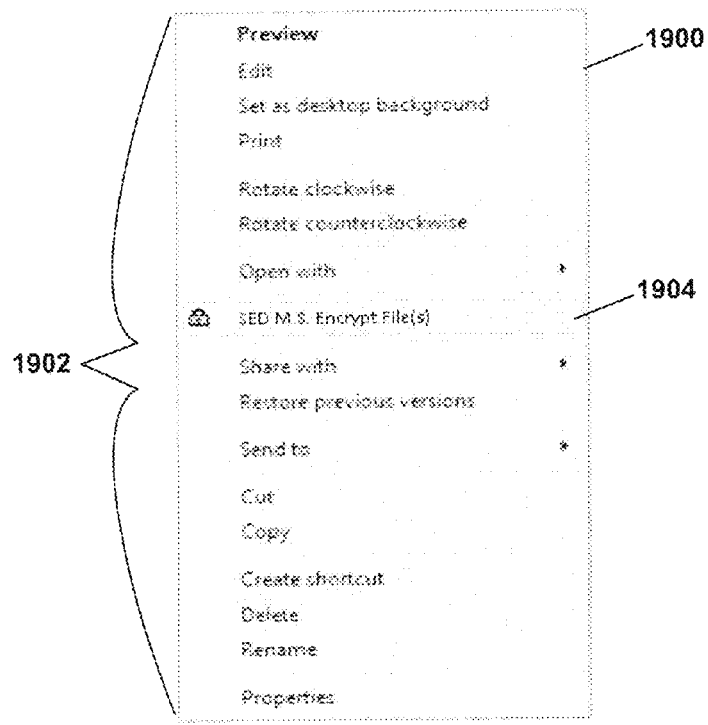
FIG. 19a depicts a screenshot from a pre-boot GUI for supplemental encryption, in accordance with one or more embodiments.

FIG. 19*a* depicts a partial screenshot 1900 from a pre-boot GUI for supplemental encryption, in accordance with one or more embodiments. The partial screenshot 1900 depicts a task selection list 1902 with a task 1904 entitled "SED M.S. Encrypt file(s)" highlighted. A user could select the task 1904 to encrypt files.

Figure 19B:
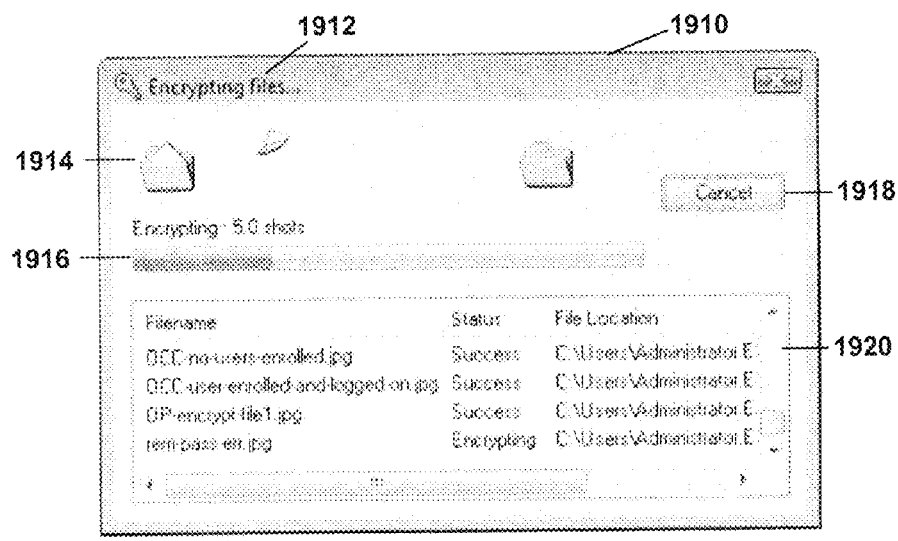
FIG. 19b depicts a screenshot from a pre-boot GUI depicting encryption of a folder containing multiple files, in accordance with one or more embodiments.

FIG. 19*b* depicts a screenshot 1910 from a pre-boot GUI depicting encryption of a folder containing multiple files, in accordance with one or more embodiments. A title 1912 at the top of the screenshot 1910 reads "Encrypting files . . . ," indicating encryption of the folder containing multiple files is in progress. Below the title 1912 is a depiction 1914 of two folders, a left folder that is not encrypted and a right folder that is encrypted. The depiction 1914 includes a file passing from the left folder to the right folder, indicating encryption is in progress. A progress bar 1916 is below the depiction 1914, with the words "Encrypting: 5.0 shots" above it. A clickable "Cancel" button 1918 is to the (viewer's) right of the depiction 1914. A list 1920 of files being encrypted is below the progress bar 1916. A status column of the list 1920 indicates that three files first on the list have been encrypted, while a fourth file is in the process of being encrypted.

To decrypt a file or folder, a user may right-click the file or folder to which the user would like to regain normal access. The user would then click "SecureDrive Decrypt File(s)" from a contextual menu that would open. The SED management software would then prompt the user to enter his or her authentication. Alternatively, the user could right-click the file or folder to which the user would like to regain normal access and select "Open," or double-click the file or folder to which the user would like to regain normal access. Either of these actions would cause the SED management software to prompt the user to authenticate. In one embodiment, once decrypted, the file or folders would remain so unless the user encrypts them again. In one embodiment, if the user encrypts a folder containing multiple files, all the contained files will be encrypted. Files copied or moved to the encrypted folder will also be encrypted. The user can open and edit the contents of these files, and so long as they stay in the encrypted folder and when the files are closed, the files will automatically be encrypted.

Figure 20A:
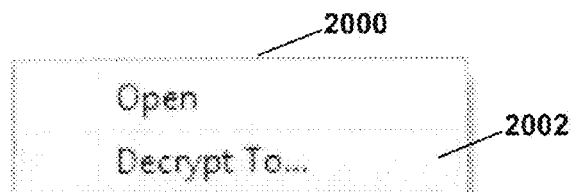
FIG. 20a depicts a screenshot from a pre-boot GUI depicting selection of a "Decrypt To" function, in accordance with one or more embodiments.

FIG. 20*a* depicts a screenshot 2000 from a pre-boot GUI depicting selection of a "Decrypt To" function, in accordance with one or more embodiments. To decrypt a file contained in an encrypted folder, a user may right-click it. A contextual menu will open, as depicted in the screenshot 2000. The user may select a "Decrypt To . . . " function 2002, which would allow the user to select a location to which the decrypted file will be saved. The user would click OK to accept the location the user selected. A copy of the file would be decrypted to the target directory. The original encrypted file would remain in the encrypted folder.

Figure 20B:
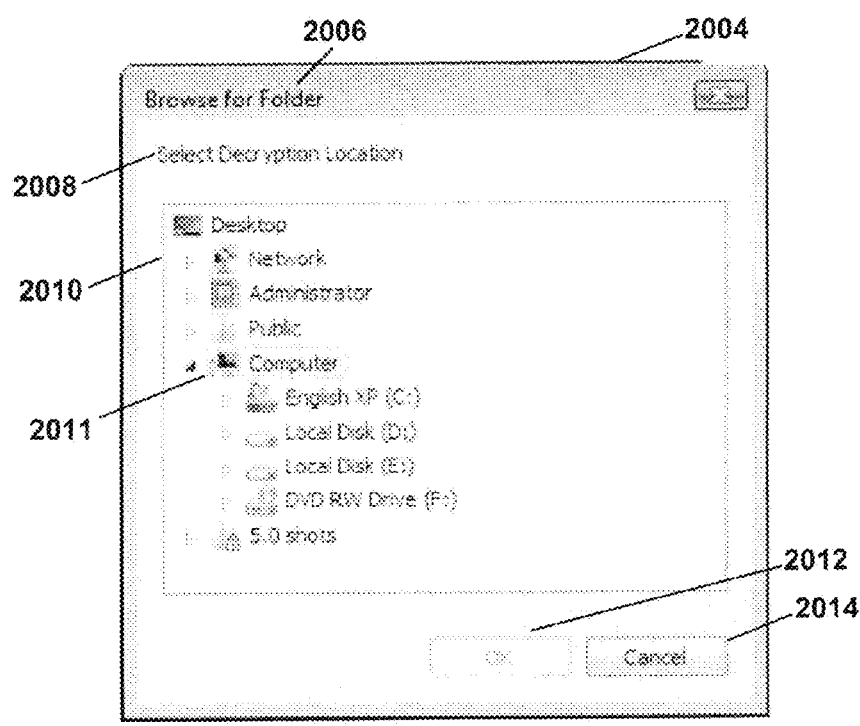
FIG. 20b depicts a screenshot from a pre-boot GUI depicting selection of a decryption location, in accordance with one or more embodiments.

FIG. 20*b* depicts a screenshot 2004 from a pre-boot GUI depicting selection of a decryption location, in accordance with one or more embodiments. If the user selects the "Decrypt To . . . " function 2002, as discussed in the paragraph immediately above, the user may be taken to a screen such as that shown by screenshot 2004. A title 2006 at the top of the screenshot 2004 reads "Browse for Folder." An instruction box 2008 below the title 2006 reads "Select Decryption Location." A browsing window 2010 below the instruction box 2008 displays potential decryption locations. A "Computer" folder 2011 is highlighted in the screenshot 2004. A clickable "OK" button 2012 and a clickable "Cancel" button 2014 are below the browsing window 2010.

Figure 21A:
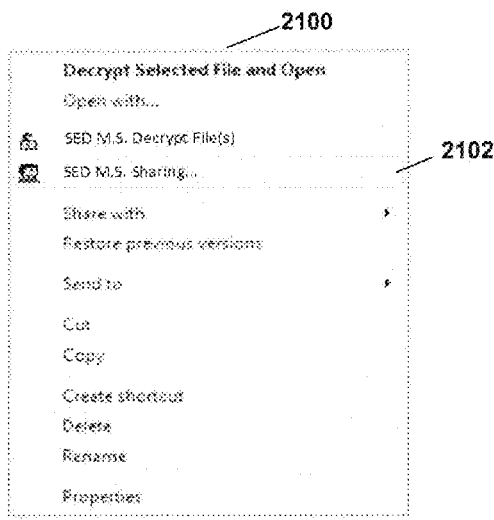
FIG. 21a depicts a screenshot from a pre-boot GUI depicting selection of a "secure sharing" function, in accordance with one or more embodiments.

FIG. 21*a* depicts a screenshot 2100 from a pre-boot GUI depicting selection of a "secure sharing" function, in accordance with one or more embodiments. To share an encrypted file with a second SED management software user, a first user may right click the encrypted file to be shared. The screenshot 2100 depicts a contextual menu of functions that may open when the first user right clicks the encrypted file. The contextual menu includes a "SED M.S. Sharing" function 2102, which is shown in FIG. 21*a* as being highlighted, indicating that the first user has selected the "SED M.S. Sharing" function 2102.

Figure 21B:
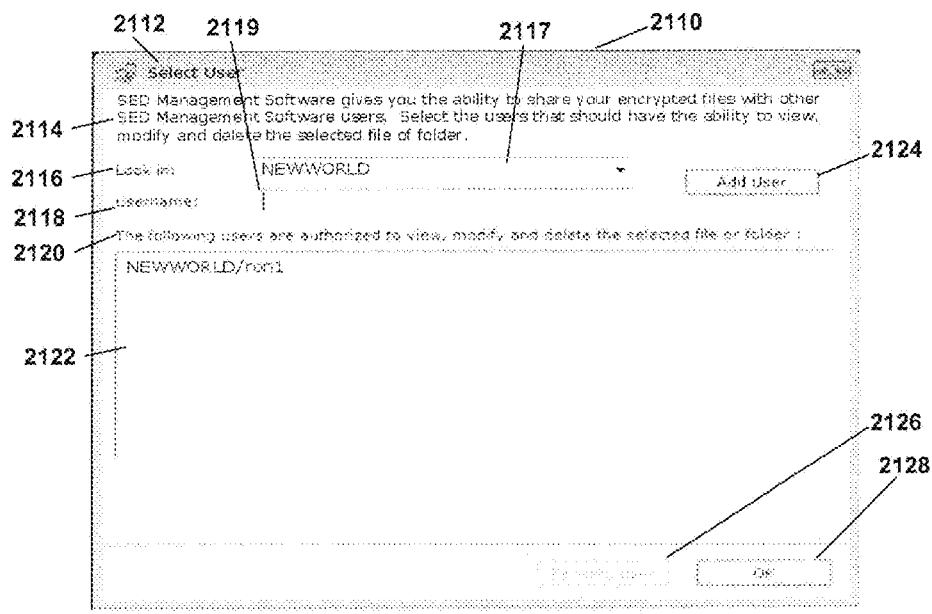
FIG. 21b depicts a screenshot from a pre-boot GUI depicting selection of a user with whom to share encrypted data, in accordance with one or more embodiments.

FIG. 21*b* depicts a screenshot 2110 from a pre-boot GUI depicting selection of one or more users with whom to share encrypted data, in accordance with one or more embodiments. Once the first user has selected the "SED M.S. Sharing" function 2102 (FIG. 21*a*), as discussed in the immediately preceding paragraph, the first user would be taken to a screen such as that of screenshot 2110. A title 2112 at the top of the screenshot 2110 reads "Select User." An instruction box 2114 below the title 2112 reads: "SED Management Software gives you the ability to share your encrypted files with other SED Management Software users. Select the users that should have the ability to view, modify and delete the selected file of [sic, or] folder." A directory instruction box 2116 reads "Look in:" and a pull-down directory menu 2117 to the (viewer's) right of the directory instruction box 2116 allows the user to select a directory. In the screenshot 2110, a directory called "NEWWORLD" has been selected from the pull-down directory menu 2117. A data-entry instruction box 2118 below the directory instruction box 2116 reads "Username:." A data entry box 2119 (explained further below) is to the right of the data-entry instruction box 2118. An information box 2120 below the data-entry instruction box 2118 reads "The following users are authorized to view, modify and delete the selected file or folder:." A window 2122 below the information box 2120 displays all the usernames of the users who are authorized to view, modify and delete the selected encrypted file or folder. In the screenshot 2110, since a particular directory ("NEWWORLD") has been selected from the pull-down directory menu 2117, all the users in the selected directory ("NEWWORLD") appear in the window 2122; in this case, the sole user in the selected directory ("NEWWORLD") is the user having the username "NEWWORLD/ron1," which username is displayed in the window 2122. A clickable "Add User" button 2124 is depicted to the right of the pull-down directory menu 2117 and the data entry box 2119. The first user could type the username of the second SED management software user in the data entry box 2119 and click the "Add User" button 2124 to share the encrypted file or folder with the second SED management software user. The username of the second SED management software user would then appear in the window 2122. A clickable "Remove User" button 2126 and a clickable "OK" button 2128 are at the bottom of the screenshot 2110. The first user could highlight a username displayed in the window 2122 and click the "Remove User" button 2126 to deny access to the encrypted file or folder to the user having the highlighted username. When the first user is satisfied with the selection of users made, the user may click the "OK" button 2128.

Figure 22:
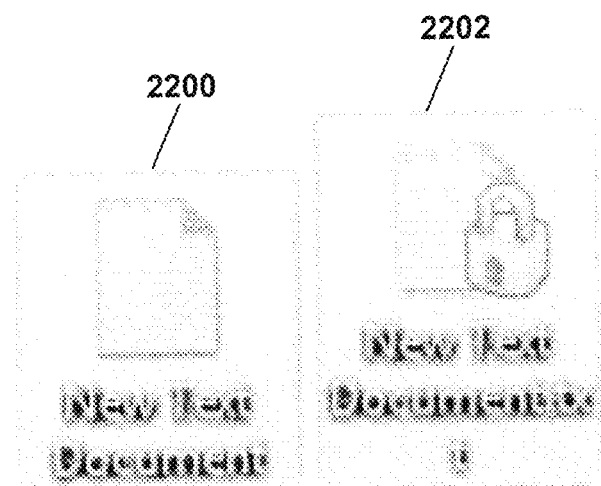
FIG. 22 depicts icons from a pre-boot GUI illustrating a file before encryption and the file after encryption, in accordance with one or more embodiments.

FIG. 22 depicts first and second icons 2200, 2202 from a pre-boot GUI illustrating a file before encryption and the file after encryption, in accordance with one or more embodiments. First icon 2200 illustrates a non-encrypted file, while second icon 2202 illustrates an encrypted file.

Figure 23:
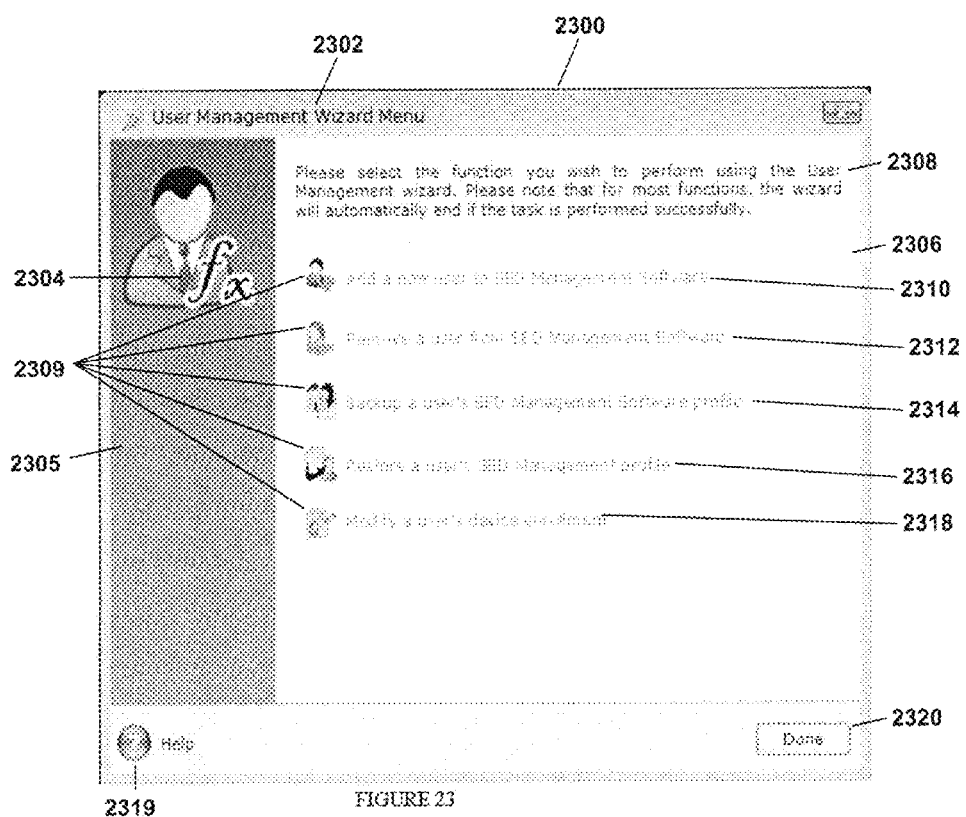
FIG. 23 depicts a screenshot from a pre-boot GUI of a screen for performing various user management functions, in accordance with one or more embodiments.

FIG. 23 depicts a screenshot 2300 from a pre-boot GUI of a screen for performing various user management functions, in accordance with one or more embodiments. A title 2302 at the top of the screenshot 2300 reads "User Management Wizard Menu." A large icon 2304 of a person with the letters "fx" is within a left window 2305 of the screenshot 2300. An instruction box 2308 at the top of a right window 2306 of the screenshot 2300 reads: "Please select the function you wish to perform using the User Management wizard. Please note that for most functions, the wizard will automatically end if the task is performed successfully." A list 2309 of functions is below the instruction box 2308, each listed function including a small icon and text. A first function 2310 on the list 2309 of functions includes an icon depicting a person and a plus sign, and a text that reads "Add a new user to SED Management Software." A second function 2312 on the list 2309 of functions includes an icon depicting a person and a minus sign, and a text that reads "Remove a user from SED Management Software." A third function 2314 on the list 2309 of functions includes an icon depicting a person, a document, and an arrow pointing from the person to the document, and a text that reads "Backup a user's SED Management profile." A fourth function 2316 on the list 2309 of functions includes an icon depicting a document, a person, and an arrow pointing from the document to the person, and a text that reads "Restore a user's SED Management profile." A fifth function 2318 on the list 2309 of functions includes an icon depicting a writing implement and a document (the document having a depiction of a person on it), and a text that reads "Modify a user's device enrollment." A clickable "Help" button 2319 and a clickable "Done" button 2320 are at the bottom of the screenshot 2300.

Figure 24:
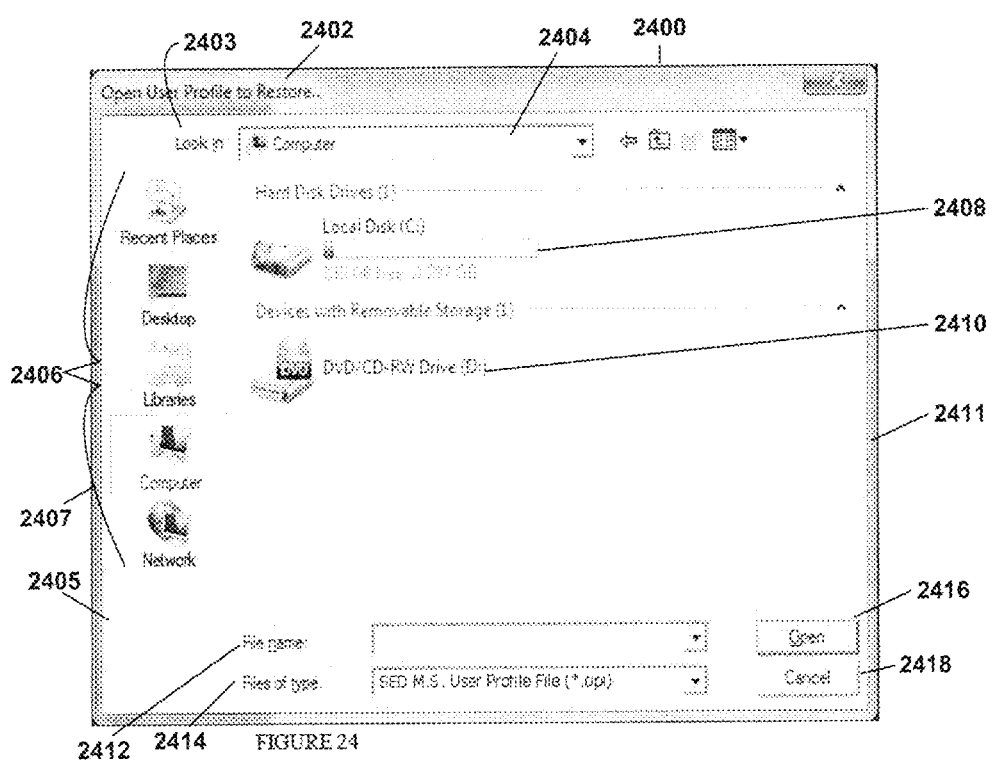
FIG. 24 depicts a screenshot from a pre-boot GUI of a screen used for selecting a user profile to restore, in accordance with one or more embodiments.

FIG. 24 depicts a screenshot 2400 from a pre-boot GUI of a screen used for selecting a user profile to restore, in accordance with one or more embodiments. A title 2402 at the top of the screenshot 2400 reads "Open User Profile to Restore . . ." An instruction box 2403 with a pull-down menu 2404 to its right is below the title 2402. The instruction box 2403 reads "Look in:." The pull-down menu 2404 includes locations (such as those identified by icons 2406, described below), from among which the location "Computer" is shown as having been selected. A list of labeled icons 2406 representing locations are within a left window 2405 below the instruction box 2403. The "Computer" labeled icon 2407 is shown as being highlighted. A right window 2411 below the pull-down menu 2404 has a top section 2408 and a bottom section 2410. The top section 2408 is labeled "Hard Disk Drives (1)," the number "1" indicating that on the computer represented, there is one hard disk drive. Within the top section 2408 is an icon representing a local disk, the words "Local Disk (C:)," and a bar depicting the total amount of storage for the local disk "C" and indicating how much of that total amount of storage has occupied, with the words "285 GB free of 297 GB" below the bar. The bottom section 2410 is labeled "Devices with Removable Storage (1)," the number "1" indicating that on the computer represented, there is one device with removable storage. Within the bottom section 2410 is a DVD/CD-RW icon and the words "DVD/CD-RW Drive (D:)." A second pull-down menu 2412 is below the right window 2411. The second pull-down menu 2412 is labeled "File name:." As shown, no filename has been selected from the second pull-down menu 2412. A third pull-down menu 2414 is below the second pull-down menu 2412. The third pull-down menu 2414 is labeled "Files of type:." As shown, the file type "SED M.S. User Profile File (*.opi)" has been selected from the third pull-down menu 2414. A clickable "Open" button 2416 (for opening the selected file) and a clickable "Cancel" button 2418 (for canceling the operation) are on the bottom right of the screenshot 2400.

Figure 25:
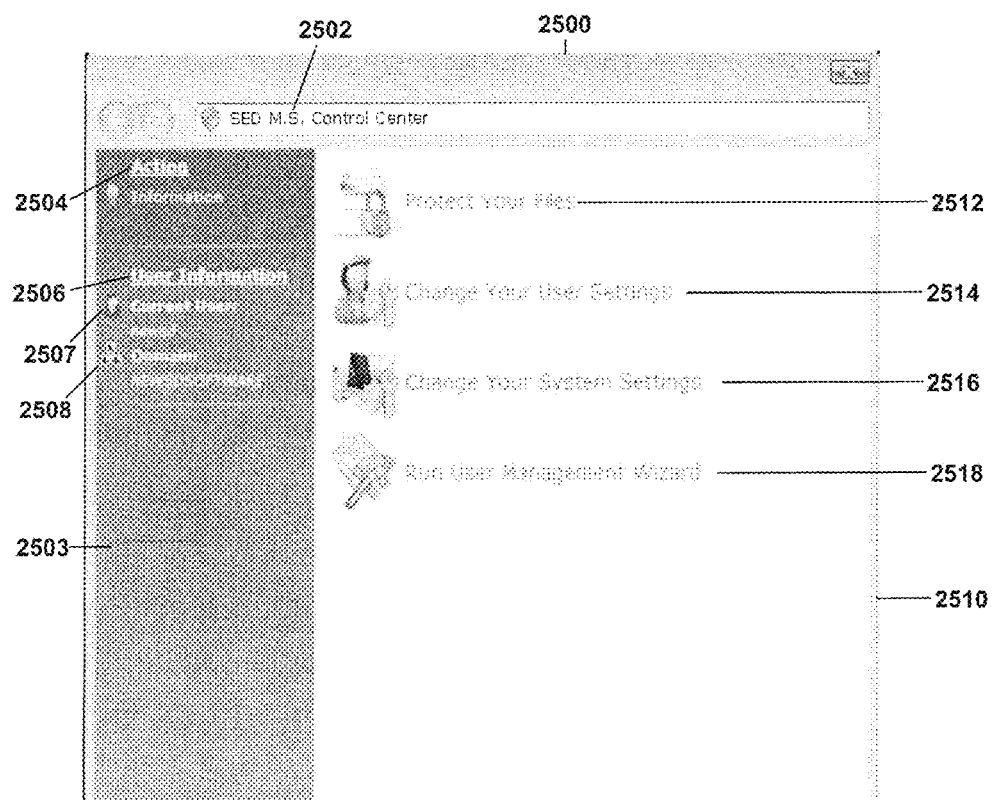
FIG. 25 depicts a screenshot from a pre-boot GUI of an SED management software control center main window, in accordance with one of more embodiments.

FIG. 25 depicts a screenshot 2500 from a pre-boot GUI of an SED management software control center main window, in accordance with one or more embodiments. A title 2502 of the screenshot 2500 reads "SED M.S. Control Center." A right window 2503 below the title 2502 includes an "Action" section 2504 and a "User Information" section 2506. The "Action" section 2504 includes the word "Action," and, below the word "Action," a light bulb icon with the word "Information." The "User Information" section 2506 includes an item 2507 comprising a person icon with the words "Current User:" beside the person icon. The current user, who in the screenshot of 2500 is listed as "newsd" is listed below the item 2507. A second item 2508 comprising an icon resembling three computer screens arranged in a triangle and the word "Domain:" are also in the "User Information" section 2505. Below the second item 2508, is the word "NEWSD-SOFTWARE," representing a domain name for the listed current user "newsd." In a right window 2510 is a list of functions, each having an icon and a label. The first function 2512 has an icon depicting a document and a lock, and the label "Protect Your Files." The second function 2514 has an icon depicting a person, a gear, and a wrench, and the label "Change Your User Settings." The third function 2516 has an icon depicting a computer, a computer monitor, a gear, and a wrench, and the label "Change Your System Settings." The fourth function 2518 has an icon depicting a document on a clipboard and a magic wand, and the label "Run User Management Wizard."

Figure 26:
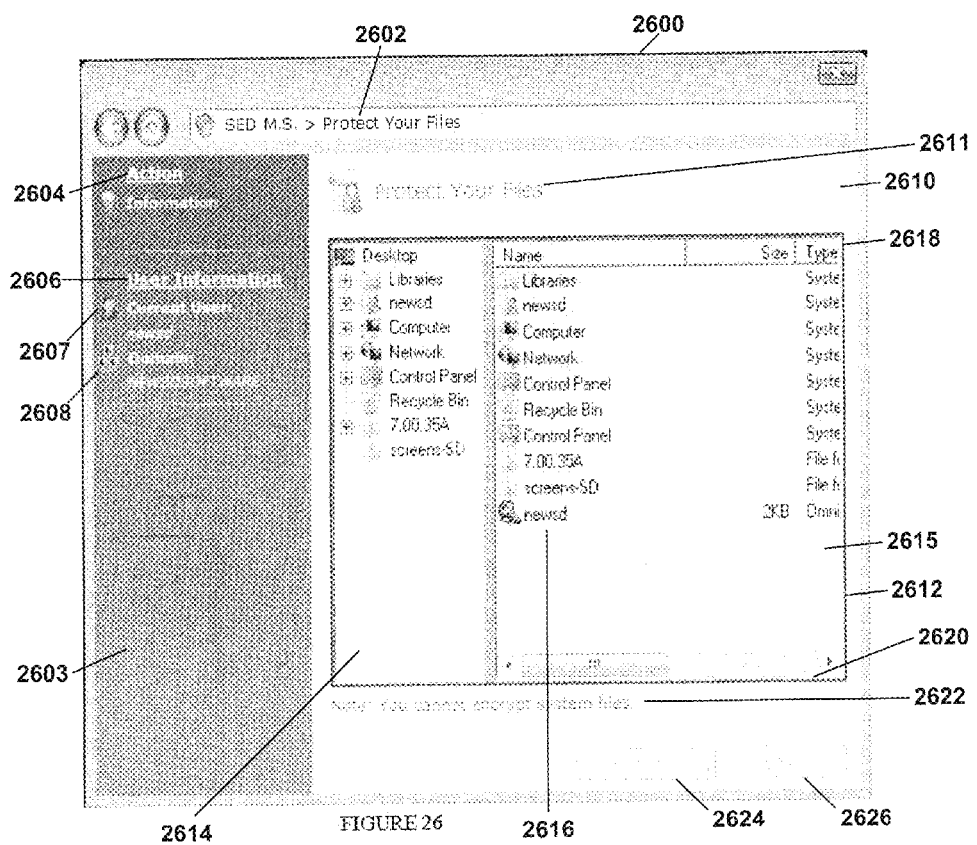
FIG. 26 depicts a screenshot from a pre-boot GUI of a screen used for selecting files to protect, in accordance with one or more embodiments.

FIG. 26 depicts a screenshot 2600 from a pre-boot GUI of a screen used for selecting files to protect, in accordance with one or more embodiments. A title 2602 of the screenshot 2600 reads "SED M.S.>Protect Your Files," indicating that the first function 2512 ("Protect Your Files") was selected in the previous screen of screenshot 2500 (FIG. 25). A left window 2603 below the title 2602 includes an "Action" section 2604 and a "User Information" section 2606. The "Action" section 2604 includes the word "Action," and, below the word "Action," a light bulb icon with the word "Information." The "User Information" section 2606 includes an item 2607 comprising a person icon, labeled "Current User:." The current user, who in the screenshot of 2600 is listed as "newsd," is listed below the item 2607. A second item 2608 comprising an icon resembling three computer screens arranged in a triangle, labeled "Domain:," is also in the "User Information" section 2606. Below the second item 2608, is the word "NEWSDSOFTWARE," representing a domain name for the listed current user "newsd." In a right window 2610 is a window title 2611 comprising an icon depicting a document and a lock, and the text "Protect your Files." Below the window title 2611 is a vertically partitioned sub-window 2612. In the left half 2614 of the vertically partitioned sub-window 2612 is a desktop icon labeled "Desktop," representing a desktop of a computer. Below the desktop icon is a list of locations within the desktop. The list of locations within the desktop depicted (by icons and labels) in the left half 2614 of the vertically partitioned sub-window 2612 includes "Libraries," "newsd," "Computer," "Network," "Control Panel," Recycle Bin," "7.00.35A," and "screens-SD." In the right half 2615 of the vertically partitioned sub-window 2612 is the list of locations within the desktop depicted in the left half 2614 of the vertically partitioned sub-window 2612, with the addition of new location 2616 represented by a key and arrow icon labeled "newsd." At the top of the right half 2615 of the vertically partitioned sub-window 2612, is an information bar 2618, with (displayed) column titles of "Name," Size," and "Type," for the locations listed below the information bar 2618. At the bottom of the right half 2615 of the vertically partitioned sub-window 2612 is a scroll bar 2620. An information box 2622, containing the text "Note: You cannot encrypt system files," is below the vertically partitioned sub-window 2612. A clickable "Encrypt" button 2624 and a clickable "Decrypt" button 2626, which could be clicked once a file is selected by a user, are below the information box 2622. (The "Encrypt" button 2624 and the "Decrypt" button 2626 are not depicted as active in the screenshot 2600, since no file or folder has been selected.)

Figure 27A:
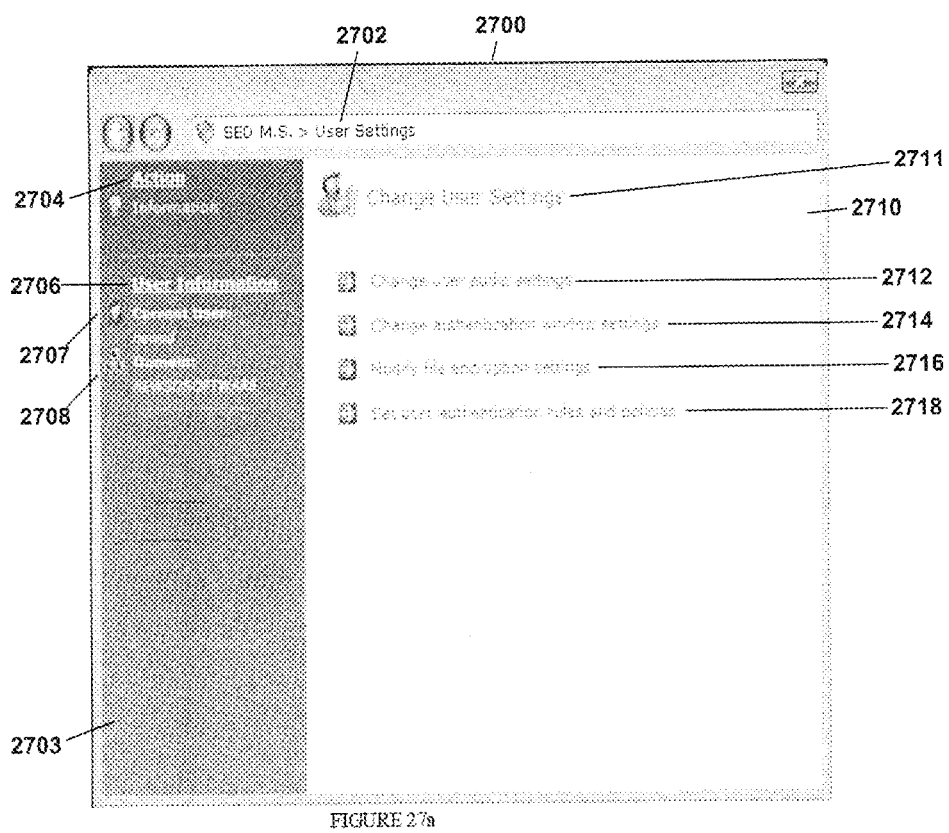
FIG. 27a depicts a screenshot from a pre-boot GUI of a screen used to change user settings, in accordance with one or more embodiments.

FIG. 27a depicts a screenshot 2700 from a pre-boot GUI of a screen used to change user settings, in accordance with one or more embodiments. A title 2702 of the screenshot 2700 reads "SED M.S.>User Settings," indicating that the second function 2514 ("Change Your User Settings") was selected in the previous screen of screenshot 2500 (FIG. 25). A left window 2703 below the title 2702 includes an "Action" section 2704 and a "User Information" section 2706. The "Action" section 2704 includes the text "Action," and below the text "Action," a light bulb icon with the text "Information." The "User Information" section 2706, includes an item 2707 comprising a person icon labeled "Current User:." The current user, who in the screenshot of 2700 is listed as "newsd," is listed below the item 2707. A second item 2708 comprising an icon resembling three computer screens arranged in a triangle, labeled "Domain:," is also in the "User Information" section 2706. Below the second item 2708, is the text "NEWSDSOFTWARE," representing a domain name for the listed current user "newsd." In a right window 2710 is a window title 2711 comprising an icon depicting a person, a gear and a wrench, and the text "Change User Settings." Below the window title 2711 is a list of four functions, each listed function being illustrated with a boxed arrow pointing from left to right and a text describing the function. The first function 2712 of the list is described as "Change user audio settings." The second function 2714 of the list is described as "Change authentication window settings." The third function 2716 of the list is described as "Modify file encryption settings." The fourth function 2718 of the list is described as "Set user authentication rules and policies." A user may select any of the four listed functions 2712, 2714, 2716, 2718 by clicking on the boxed arrow of the particular function the user wants to select.

Figure 27B:
FIG. 27b depicts a cropped screenshot from a pre-boot GUI of a screen used to change user audio settings, in accordance with one or more embodiments.

FIG. 27b depicts a cropped screenshot 2720 from a pre-boot GUI of a screen used to change user audio settings, in accordance with one or more embodiments. A title 2722 of the screenshot 2720 includes an icon depicting a speaker, music notes, and a gear, and the text "Change User Audio Settings," indicating that the first function 2712 ("Change User Audio Settings") was selected in the previous screen of screenshot 2700 (FIG. 27a). Below title 2722 there is a list of three items, each item including a radio button, followed by a title, and with an explanation below the title. The first item 2724 is entitled "Full Audio Prompts," and its explanation reads: "SED Management Software will give you full audio prompts when certain SED Management Software operations are performed. You can customize your audio prompts from the Audio Control Panel under the SED Management Software." The second item 2726 is entitled "Only Beep Prompts," and its explanation reads: "SED Management Software will only use the system beep as audio prompts for SED Management Software operations." The third item 2728 is entitled "No Audio Prompts," and its explanation reads: "No audio prompts will be given to the user when certain SED Management Software operations are performed." As shown, the first item 2724 ("Full Audio Prompts") has been selected, as indicated by the fact that its radio button has been selected (as illustrated by its being filled in).

Figure 27C:
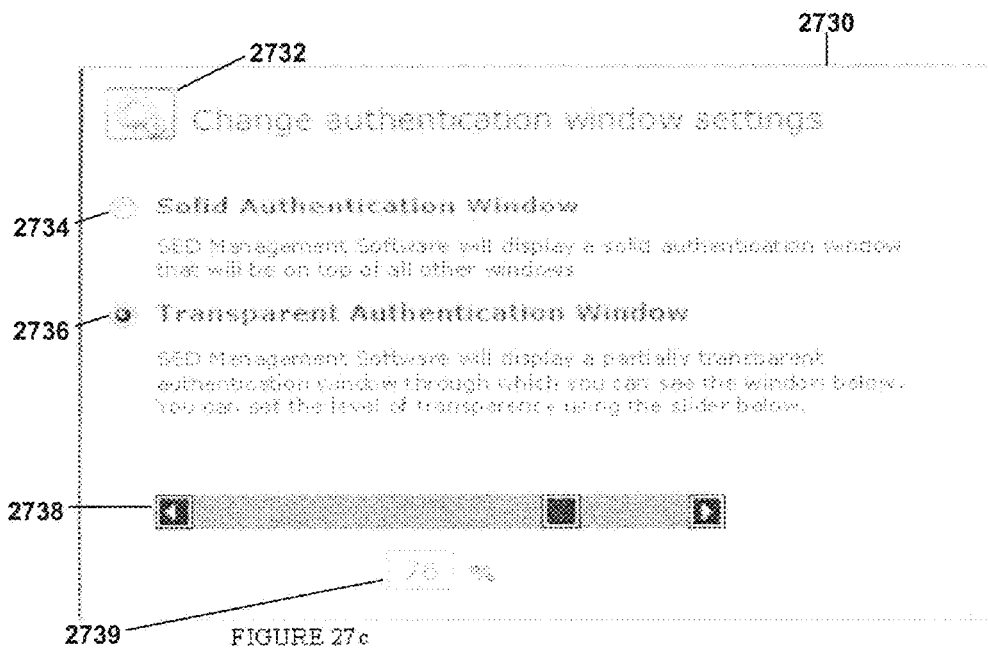
FIG. 27c depicts a cropped screenshot from a pre-boot GUI of a screen used to change user authentication window settings, in accordance with one or more embodiments.

FIG. 27c depicts a cropped screenshot 2730 from a pre-boot GUI of a screen used to change user authentication window settings, in accordance with one or more embodiments. A title 2732 of the screenshot 2730 includes an icon depicting two gears and the text "Change Authentication Window Settings," indicating that the second function 2714 ("Change Authentication Window Settings") was selected in the previous screen of screenshot 2700 (FIG. 27a). Below title 2732 there is a list of two items, each item including a radio button, followed by a title, and with an explanation below the title. The first item 2734 is entitled "Solid Authentication Window," and its explanation reads: "SED Management Software will display a solid authentication window that will be on top of all other windows." The second item 2736 is entitled "Transparent Authentication Window," and its explanation reads: "SED Management Software will display a partially transparent authentication window through which you can see the window below. You can set the level of transparency using the slider below." A slider 2738 shown below the explanation of the second item 2736 may be used to set the level of transparency. As shown in a box 2739 below the slider 2738, the level of transparency is shown as having been set to 76%. As also shown, the radio button of the second item 2736 is filled in, indicating that "Transparent Authentication Window" has been selected.

Figure 27D:
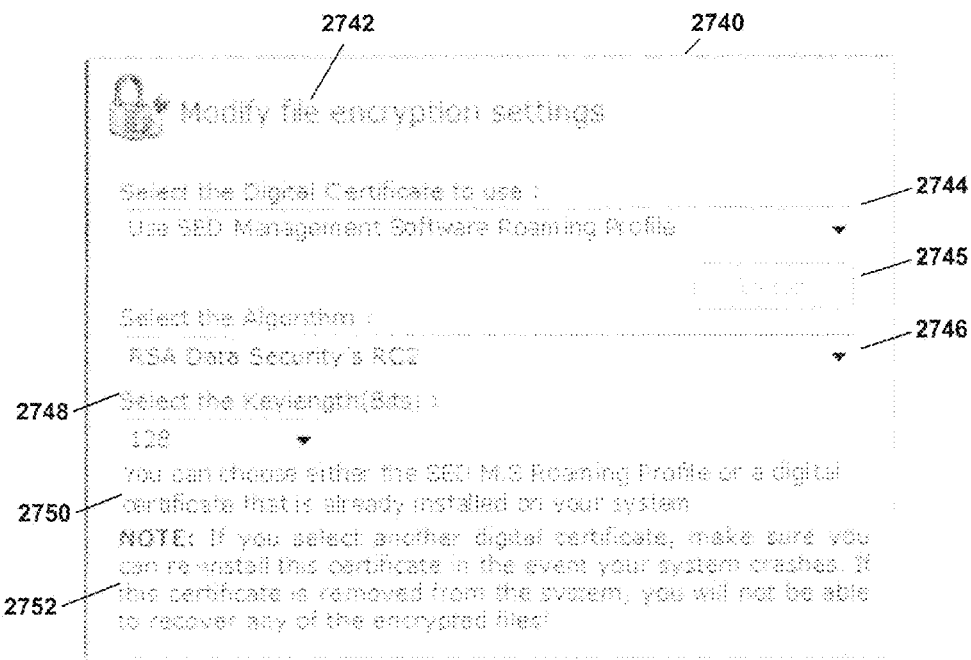
FIG. 27d depicts a cropped screenshot from a pre-boot GUI of a screen used to modify file encryption settings, in accordance with one or more embodiments.
Figure 27C:
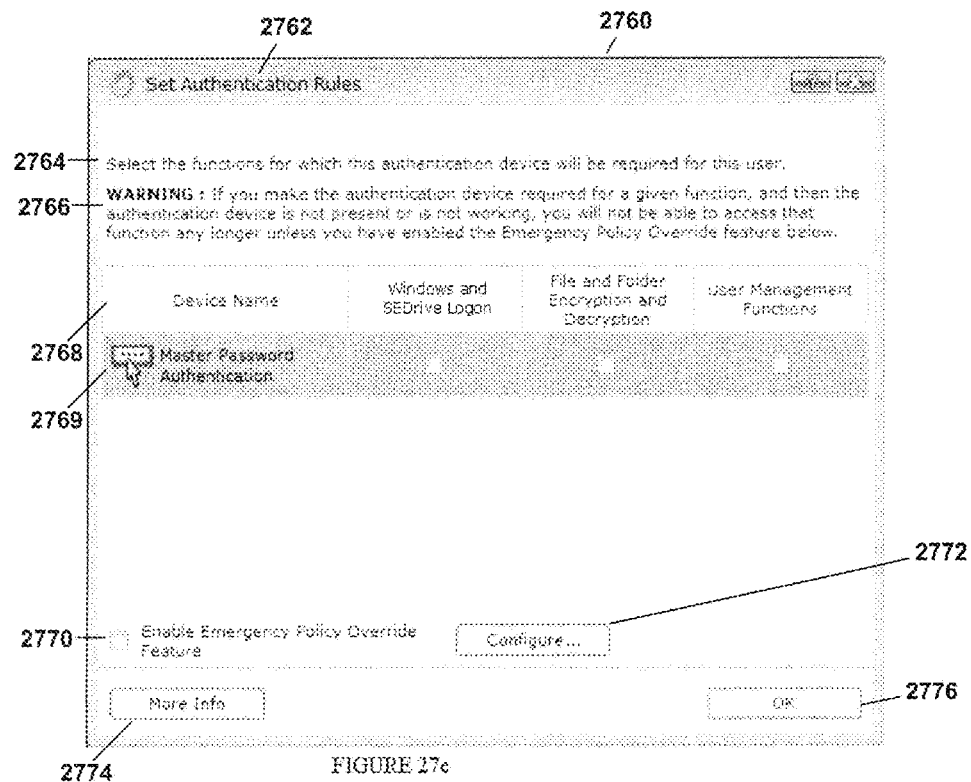

FIG. 27d depicts a cropped screenshot 2740 from a pre-boot GUI of a screen used to modify file encryption settings, in accordance with one or more embodiments. A title 2742 of the screenshot 2740 comprises an icon depicting a lock, wrench, and a gear, and the text "Modify file encryption settings," indicating that the third function 2716 ("Modify file encryption settings") was selected in the previous screen of screenshot 2700 (FIG. 27a). Three pull-down menus, each with an instruction above it, are listed below the title 2742. A first pull-down menu 2744 has an instruction that reads "Select the Digital Certificate to use:." The first pull-down menu 2744 displays a selection of "Use SED Management Software Roaming Profile," indicating the digital certificate currently selected. An (un-activated) "Detail" button 2745 is below the first pull-down menu 2744. A second pull-down menu 2746 has an instruction that reads "Select the Algorithm:." The second pull-down menu 2746 displays an algorithm selection of "RSA Data at Security's RC2." A third pull-down menu 2748 has an instruction that reads "Select the Keylength (Bits):." The third pull-down menu 2748 displays a keylength selection of 128 bits. An information box 2750 below the third pull-down menu 2748 reads: "You can choose either the SED M.S. Roaming Profile or a digital certificate that is already installed on your system." A note box 2752 below the information box 2750 reads: "NOTE: If you select another digital certificate, make sure you can re-install this certificate in the event that your system crashes. If this certificate is removed from the system, you will not be able to recover any of the encrypted files!"

FIG. 27e depicts a screenshot 2760 from a pre-boot GUI of a screen used to set authentication rules, in accordance with one or more embodiments. A title 2762 of the screenshot 2760 comprises a gear icon and the text "Set Authentication Rules," indicating that the fourth function 2718 ("Set user authentication rules and policies") was selected in the previous screen of screenshot 2700 (FIG. 27a). An instruction box 2764 below the title 2762 reads "Select the functions for which this authentication device will be required for this user." A warning box 2766 below the instruction box 2764 reads: "WARNING: If you make the authentication device required for a given function, and then the authentication device is not present or is not working, you will not be able to access that function any longer unless you have enabled the Emergency Policy Override feature below." A chart 2768 below the warning box 2766 includes columns entitled (from left to right) "Device Name," "Windows and SEDrive Logon," "File and Folder Encryption and Decryption," and "User Management Functions." The chart 2768 has one device 2769 entitled "Master Password Authentication" listed under the "Device Names" title in a row ("first row") below the titles. The first row includes checkable boxes in the columns entitled "Windows and SEDrive Logon," "File and Folder Encryption and Decryption," and "User Management Functions." An additional checkable box 2770 entitled "Enable Emergency Policy Override Feature" is below the chart 2768. A clickable "Configure . . . " button 2772 is to the right of the additional checkable box 2770 and its title. A clickable "More Info" button 2774 and a clickable "OK" button 2776 are at the bottom of the screenshot 2760.

Figure 27F:
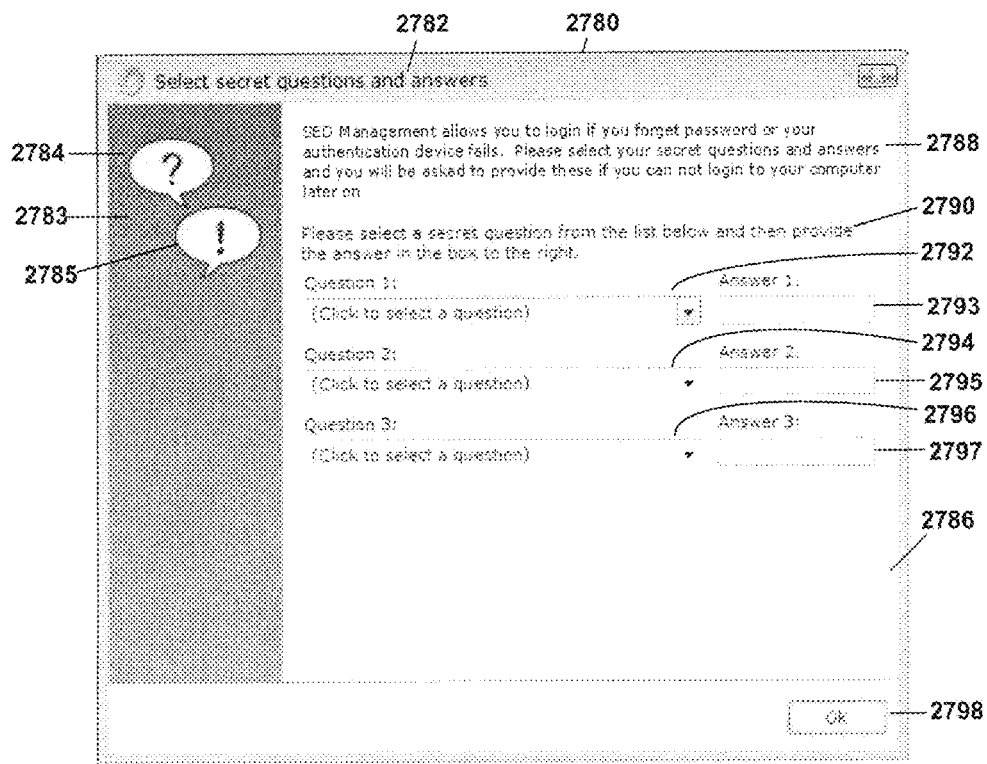
FIG. 27f depicts a screenshot from a pre-boot GUI of a screen used to activate emergency logon functionality, in accordance with one or more embodiments.

FIG. 27f depicts a screenshot 2780 from a pre-boot GUI of a screen used to activate an emergency logon function, in accordance with one or more embodiments. A title 2782 of the screenshot 2780 comprises a gear icon and the text "Select secret questions and answers." A left window 2783 below the title 2782 includes a question mark icon 2784 and an exclamation mark icon 2785. A right window 2786 below the title 2782 includes an information box 2788, which contains the text: "SED Management allows you to login if you forget password or your authentication device fails. Please select your secret questions and answers and you will be asked to provide these if you can not login to your computer later on." An instruction box 2790 below the information box 2788 reads "Please select a secret question from the list below and then provide the answer in the box to the right." Below the instruction box 2790 there is a list of three questions (labeled "Question 1" 2792, "Question 2" 2794, and "Question 3" 2796), each having a pull-down menu for selecting a specific question. To the right of each question pull-down menu 2792, 2794, 2796 is a corresponding data entry box 2793, 2795, 2797 for the user to enter an answer to the selected question. A clickable "OK" button 2798 is at the bottom right of the screenshot 2780.

Figure 28A:
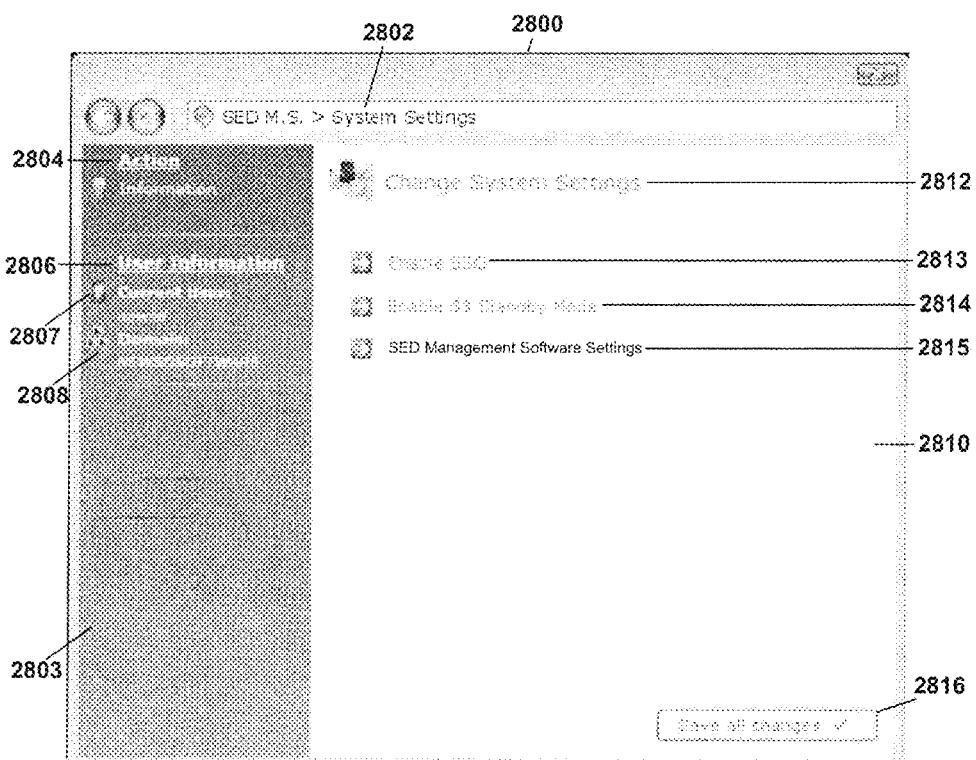
FIG. 28a depicts a screenshot from a pre-boot GUI of a screen used to change system settings, in accordance with one or more embodiments.

FIG. 28a depicts a screenshot 2800 from a pre-boot GUI of a screen used to change system settings, in accordance with one or more embodiments. A title 2802 of the screenshot 2800 reads "SED M.S.>System Settings," indicating that the third function 2516 ("Change Your System Settings") was selected in the previous screen of screenshot 2500 (FIG. 25). A left window 2803 below the title 2802 includes an "Action" section 2804 and a "User Information" section 2806. The "Action" section 2804 includes the text "Action" and, below the text "Action," a light bulb icon with the text "Information." The "User Information" section 2806 includes an item 2807 comprising a person icon labeled "Current User:." The current user ("newsd") is listed below the item 2807. A second item 2808 comprising an icon resembling three computer screens arranged in a triangle, labeled "Domain:," is also in the "User Information" section 2806. Below the second item 2808 is the text "NEWSDSOFTWARE," representing a domain name for the listed current user "newsd." In a right window 2810 is a window title 2812 comprising an icon depicting a person, a gear, and a wrench, and the text "Change System Settings." Below the window title 2812 is a list of three functions 2813, 2814, 2815, each listed function being illustrated with a boxed arrow pointing from left to right and a text describing the function. The first function 2813 of the list is described as "Enable SSO." The second function 2814 of the list is described as "Enable S3 Standby Mode." The third function 2815 of the list is described as "SED Management Software Settings." A user may select any of the three listed functions 2813, 2814, 2815 by clicking on the boxed arrow of the particular function the user wants to select (see discussion of subsequent figures). A clickable "Save All Changes" button 2816 is at the bottom of screenshot 2800.

Figure 28B:
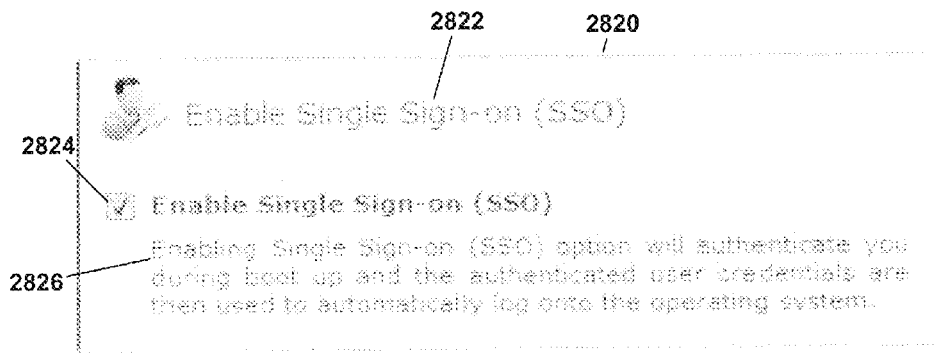
FIG. 28b depicts a cropped screenshot from a pre-boot GUI of a screen used to enable single sign on (SSO), in accordance with one or more embodiments.

FIG. 28b depicts a cropped screenshot 2820 from a pre-boot GUI of a screen used to enable single sign on (SSO), in accordance with one or more embodiments. A title 2822 of the screenshot 2820 comprises an icon depicting a person and key, and the text "Enable Single Sign-On (SSO)," indicating that the first function 2813 ("Enable SSO") was selected in the previous screen of screenshot 2800 (FIG. 28a). A clickable box 2824 entitled "Enable Single Sign-On (SSO)" is below the title 2822. As shown, the clickable box 2824 has been clicked, indicating that Single Sign-On has been selected to be enabled. An information box 2826 below the clickable box 2824 reads: "Enabling Single Sign-On (SSO) option will authenticate you during boot up and the authenticated user credentials are then used to automatically log onto the operating system."

Figure 28C:
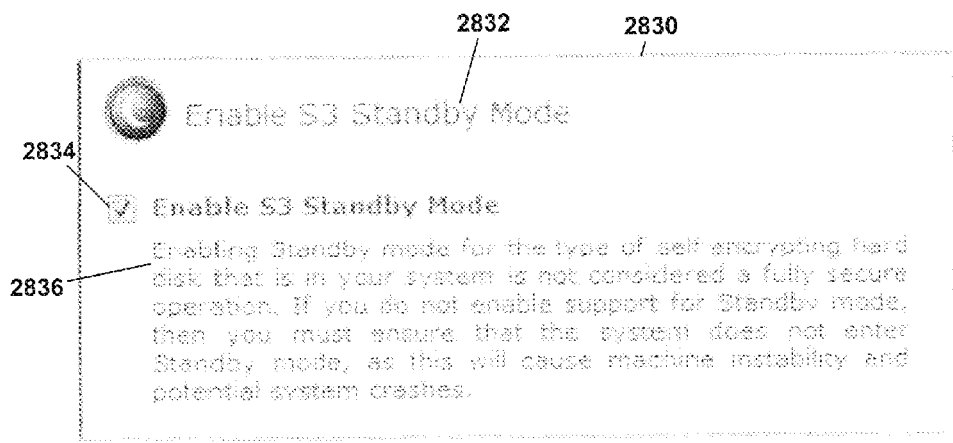
FIG. 28c depicts a cropped screenshot from a pre-boot GUI of a screen used to enable S3 standby mode, in accordance with one or more embodiments.

FIG. 28c depicts a cropped screenshot 2830 from a pre-boot GUI of a screen used to enable S3 standby mode, in accordance with one or more embodiments. A title 2832 of the screenshot 2830 comprises an icon depicting a crescent moon, and the text "Enable S3 Standby Mode," indicating that the second function 2814 ("Enable S3 Standby Mode") was selected in the previous screen of screenshot 2800 (FIG. 28a). A clickable box 2834 entitled "Enable S3 Standby Mode" is below the title 2832. As shown, the clickable box 2834 has been clicked indicating that the S3 Standby Mode has been selected to be enabled. An information box 2836 below the clickable box 2834 reads: "Enabling Standby Mode for the type of self encrypting hard disk that is in your system is not considered a fully secure operation. If you do not enable support for the Standby mode, then you must ensure that the system does not enter Standby mode, as this will cause machine instability and potential system crashes."

Figure 28D:
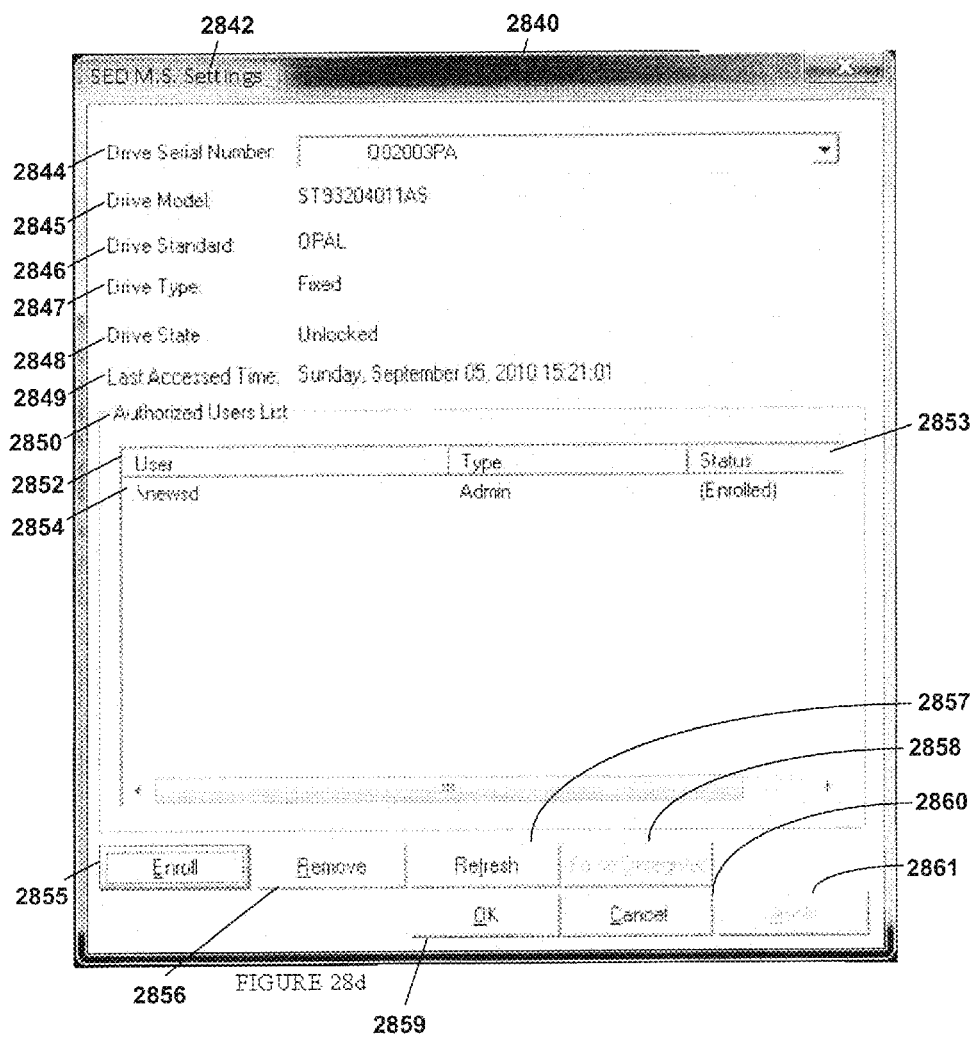
FIG. 28d depicts a screenshot from a pre-boot GUI of a screen used for settings for SED management software, in accordance with one or more embodiments.

FIG. 28d depicts a screenshot 2840 from a pre-boot GUI of a screen used for settings for SED management software, in accordance with one or more embodiments. A title 2842 at the top of the screenshot 2840 reads "SED M.S. Settings," indicating that the third function 2815 ("SED Management Software Settings") was selected in the previous screen of screenshot 2800 (FIG. 28a). A list of seven items 2844, 2845, 2846, 2847, 2848, 2849, 2850, is below the title 2842. A first item 2844 entitled "Drive Serial Number" includes a pull-down menu, which shows "Q02003PA" having been selected as the drive serial number. A second item 2845 is entitled "Drive Model:" and displays "ST93204011AS" as the drive model. A third item 2846 is entitled "Drive Standard:" and displays the drive standard as "OPAL." A fourth item 2847 is entitled "Drive Type:" and displays the drive type as "Fixed." A fifth item 2848 is entitled "Drive State:" and displays the drive state as "Unlocked." A sixth item 2849 is entitled "Last Accessed Time:" and displays "Sunday, Sep. 5, 2010 15:21:01" as the last time the drive was accessed. A seventh item 2850 is entitled "Authorized Users List," and includes a user chart 2852. The user chart 2852 has column headings 2853 of "User," "Type," and "Status." An entry 2854 in the user chart 2852 indicates that a single authorized user "\newsd" ("User") is an admin ("Type") and is enrolled ("Status"). Below the chart 2852 are a clickable "Enroll" button 2855 to enroll users, a clickable "Remove" button 2856 to remove users, a clickable Refresh button 2857, a "Force Deregister" button 2858 (depicted as inactive), a clickable "OK" button 2859, a clickable "Cancel" button 2860, and an "Apply" button 2861 (depicted as inactive).

Figure 29:
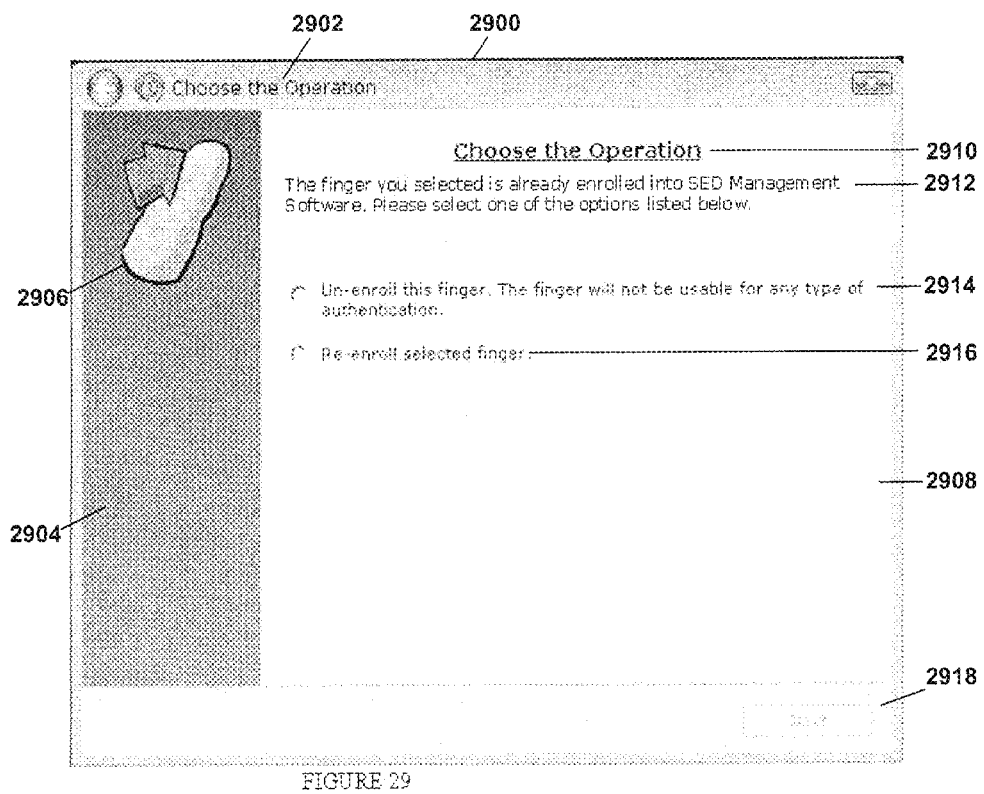
FIG. 29 depicts a screenshot from a pre-boot GUI of a screen used for an SED management console to modify fingerprint data, in accordance with one or more embodiments.

FIG. 29 depicts a screenshot 2900 from a pre-boot GUI of a screen used for an SED management console to modify fingerprint data, in accordance with one or more embodiments. A title 2902 at the top of the screenshot 2900 reads "Choose the Operation." An icon 2906, depicting a finger with an arrow pointing at its tip, is displayed within a left window 2904. A window title 2910, an instruction box 2912, and first and second options 2914, 2916 are in a right window 2908. The window title 2910 reads "Choose the Operation." The instruction box 2912 reads: "The finger you selected is already enrolled into SED Management Software. Please select one of the options listed below." The first and second options 2914, 2916 each include a clickable radio button and accompanying text. The text of the first option 2914 reads: "Un-enroll this finger. The finger will not be usable for any type of authentication." The text of the second option 2916 reads "Re-enroll selected finger." A clickable "Next" button 2918 (depicted as inactive, since neither option 2914, 2916 has been selected) is at the bottom of the screenshot 2900.

Figure 30:
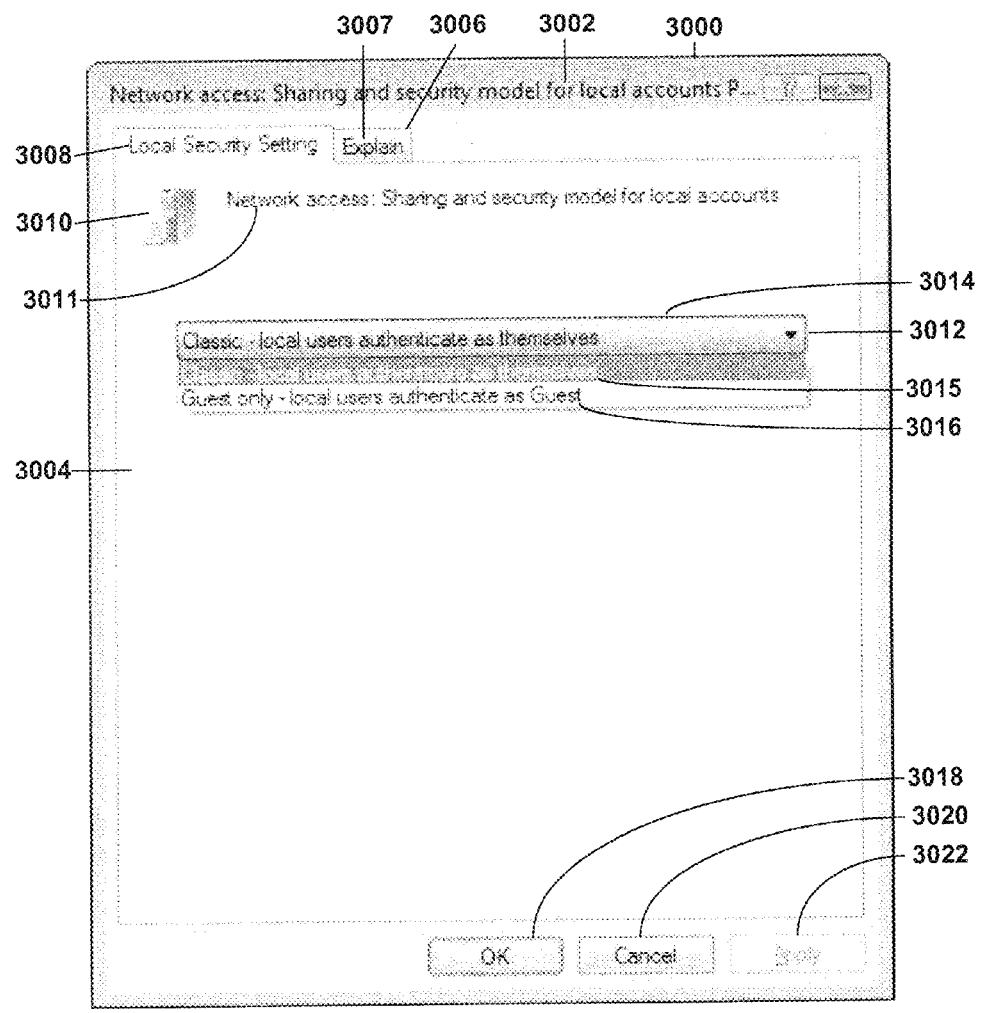
FIG. 30 depicts a screenshot from a pre-boot GUI of a screen used for selecting a sharing and security model for local accounts, in accordance with one or more embodiments.

FIG. 30 depicts a screenshot 3000 from a pre-boot GUI of a screen used for selecting a sharing and security model for local accounts, in accordance with one or more embodiments. A window represented by screenshot 3000 may be used to adjust a user's local security settings. This may be useful, for example, if the user experiences difficulties adding a WINDOWS user to the SED management software. A title 3002 at the top of the screenshot 3000 reads "Network access: Sharing and security model for local accounts P . . . ." First and second pages 3004, 3006 can be selected for viewing in a window of the screenshot 3000. The second page 3006 is not viewed in the screenshot 3000, but its tab 3007, entitled "Explain," is visible. The first page 3004 has a tab 3008 entitled "Local Security Setting." Below the tab 3008 is an icon 3010 depicting a document and a computer. Adjacent the icon 3010 is text 3011, which reads "Network access: Sharing and security model for local accounts." Below the icon 3010 and the text 3011, is a pull-down menu 3012, showing a tentative current selection 3014 from among two visible options 3015 and 3016. The tentative current selection 3014 is the first visible option 3015, and hence both of these have the same text, which is: "Classic—local users authenticate as themselves." The second visible option 3016 reads "Guest only—local users authenticate as Guest." To add a WINDOWS user to the SED management software, the first visible option 3015 should be selected. At the bottom of the screenshot 3000 are a clickable "OK" button 3018, a clickable "Cancel" button 3020 and a clickable "Apply" button 3022 (which is depicted as inactive as no final selection has been made).

Figure 31A:
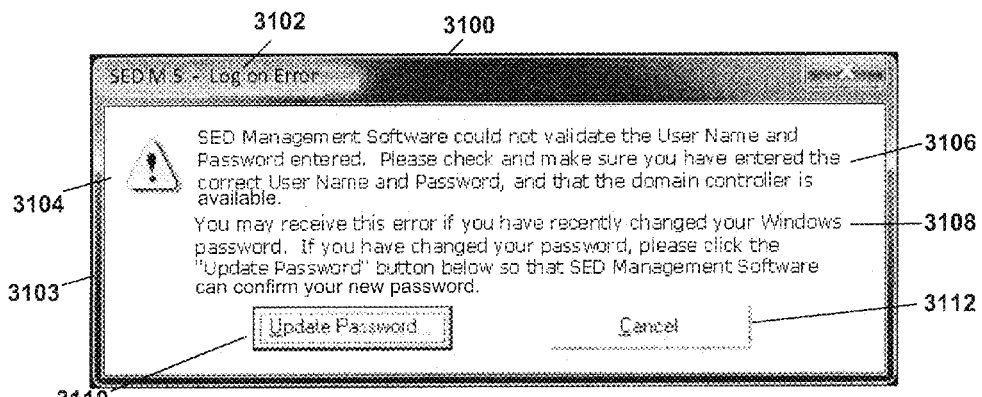
FIG. 31a depicts a cropped screenshot from a pre-boot GUI of a screen used to communicate login error, in accordance with one or more embodiments.

FIG. 31a depicts a cropped screenshot 3100 from a pre-boot GUI of a screen used to communicate login error, in accordance with one or more embodiments. A title 3102 at the top of the screenshot 3100 reads "SED M.S.—Log on Error." Below the title 3102, on the left of a window 3103 of the screenshot 3100, is an icon 3104 in the form of a triangle with an exclamation point within the triangle. To the right of the icon 3104 is a first information box 3106, which reads: "SED Management Software could not validate the User Name and Password entered. Please check and make sure you have entered the correct User Name and Password, and that the domain controller is available." A second information box 3108 is below the first information box 3106 and reads: "You may receive this error if you have recently changed your Windows password. If you have changed your password, please click the "Update Password" button below so that SED Management software can confirm your new Password." A clickable "Update Password" button 3110 and a clickable "Cancel" button 3112 are below the second information box 3108.

Figure 31B:
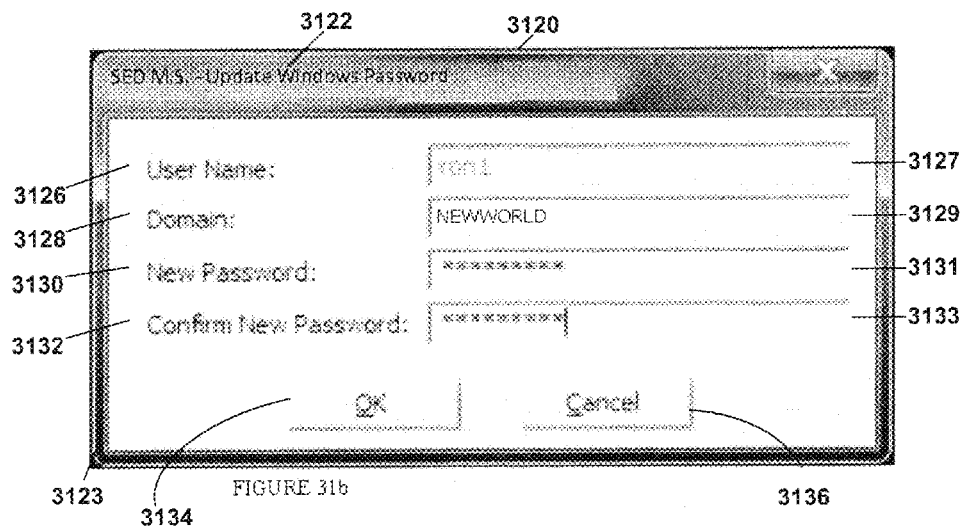
FIG. 31b depicts a cropped screenshot from a pre-boot GUI of a screen used to update a user password, in accordance with one or more embodiments.

FIG. 31b depicts a cropped screenshot 3120 from a pre-boot GUI of a screen used to update a user password, in accordance with one or more embodiments. A title 3122 at the top of the screenshot 3120 reads "SED M.S.—Update Windows Password," indicating that the "Update Password" button 3110 was selected in the previous screen of the screenshot 3100 (FIG. 31a). Below the title 3122 there are four data entry boxes 3127, 3129, 3131, 3133, each with descriptive text to the left thereof. A first descriptive text 3126, left of a first data entry box 3127, reads, "User Name:." As shown, the text "ron1" has been entered in the first data entry box 3127. A second descriptive text 3128, left of a second data entry box 3129, reads "Domain." As shown, the text "NEWWORLD" has been entered in the second data entry box 3129. A third descriptive text 3130, left of a third data entry box 3131 reads: New Password:." As shown, a nine character password, represented by asterisks ("*") for security, has been entered in the third data entry box 3131. A fourth descriptive text 3132, left of a fourth data entry box 3133 reads: "Confirm New Password:." As shown, a nine character password, represented by asterisks ("*") for security, has been entered in the fourth data entry box 3133. A clickable "OK" button 3134 and a clickable "Cancel" button 3136 are at the bottom of the screenshot 3120.

Returning to FIG. 3, the pre-boot GUI 316 may also include an easily configurable or customizable pre-boot background splash screen. One could, for example, use visual images, picturesque scenes, or a business card image as the pre-boot splash screen, even though the nominal space 210 is locked. The pre-boot GUI 316 may also include a keyboard functionality 318, so that a keyboard may be present on-screen even when the nominal space 210 is encrypted. A pre-boot keyboard allows a user to customize, with, for example, a choice of language—and all text displayed on the pre-boot GUI 316 will be presented in the selected language.

As depicted in FIG. 3, in accordance with one or more embodiments, the access management functionality 232 may include the supplemental encryption functionality 320. In addition to locking the nominal space 210 of the SED when the computer is shut down, users may use the file folder encryption engine 714 to selectively encrypt individual files, folders and/or documents.

Figure 11:
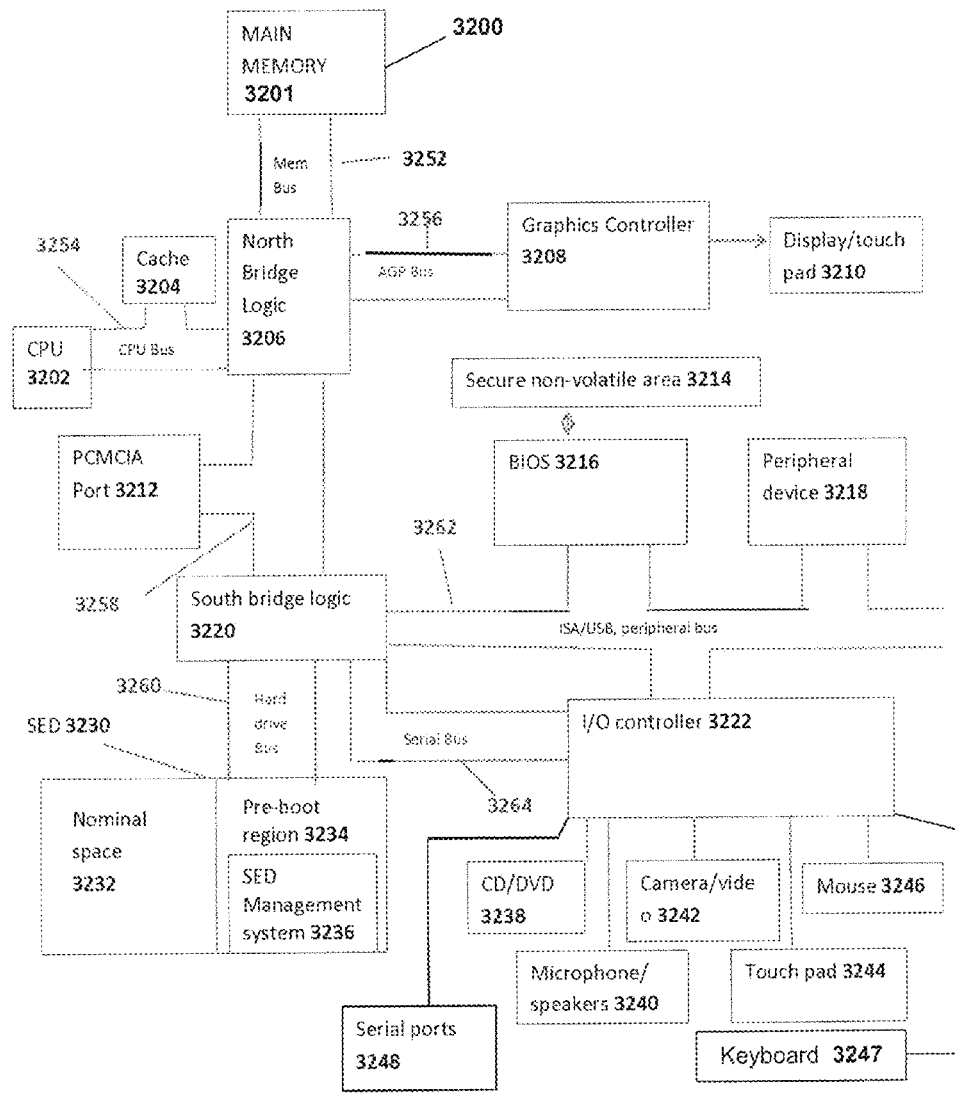
FIG. 11 depicts a block diagram of a machine in accordance with one or more embodiments.

Turning now to FIG. 11, a machine 3200 that includes a BIOS component 3216, an application component and non-viewable component 3214 in accordance with one of more embodiments is shown. The machine 3200 may be configured in any number of ways, including as a laptop unit, a desktop unit, a network server, mobile device, telephone, net-book, or any other configuration. Machine 3200 generally includes a central processing unit (CPU) 3202 coupled to a main memory 3201 and to a variety of other peripheral computer system components through an integrated bridge logic device 3206. The bridge logic device 3206 is sometimes referred to as a "North bridge" for no other reason than it often is depicted at the upper end of a computer system drawing. The CPU 3202 couples to North bridge logic 3206 via a CPU bus 3254, as shown, or the bridge logic 3206 may be integrated into the CPU 3202. The CPU 3202 may comprise, for example, a Pentium™ IV microprocessor. It should be understood, however, that the machine 3200 could include other alternative types of microprocessors. Further, an embodiment of the machine 3200 may include a multiple-CPU architecture, with each processor coupled to the bridge logic unit 3206. An external cache memory unit 3204 further may couple to the CPU bus 3254 or directly to the CPU 3202.

The main memory 3201 couples to the bridge logic unit 3206 through a memory bus 3252. The main memory 3201 functions as the working memory for the CPU 3202 and generally includes a conventional memory device or array of memory devices in which program instructions and data are stored. The main memory 3201 may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM). The North bridge 3206 couples the CPU 3202 and main memory 3201 to the peripheral devices in the system through a Peripheral Component Interconnect (PCI) bus 3258 or other expansion bus, such as an Extended Industry Standard Architecture (EISA) bus. The present disclosure, however, is not limited to any particular type of expansion bus, and thus various buses may be used, including a high speed (66 MHz or faster) PCI bus. Various peripheral devices that implement the PCI protocol may reside on the PCI bus 3258, as well.

The machine 3200 includes a graphics controller 3208 that couples to the bridge logic 3206 via an expansion bus 3256. As shown in FIG. 11, the expansion bus 3256 comprises an Advanced Graphics Port (AGP) bus. Alternatively, the graphics controller 3208 may couple to bridge logic 3206 through the PCI bus 3258. The graphics controller 3208 may embody a typical graphics accelerator generally known in the art to render three-dimensional data structures on display 3210. Bridge logic 3206 includes a PCI interface to permit master cycles to be transmitted and received by bridge logic 3206. The bridge logic 3206 also includes an interface for initiating and receiving cycles to and from components on the AGP bus 3256. The display 3210 comprises any suitable electronic display device upon which an image or text can be represented. A suitable display device may include, for example, a cathode ray tube (CRT), a liquid crystal display (LCD), a thin film transistor (TFT), a virtual retinal display (VRD), a touch pad, or any other type of suitable display device.

The machine 3200 may comprise a computer system and may optionally include a Personal Computer Memory Card International Association (PCMCIA) drive 3212 coupled to the PCI bus 3258. The PCMCIA drive 3212 is accessible from the outside of the machine and accepts one or more expansion cards that are housed in special PCMCIA cards, enclosures which are approximately the size of credit cards but slightly thicker. Accordingly, PCMCIA ports are particularly useful in laptop computer systems, in which space is at a premium. A PCMCIA card typically includes one connector that attaches to the PCMCIA port 3212, and additional connectors may be included for attaching cables or other devices to the card outside of the machine 3200. Accordingly, various types of PCMCIA cards are available, including modem cards, network interface cards, bus controller cards, and memory expansion cards. If other secondary expansion buses are provided in the computer system, another bridge logic device 3220 typically couples the PCI bus 3258 to those expansion buses. This bridge logic is sometimes referred to as a "South bridge," reflecting its location vis-a-vis the North bridge in a typical computer system drawing.

In FIG. 11, the South bridge 3220 couples the PCI bus 3258 to an Industry Standard Architecture (ISA) bus 3262 and to a hard drive bus 3260. The hard drive bus 3260 shown in FIG. 11 couples to the SED 3230, which has nominal space 3232 and a pre-boot region 3234. The pre-boot region 3234 contains an SED management system 3236 in accordance with one or more embodiments. The SED management system 3236 may comprise executable software files stored in a file system of the pre-boot region 3234 of the SED 3230. The SED management system 3236 may manage SED-based security and provide additional functionality to improve and enhance user experience of SED technology, as discussed herein.

Various ISA-compatible devices are shown coupled to the ISA bus 3262, including a BIOS ROM 3216 and other peripheral devices 3218 beyond those mentioned herein. The BIOS ROM 3216 is a memory device that stores commands which instruct the computer how to perform basic functions such as sending video data to the display or accessing data on CDs, DVDs, or hard floppy disk drives. In addition, the BIOS ROM 3216 may be used to store power management instructions for hardware-based (or "legacy") power management systems or to store register definitions for software-based power management systems. The BIOS instructions also enable the computer to load the operating system software program into main memory during system initialization and transfer control to the operating system so the operating system can start executing, also known as the INT19 "boot" sequence. The BIOS ROM 3216 typically is a "nonvolatile" memory device, which means that the memory contents remain intact even when the machine 3200 powers down. By contrast, the contents of the main memory 3201 typically are "volatile" and thus are lost when the computer shuts down.

The South bridge 3220 supports an input/output controller 3222 that operatively couples to basic input/output devices such as a keyboard 3247, a mouse 3246, a CD/DVD drive 3238, microphone and/or speakers 3240, camera and/or video 3242, touch pad 3244, general purpose parallel and serial ports 3248, and various input switches such as a power switch and a sleep switch (not shown). The I/O controller 3222 typically couples to the South bridge via a standard bus, shown as the ISA bus 3262 in FIG. 11. A serial bus 3264 may provide an additional connection between the I/O controller 3222 and South bridge 3220. The I/O controller 3222 typically includes an ISA bus interface (not specifically shown) and transmit and receive registers (not specifically shown) for exchanging data with the South bridge 3220 over the serial bus 3264.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the disclosure to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, or otherwise altered.

This disclosure also described various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the disclosure. What is claimed as the disclosure, therefore, are all implementations that come within the scope of the following claims, and all equivalents to such implementations.

The invention claimed is:

1. A system for use with a computer, the computer including a self-encrypting drive (SED), the SED including a nominal space and a pre-boot region, wherein the nominal space can be locked to prevent access to the nominal space and wherein the nominal space contains a nominal operating system (OS), the system comprising:
SED management software configured to be loaded in the pre-boot region of the SED, the SED management software comprising:
a pre-boot operating system (OS);
an instant transition state functionality, operable to save a state of the computer pertaining to the nominal OS before the pre-boot OS begins an authentication process to unlock the nominal space, to prevent the pre-boot OS from altering the saved state of the computer, and to restore the computer to the saved state after successful authentication of a user and unlocking of the nominal space; and
a sleep mode control functionality operable to, prior to exiting sleep mode, send a credential to the pre-boot region to unlock the nominal space and transfer control to the nominal OS.

2. The system of claim 1, wherein the pre-boot OS comprises a Linux kernel or is based on an open source OS.

3. The system of claim 1, wherein the SED management software provides key entry functionality.

4. The system of claim 1, wherein the SED management software provides graphics functionality.

5. The system of claim 1, wherein the SED management software further comprises one or more drivers for authentication devices.

6. The system of claim 1,
wherein the SED management software further comprises a secure recovery functionality, operable to save a backup copy of the nominal OS and an image of the nominal space and to restore the nominal OS and the nominal space using the backup copy and the image.

7. The system of claim 1, wherein the computer further includes a central processing unit (CPU) for the nominal space, and wherein the sleep control functionality comprises a sleep alert device driver configured to save the credential, to receive a signal from the CPU indicating that the computer is exiting sleep mode, and to respond to the signal by retrieving the saved credential and sending the retrieved credential to the pre-boot region to unlock the SED.

8. The system of claim 1, wherein the sleep control functionality is operable to disable the sleep mode.

9. A method for use with a computer, the computer comprising a self-encrypting drive (SED), the SED comprising a nominal space, a nominal operating system (OS), a pre-boot region, a pre-boot OS, and a basic input/output system (BIOS), the method comprising:
during a bootstrapping process, before control is transferred from the BIOS to the pre-boot OS, saving a state of the computer pertaining to the nominal OS;
instructing the pre-boot OS not to access memory locations where the state of the computer is saved;
upon successful authentication of a user and unlocking of the nominal space, restoring the computer to the saved state;
saving a credential for unlocking the nominal space;
upon receipt of a signal indicating the computer is going to exit sleep mode, retrieving the saved credential; and
sending the retrieved credential to the pre-boot region to unlock the nominal space.

10. The method of claim 9, the method further comprising:
transferring control from the BIOS to the pre-boot OS;
conducting a process of authenticating the user; and
transferring control from the pre-boot OS to the nominal OS.

11. A method for use with a server connected to a plurality of computers, each of the computers including a respective self-encrypting drive (SED), each of the SEDs including a nominal space, a nominal operating system (OS), a pre-boot region, a pre-boot OS, and a basic input/output system (BIOS), the method comprising:
by at least one of the computers:
during a bootstrapping process, before control is transferred from the BIOS to the pre-boot OS, saving a state of the computer pertaining to the nominal OS;
instructing the pre-boot OS not to access memory locations where the state of the computer is saved; and upon successful authentication of a user and unlocking of the nominal space, restoring the computer to the saved state; and by the server:
- detecting that one of the computers is in a hibernate mode;
- powering up the computer that is in the hibernate mode;
- sending a SED credential from the server to the powered-up computer to unlock the nominal space on the powered-up computer;
- backing up the nominal space of the powered-up computer; and
- returning the powered-up computer to the hibernate mode.

12. The method of claim 11, wherein one or more of the following is performed remotely by the server: detecting that one of the computers has entered the hibernate mode; powering up the hibernating computer; sending the SED credential from the server to the powered-up computer to unlock the nominal space on the powered-up computer; backing up the nominal space of the powered-up computer; and returning the powered-up computer to the hibernate mode.

13. The system of claim 1, further comprising:
the computer including the SED, the SED including the nominal space and the pre-boot region, wherein the nominal space can be locked to prevent access to the nominal space, and wherein the SED management software is loaded in the pre-boot region.

14. The system of claim 13, further comprising a server operable to communicate with the computer, wherein the computer serves as a client.

15. The system of claim 13, wherein the nominal space is configured to store applications, files and data.

16. The system of claim 13, wherein the nominal space comprises a Windows® operating system (OS).

17. The system of claim 13, wherein the SED comprises a processor configured to encrypt and decrypt the nominal space.

18. The system of claim 13, wherein the SED comprises a password key for encryption/decryption.

19. The system of claim 13, wherein the nominal space and the pre-boot region are non-overlapping portions of the SED.

20. The system of claim 13,
wherein the SED management software further comprises an unlocking program configured (a) to execute within the pre-boot OS, and (b) upon successful authentication of the user, to unlock the nominal space, and
wherein the unlocking program is stored in the pre-boot region.

21. The system of claim 13,
wherein the SED management software further comprises an unlocking program configured (a) to execute within the pre-boot OS, and (b) upon successful authentication of the user, to unlock the nominal space, and
wherein the pre-boot region comprises one or more sectors, and the unlocking program is stored in a first sector of the pre-boot region.

22. The system of claim 13,
wherein the SED management software further comprises an unlocking program configured (a) to execute within the pre-boot OS, and (b) upon successful authentication of the user, to unlock the nominal space, and
wherein the unlocking program is stored in an area that is rendered read-only after the unlocking program is written to the area.

23. The system of claim 13, wherein, after activation of encryption on the SED, the pre-boot region is read-only.

24. The system of claim 13, wherein the pre-boot region is hidden from users when the nominal space is unlocked.

25. The system of claim 13, wherein the nominal space is hidden from users when the pre-boot region is unlocked.

26. The system of claim 13, wherein the pre-boot region is hidden from users after the successful authentication of the user.

27. The system of claim 13, wherein the nominal space is hidden from users prior to the successful authentication of the user.

28. The system of claim 13, wherein, if the computer is powered on with encryption on, the nominal space is encrypted and locked.

29. The system of claim 13, wherein, if the computer is powered on with encryption on, the pre-boot region is accessible to a user.

30. The system of claim 13, wherein, if the computer is powered on with encryption on and a first sector of the nominal space is requested, a first sector of the pre-boot region is returned.

31. The system of claim 1,
wherein the SED management software further comprises an unlocking program configured (a) to execute within the pre-boot OS, and (b) upon successful authentication of the user, to unlock the nominal space, and
wherein, if the computer is powered on with encryption on, control is transferred to the unlocking program prior to control being transferred to the nominal OS.

32. The system of claim 1,
wherein the SED management software further comprises an unlocking program configured (a) to execute within the pre-boot OS, and (b) upon successful authentication of the user, to unlock the nominal space,
wherein the computer further comprises a memory,
wherein the nominal space includes a plurality of sectors including sector 0,
wherein sector 0 of the nominal space contains the nominal OS and,
wherein, upon the successful authentication of the user, the unlocking program reads, puts into the memory, and transfers control to sector 0 of the nominal space.

33. The system of claim 1,
wherein the SED management software further comprises an unlocking program configured (a) to execute within the pre-boot OS, and (b) upon successful authentication of the user, to unlock the nominal space, and
wherein the SED management software is configured to temporarily grant write access to the pre-boot region, store the unlocking program in the pre-boot region, and revert the pre-boot region to read-only.

34. The system of claim 1,
wherein the SED management software further comprises an unlocking program configured (a) to execute within the pre-boot OS, and (b) upon successful authentication of the user, to unlock the nominal space, and
wherein the unlocking program is configured to send a credential to unlock the SED, upon entry of an item of authentication by the user.

35. The system of claim 1, wherein the SED management software is configured to cause the nominal OS to boot the computer upon the successful authentication of the user.

36. The system of claim 1, wherein the SED management software further comprises one or more pre-boot libraries to support the pre-boot OS.

37. The system of claim 1, wherein authentication is performed using a password.

38. The system of claim 1, wherein authentication is performed using a biometric form of authentication.

39. The system of claim 1, wherein authentication is performed using a smart card.

40. The system of claim 1, wherein authentication is performed using multiple forms of authentication.

41. The system of claim 1, wherein the SED management software is configured to permit partitioning of the nominal space.

42. The system of claim 1, wherein the SED management software is configured to provide access to the nominal space for one to four users and one administrator, or for respective numbers of user and administrators allowed by the Opal standard.

43. The system of claim 1, wherein the SED management software further comprises at least one pre-boot functionality.

44. The system of claim 43, wherein the pre-boot functionality is capable of operating when the nominal space is locked.

45. The system of claim 43, wherein the pre-boot functionality is capable of operating prior to successful authentication of a user.

46. The system of claim 43, wherein the pre-boot functionality comprises a pre-boot erase utility, operable to permit an administrator to erase a password and/or encryption key from the pre-boot region.

47. The system of claim 43, wherein the pre-boot functionality comprises a pre-boot back-up utility, operable to back up the nominal space of the computer.

48. The system of claim 43, wherein the pre-boot functionality comprises a pre-boot work utility, operable to permit a user to transfer a file or data from the nominal space to the pre-boot region when the nominal space is locked.

49. The system of claim 43, wherein the pre-boot functionality comprises a pre-boot browser, operable to permit a user to browse the Internet.

50. The system of claim 43, wherein the pre-boot functionality comprises a pre-boot communication utility, operable to permit a user to communicate with another via a communication network.

51. The system of claim 43, wherein the pre-boot functionality comprises a pre-boot media player, operable to permit a user to play media.

52. The system of claim 43, wherein the pre-boot functionality comprises a pre-boot graphical user interface (GUI) configured for interaction with a user during a pre-boot authentication process.

53. The method of claim 9, further comprising:
upon successful authentication of a user, causing the computer to return to a fully powered on state.

54. The system of claim 1, wherein the SED management software further comprises:
an unlocking program configured (a) to execute within the pre-boot OS, and (b) upon successful authentication of the user, to unlock the nominal space.

55. The system of claim 1, wherein the SED management software further comprises:
an unlocking program configured (a) to execute within the pre-boot OS, and (b) upon successful authentication of a user, to transfer control to the nominal OS.

56. A system for use with a computer, the computer including a self-encrypting drive (SED), the SED including a nominal space and a pre-boot region, wherein the nominal space can be locked to prevent access to the nominal space and wherein the nominal space contains a nominal operating system (OS), the system comprising:
SED management software configured to be loaded in the pre-boot region of the SED, the SED management software comprising:
a pre-boot operating system (OS);
an instant transition state functionality including a reset module, operable to re-start initialization code after successful authentication of a user and unlocking of the nominal space; and
a sleep mode control functionality operable to, prior to exiting sleep mode, send a credential to the pre-boot region to unlock the nominal space and transfer control to the nominal OS.

57. The system of claim 56, wherein the initialization code is BIOS.

58. The system of claim 56, wherein the instant transition state functionality is operable to:
when the computer is powered on, run the initialization code;
transfer control from the initialization code to the pre-boot OS; and
after successful authentication of the user and unlocking of the nominal space, run the initialization code again.

59. The system of claim 58, wherein the initialization code is BIOS.

60. The system of claim 56 wherein the SED management software further comprises:
an unlocking program configured (a) to execute within the pre-boot OS, and (b) upon successful authentication of a user, to unlock the nominal space.

61. The system of claim 56, wherein the SED management software further comprises:
an unlocking program configured (a) to execute within the pre-boot OS, and (b) upon successful authentication of a user, to transfer control to the nominal OS.

62. The system of claim 56, wherein the pre-boot OS comprises a Linux kernel or is based on an open source OS.

63. The system of claim 56, wherein the SED management software provides key entry functionality.

64. The system of claim 56, wherein the SED management software provides graphics functionality.

65. The system of claim 56, wherein the SED management software further comprises one or more drivers for authentication devices.

66. The system of claim 56,
wherein the SED management software further comprises a secure recovery functionality, operable to save a backup copy of the nominal OS and an image of the nominal space and to restore the nominal OS and the nominal space using the backup copy and the image.

67. The system of claim 56, further comprising:
the computer including the SED, the SED including the nominal space and the pre-boot region, wherein the nominal space can be locked to prevent access to the nominal space, and wherein the SED management software is loaded in the pre-boot region.

68. The system of claim 67, further comprising a server operable to communicate with the computer, wherein the computer serves as a client.

69. The system of claim 67, wherein the nominal space is configured to store applications, files and data.

70. The system of claim 67, wherein the nominal space comprises a Windows® operating system (OS).

71. The system of claim 67, wherein the SED comprises a processor configured to encrypt and decrypt the nominal space.

72. The system of claim 67, wherein the SED comprises a password key for encryption/decryption.

73. The system of claim 67, wherein the nominal space and the pre-boot region are non-overlapping portions of the SED.

74. The system of claim 67,
wherein the SED management software further comprises an unlocking program configured (a) to execute within the pre-boot OS, and (b) upon successful authentication of the user, to unlock the nominal space, and
wherein the unlocking program is stored in the pre-boot region.

75. The system of claim 67,
wherein the SED management software further comprises an unlocking program configured (a) to execute within the pre-boot OS, and (b) upon successful authentication of the user, to unlock the nominal space, and
wherein the pre-boot region comprises one or more sectors, and the unlocking program is stored in a first sector of the pre-boot region.

76. The system of claim 67,
wherein the SED management software further comprises an unlocking program configured (a) to execute within the pre-boot OS, and (b) upon successful authentication of the user, to unlock the nominal space, and
wherein the unlocking program is stored in an area that is rendered read-only after the unlocking program is written to the area.

77. The system of claim 67, wherein, after activation of encryption on the SED, the pre-boot region is read-only.

78. The system of claim 67, wherein the pre-boot region is hidden from users when the nominal space is unlocked.

79. The system of claim 67, wherein the nominal space is hidden from users when the pre-boot region is unlocked.

80. The system of claim 67, wherein the pre-boot region is hidden from users after the successful authentication of the user.

81. The system of claim 67, wherein the nominal space is hidden from users prior to the successful authentication of the user.

82. The system of claim 67, wherein, if the computer is powered on with encryption on, the nominal space is encrypted and locked.

83. The system of claim 67, wherein, if the computer is powered on with encryption on, the pre-boot region is accessible to a user.

84. The system of claim 67, wherein, if the computer is powered on with encryption on and a first sector of the nominal space is requested, a first sector of the pre-boot region is returned.

85. The system of claim 56,
wherein the SED management software further comprises an unlocking program configured (a) to execute within the pre-boot OS, and (b) upon successful authentication of the user, to unlock the nominal space, and
wherein, if the computer is powered on with encryption on, control is transferred to the unlocking program prior to control being transferred to the nominal OS.

86. The system of claim 56,
wherein the SED management software further comprises an unlocking program configured (a) to execute within the pre-boot OS, and (b) upon successful authentication of the user, to unlock the nominal space,
wherein the computer further comprises a memory,
wherein the nominal space includes a plurality of sectors including sector 0,
wherein sector 0 of the nominal space contains the nominal OS and,
wherein, upon the successful authentication of the user, the unlocking program reads, puts into the memory, and transfers control to sector 0 of the nominal space.

87. The system of claim 56,
wherein the SED management software further comprises an unlocking program configured (a) to execute within the pre-boot OS, and (b) upon successful authentication of the user, to unlock the nominal space, and
wherein the SED management software is configured to temporarily grant write access to the pre-boot region, store the unlocking program in the pre-boot region, and revert the pre-boot region to read-only.

88. The system of claim 56,
wherein the SED management software further comprises an unlocking program configured (a) to execute within the pre-boot OS, and (b) upon successful authentication of the user, to unlock the nominal space, and
wherein the unlocking program is configured to send a credential to unlock the SED, upon entry of an item of authentication by the user.

89. The system of claim 56, wherein the SED management software is configured to cause the nominal OS to boot the computer upon the successful authentication of the user.

90. The system of claim 56, wherein the SED management software further comprises one or more pre-boot libraries to support the pre-boot OS.

91. The system of claim 56, wherein authentication is performed using a password.

92. The system of claim 56, wherein authentication is performed using a biometric form of authentication.

93. The system of claim 56, wherein authentication is performed using a smart card.

94. The system of claim 56, wherein authentication is performed using multiple forms of authentication.

95. The system of claim 56, wherein the SED management software is configured to permit partitioning of the nominal space.

96. The system of claim 56, wherein the SED management software is configured to provide access to the nominal space for one to four users and one administrator, or for respective numbers of user and administrators allowed by the Opal standard.

97. The system of claim 56, wherein the SED management software further comprises at least one pre-boot functionality.

98. The system of claim 97, wherein the pre-boot functionality is capable of operating when the nominal space is locked.

99. The system of claim 97, wherein the pre-boot functionality is capable of operating prior to successful authentication of a user.

100. The system of claim 97, wherein the pre-boot functionality comprises a pre-boot erase utility, operable to permit an administrator to erase a password and/or encryption key from the pre-boot region.

101. The system of claim 97, wherein the pre-boot functionality comprises a pre-boot back-up utility, operable to back up the nominal space of the computer.

102. The system of claim 97, wherein the pre-boot functionality comprises a pre-boot work utility, operable to permit a user to transfer a file or data from the nominal space to the pre-boot region when the nominal space is locked.

103. The system of claim 97, wherein the pre-boot functionality comprises a pre-boot browser, operable to permit a user to browse the Internet.

104. The system of claim 97, wherein the pre-boot functionality comprises a pre-boot communication utility, operable to permit a user to communicate with another via a communication network.

105. The system of claim 97, wherein the pre-boot functionality comprises a pre-boot media player, operable to permit a user to play media.

106. The system of claim 97, wherein the pre-boot functionality comprises a pre-boot graphical user interface (GUI) configured for interaction with a user during a pre-boot authentication process.

107. A method for use with a computer, the computer comprising a self-encrypting drive (SED), the SED comprising a nominal space, a pre-boot region and a pre-boot OS, the method comprising:
  receiving an item of authentication from a user;
  upon successful authentication of the user and unlocking of the nominal space, restarting initialization code;
  saving a credential for unlocking the nominal space;
  upon receipt of a signal indicating the computer is going to exit sleep mode, retrieving the saved credential; and
  sending the retrieved credential to the pre-boot region to unlock the nominal space.

108. The method of claim 107, wherein the initialization code is BIOS.

109. The method of claim 107, further comprising:
  when the computer is powered on, running the initialization code;
  transferring control from the initialization code to the pre-boot OS; and
  after successful authentication of the user and unlocking of the nominal space, running the initialization code again.

110. The method of claim 109, wherein the initialization code is BIOS.

111. A system for use with a computer, the computer including a self-encrypting drive (SED), the SED including a nominal space and a pre-boot region, wherein the nominal space can be locked to prevent access to the nominal space and wherein the nominal space contains a nominal operating system (OS), the system comprising:
  SED management software configured to be loaded in the pre-boot region of the SED, the SED management software comprising:
    a pre-boot operating system (OS);
    an instant transition state functionality, operable to reset the computer after successful authentication of a user and unlocking of the nominal space, so that any alteration of a state of the computer made by the pre-boot OS does not affect functionality of the nominal OS; and
    a sleep mode control functionality operable to, prior to exiting sleep mode, send a credential to the pre-boot region to unlock the nominal space and transfer control to the nominal OS.

112. The system of claim 111, wherein the SED management software further comprises:
  an unlocking program configured (a) to execute within the pre-boot OS, and (b) upon successful authentication of a user, to unlock the nominal space.

113. The system of claim 111, wherein the SED management software further comprises:
  an unlocking program configured (a) to execute within the pre-boot OS, and (b) upon successful authentication of a user, to transfer control to the nominal OS.

114. The system of claim 111, wherein the pre-boot OS comprises a Linux kernel or is based on an open source OS.

115. The system of claim 111, wherein the SED management software provides key entry functionality.

116. The system of claim 111, wherein the SED management software provides graphics functionality.

117. The system of claim 111, wherein the SED management software further comprises one or more drivers for authentication devices.

118. The system of claim 111, wherein the SED management software further comprises a secure recovery functionality, operable to save a backup copy of the nominal OS and an image of the nominal space and to restore the nominal OS and the nominal space using the backup copy and the image.

119. The system of claim 111, further comprising:
  the computer including the SED, the SED including the nominal space and the pre-boot region, wherein the nominal space can be locked to prevent access to the nominal space, and wherein the SED management software is loaded in the pre-boot region.

120. The system of claim 119, further comprising a server operable to communicate with the computer, wherein the computer serves as a client.

121. The system of claim 119, wherein the nominal space is configured to store applications, files and data.

122. The system of claim 119, wherein the nominal space comprises a Windows® operating system (OS).

123. The system of claim 119, wherein the SED comprises a processor configured to encrypt and decrypt the nominal space.

124. The system of claim 119, wherein the SED comprises a password key for encryption/decryption.

125. The system of claim 119, wherein the nominal space and the pre-boot region are non-overlapping portions of the SED.

126. The system of claim 119,
  wherein the SED management software further comprises an unlocking program configured (a) to execute within the pre-boot OS, and (b) upon successful authentication of the user, to unlock the nominal space, and
  wherein the unlocking program is stored in the pre-boot region.

127. The system of claim 119,
  wherein the SED management software further comprises an unlocking program configured (a) to execute within the pre-boot OS, and (b) upon successful authentication of the user, to unlock the nominal space, and
  wherein the pre-boot region comprises one or more sectors, and the unlocking program is stored in a first sector of the pre-boot region.

128. The system of claim 119,
  wherein the SED management software further comprises an unlocking program configured (a) to execute within the pre-boot OS, and (b) upon successful authentication of the user, to unlock the nominal space, and
  wherein the unlocking program is stored in an area that is rendered read-only after the unlocking program is written to the area.

129. The system of claim 119, wherein, after activation of encryption on the SED, the pre-boot region is read-only.

130. The system of claim 119, wherein the pre-boot region is hidden from users when the nominal space is unlocked.

131. The system of claim 119, wherein the nominal space is hidden from users when the pre-boot region is unlocked.

132. The system of claim 119, wherein the pre-boot region is hidden from users after the successful authentication of the user.

133. The system of claim 119, wherein the nominal space is hidden from users prior to the successful authentication of the user.

134. The system of claim 119, wherein, if the computer is powered on with encryption on, the nominal space is encrypted and locked.

135. The system of claim 119, wherein, if the computer is powered on with encryption on, the pre-boot region is accessible to a user.

136. The system of claim 119, wherein, if the computer is powered on with encryption on and a first sector of the nominal space is requested, a first sector of the pre-boot region is returned.

137. The system of claim 111,
wherein the SED management software further comprises an unlocking program configured (a) to execute within the pre-boot OS, and (b) upon successful authentication of the user, to unlock the nominal space, and
wherein, if the computer is powered on with encryption on, control is transferred to the unlocking program prior to control being transferred to the nominal OS.

138. The system of claim 111,
wherein the SED management software further comprises an unlocking program configured (a) to execute within the pre-boot OS, and (b) upon successful authentication of the user, to unlock the nominal space,
wherein the computer further comprises a memory,
wherein the nominal space includes a plurality of sectors including sector 0,
wherein sector 0 of the nominal space contains the nominal OS and,
wherein, upon the successful authentication of the user, the unlocking program reads, puts into the memory, and transfers control to sector 0 of the nominal space.

139. The system of claim 111,
wherein the SED management software further comprises an unlocking program configured (a) to execute within the pre-boot OS, and (b) upon successful authentication of the user, to unlock the nominal space, and
wherein the SED management software is configured to temporarily grant write access to the pre-boot region, store the unlocking program in the pre-boot region, and revert the pre-boot region to read-only.

140. The system of claim 111,
wherein the SED management software further comprises an unlocking program configured (a) to execute within the pre-boot OS, and (b) upon successful authentication of the user, to unlock the nominal space, and
wherein the unlocking program is configured to send a credential to unlock the SED, upon entry of an item of authentication by the user.

141. The system of claim 111, wherein the SED management software is configured to cause the nominal OS to boot the computer upon the successful authentication of the user.

142. The system of claim 111, wherein the SED management software further comprises one or more pre-boot libraries to support the pre-boot OS.

143. The system of claim 111, wherein authentication is performed using a password.

144. The system of claim 111, wherein authentication is performed using a biometric form of authentication.

145. The system of claim 111, wherein authentication is performed using a smart card.

146. The system of claim 111, wherein authentication is performed using multiple forms of authentication.

147. The system of claim 111, wherein the SED management software is configured to permit partitioning of the nominal space.

148. The system of claim 111, wherein the SED management software is configured to provide access to the nominal space for one to four users and one administrator, or for respective numbers of user and administrators allowed by the Opal standard.

149. The system of claim 111, wherein the SED management software further comprises at least one pre-boot functionality.

150. The system of claim 149, wherein the pre-boot functionality is capable of operating when the nominal space is locked.

151. The system of claim 149, wherein the pre-boot functionality is capable of operating prior to successful authentication of a user.

152. The system of claim 149, wherein the pre-boot functionality comprises a pre-boot erase utility, operable to permit an administrator to erase a password and/or encryption key from the pre-boot region.

153. The system of claim 149, wherein the pre-boot functionality comprises a pre-boot back-up utility, operable to back up the nominal space of the computer.

154. The system of claim 149, wherein the pre-boot functionality comprises a pre-boot work utility, operable to permit a user to transfer a file or data from the nominal space to the pre-boot region when the nominal space is locked.

155. The system of claim 149, wherein the pre-boot functionality comprises a pre-boot browser, operable to permit a user to browse the Internet.

156. The system of claim 149, wherein the pre-boot functionality comprises a pre-boot communication utility, operable to permit a user to communicate with another via a communication network.

157. The system of claim 149, wherein the pre-boot functionality comprises a pre-boot media player, operable to permit a user to play media.

158. The system of claim 149, wherein the pre-boot functionality comprises a pre-boot graphical user interface (GUI) configured for interaction with a user during a pre-boot authentication process.

159. A method for use with a computer, the computer comprising a self-encrypting drive (SED), the SED comprising a nominal space, a nominal OS, a pre-boot region, and a pre-boot OS, the method comprising:
receiving an item of authentication from a user;
upon successful authentication of the user and unlocking of the nominal space, resetting the computer, so that any alteration of a state of the computer made by the pre-boot OS does not affect functionality of the nominal OS;
saving a credential for unlocking the nominal space;
upon receipt of a signal indicating the computer is going to exit sleep mode, retrieving the saved credential; and
sending the retrieved credential to the pre-boot region to unlock the nominal space.

160. The system of claim 1, wherein the state of the computer pertaining to the nominal OS is a state of the computer pertaining to booting of the nominal OS.

161. The method of claim 9, wherein the state of the computer pertaining to the nominal OS is a state of the computer pertaining to booting of the nominal OS.

162. The method of claim 11, wherein the state of the computer pertaining to the nominal OS is a state of the computer pertaining to booting of the nominal OS.

* * * * *